(12) United States Patent
Culbertson et al.

(10) Patent No.: US 7,854,518 B2
(45) Date of Patent: Dec. 21, 2010

(54) MESH FOR RENDERING AN IMAGE FRAME

(75) Inventors: W. Bruce Culbertson, Palo Alto, CA (US); Michael Harville, Palo Alto, CA (US); Daniel G. Gelb, Palo Alto, CA (US); Irwin E. Sobel, Palo Alto, CA (US); Andrew E. Fitzhugh, Palo Alto, CA (US); Donald O. Tanguay, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 815 days.

(21) Appl. No.: 11/455,306

(22) Filed: Jun. 16, 2006

(65) Prior Publication Data

US 2007/0291233 A1  Dec. 20, 2007

(51) Int. Cl.
*G03B 21/00* (2006.01)
*G03B 21/14* (2006.01)
*G03B 21/26* (2006.01)
*G09G 5/00* (2006.01)

(52) U.S. Cl. .................. 353/69; 353/94; 345/619

(58) Field of Classification Search ............ 353/69–70, 353/94; 348/745; 345/1.1, 619, 694
See application file for complete search history.

(56) References Cited

U.S. PATENT DOCUMENTS

| | | | |
|---|---|---|---|
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,309,241 A | 5/1994 | Hoagland | |
| 5,317,409 A | 5/1994 | Macocs | |
| 5,319,744 A * | 6/1994 | Kelly et al. ............ | 345/647 |

(Continued)

FOREIGN PATENT DOCUMENTS

EP    1 001 306 A2    5/2000

(Continued)

OTHER PUBLICATIONS

M. Brown et al., "A practical and flexible tiled display system." In Pacific Conf. on Comp. Graphics and Apps., 2002.

(Continued)

*Primary Examiner*—Georgia Y Epps
*Assistant Examiner*—Jori S Byrne-Diakun

(57) ABSTRACT

A method includes generating a first plurality of meshes configured to map a first domain associated with a display surface having a plurality of fiducial marks to a second domain associated with a image capture device configured to capture a first image of the display surface, generating a second plurality of meshes configured to map the second domain to a third domain associated with a first projector configured to display a second image onto the display surface, and generating a first mesh configured to map the first domain to the third domain in conjunction with a second mesh using the first plurality of meshes and the second plurality of meshes.

20 Claims, 24 Drawing Sheets

U.S. PATENT DOCUMENTS

| | | | |
|---|---|---|---|
| 5,369,739 A * | 11/1994 | Akeley | 345/626 |
| 5,386,253 A | 1/1995 | Fielding | |
| 5,402,184 A | 3/1995 | O'Grady et al. | |
| 5,490,009 A | 2/1996 | Venkateswar et al. | |
| 5,557,353 A | 9/1996 | Stahl | |
| 5,689,283 A | 11/1997 | Shirochi | |
| 5,751,379 A | 5/1998 | Markandey et al. | |
| 5,842,762 A | 12/1998 | Clarke | |
| 5,897,191 A | 4/1999 | Clarke | |
| 5,912,773 A | 6/1999 | Barnett et al. | |
| 5,920,365 A | 7/1999 | Eriksson | |
| 5,953,148 A | 9/1999 | Moseley et al. | |
| 001,812 A * | 11/1999 | Arcuri | 345/428 |
| 5,978,518 A | 11/1999 | Oliyide et al. | |
| 6,017,123 A | 1/2000 | Bleha et al. | |
| 6,025,951 A | 2/2000 | Swart et al. | |
| 6,067,143 A | 5/2000 | Tomita | |
| 6,097,854 A | 8/2000 | Szeliski et al. | |
| 6,104,375 A | 8/2000 | Lam | |
| 6,115,022 A | 9/2000 | Mayer et al. | |
| 6,118,584 A | 9/2000 | Van Berkel et al. | |
| 6,141,039 A | 10/2000 | Poetsch | |
| 6,184,969 B1 | 2/2001 | Fergason | |
| 6,219,017 B1 | 4/2001 | Shimada et al. | |
| 6,222,593 B1 | 4/2001 | Higurashi et al. | |
| 6,239,783 B1 | 5/2001 | Hill et al. | |
| 6,243,055 B1 | 6/2001 | Fergason | |
| 6,249,289 B1 * | 6/2001 | Arnaud et al. | 345/648 |
| 6,313,888 B1 | 11/2001 | Tabata | |
| 6,317,171 B1 | 11/2001 | Dewald | |
| 6,384,816 B1 | 5/2002 | Tabata | |
| 6,390,050 B2 | 5/2002 | Feikus | |
| 6,393,145 B2 | 5/2002 | Betrisey et al. | |
| 6,456,339 B1 * | 9/2002 | Surati et al. | 348/745 |
| 6,522,356 B1 | 2/2003 | Watanabe | |
| 6,558,006 B2 | 5/2003 | Ioka | |
| 6,657,603 B1 | 12/2003 | Demetrescu et al. | |
| 6,677,956 B2 * | 1/2004 | Raskar et al. | 345/581 |
| 6,695,451 B1 | 2/2004 | Yamasaki et al. | |
| 6,709,116 B1 * | 3/2004 | Raskar et al. | 353/121 |
| 6,729,733 B1 * | 5/2004 | Raskar et al. | 353/121 |
| 6,733,136 B2 | 5/2004 | Lantz et al. | |
| 6,755,537 B1 * | 6/2004 | Raskar et al. | 353/94 |
| 6,793,350 B1 | 9/2004 | Raskar et al. | |
| 6,811,264 B2 * | 11/2004 | Raskar et al. | 353/94 |
| 6,814,448 B2 | 11/2004 | Ioka | |
| 6,824,271 B2 | 11/2004 | Ishii et al. | |
| 6,834,965 B2 * | 12/2004 | Raskar et al. | 353/94 |
| 6,856,420 B1 | 2/2005 | Pew et al. | |
| 6,874,420 B2 | 4/2005 | Lewis et al. | |
| 6,912,293 B1 | 6/2005 | Korobkin | |
| 6,930,681 B2 * | 8/2005 | Raskar et al. | 345/419 |
| 6,952,204 B2 * | 10/2005 | Baumberg et al. | 345/420 |
| 6,963,348 B2 * | 11/2005 | Diamond et al. | 345/647 |
| 7,006,110 B2 | 2/2006 | Crisu et al. | |
| 7,019,713 B2 | 3/2006 | Hereld et al. | |
| 7,031,512 B2 | 4/2006 | Ng | |
| 7,038,727 B2 | 5/2006 | Majumder et al. | |
| 7,103,203 B2 | 9/2006 | Deschamps | |
| 7,131,733 B2 | 11/2006 | Shibano | |
| 7,308,157 B2 * | 12/2007 | Safaee-Rad et al. | 382/294 |
| 7,339,625 B2 | 3/2008 | Matthys et al. | |
| 7,589,729 B2 * | 9/2009 | Skibak et al. | 345/441 |
| 2001/0055025 A1 * | 12/2001 | Deering et al. | 345/611 |
| 2002/0024640 A1 * | 2/2002 | Ioka | 353/94 |
| 2002/0041364 A1 | 4/2002 | Ioka | |
| 2002/0057278 A1 * | 5/2002 | Bruderlin | 345/582 |
| 2003/0020809 A1 | 1/2003 | Gibbon et al. | |
| 2003/0034974 A1 * | 2/2003 | Welch et al. | 345/426 |
| 2003/0038818 A1 | 2/2003 | Tidwell | |
| 2003/0076325 A1 | 4/2003 | Thrasher | |
| 2003/0090597 A1 | 5/2003 | Katoh et al. | |
| 2004/0017164 A1 | 1/2004 | Belliveau | |
| 2004/0085477 A1 | 5/2004 | Majumder et al. | |
| 2004/0169827 A1 | 9/2004 | Kubo et al. | |
| 2004/0184010 A1 | 9/2004 | Raskar et al. | |
| 2004/0184011 A1 * | 9/2004 | Raskar et al. | 353/94 |
| 2004/0184013 A1 | 9/2004 | Raskar et al. | |
| 2004/0239885 A1 | 12/2004 | Jaynes et al. | |
| 2004/0239890 A1 | 12/2004 | Starkweather | |
| 2004/0257540 A1 | 12/2004 | Roy et al. | |
| 2005/0012474 A1 | 1/2005 | Belliveau | |
| 2005/0052623 A1 | 3/2005 | Hsiung | |
| 2005/0117215 A1 * | 6/2005 | Lange | 359/462 |
| 2005/0271299 A1 | 12/2005 | Ajito et al. | |
| 2006/0227301 A1 | 10/2006 | Matthys et al. | |
| 2007/0024620 A1 * | 2/2007 | Muller-Fischer et al. | 345/427 |
| 2007/0195285 A1 * | 8/2007 | Jaynes et al. | 353/69 |
| 2007/0253028 A1 | 11/2007 | Widdowson | |
| 2007/0279600 A1 | 12/2007 | Belliveau et al. | |
| 2007/0291184 A1 * | 12/2007 | Harville et al. | 348/745 |
| 2007/0291185 A1 * | 12/2007 | Gelb et al. | 348/745 |
| 2007/0291189 A1 * | 12/2007 | Harville | 349/7 |
| 2008/0024490 A1 * | 1/2008 | Loop et al. | 345/421 |
| 2008/0123993 A1 | 5/2008 | Widdowson | |

FOREIGN PATENT DOCUMENTS

| | | |
|---|---|---|
| WO | WO 00/07376 | 2/2000 |

OTHER PUBLICATIONS

N. Chang, "Efficient dense correspondences using temporally-encoded light patterns." IEEE Intl. Workshop on on Projector-Camera Systems, Oct. 12, 2003, Nice, France.

A. Majumder et al. "Perceptual photometric seamlessness in projection-based tiled displays." In ACM Transactions on Graphics, vol. 24, No. 1, pp. 118-139, 2005.

A. Raij et al. "PixelFlex2: a comprehensive, automatic, causally-aligned multiprojector display". IEEE Intl. Workshop on Projector-Camera Systems, Oct. 12, 2003, Nice, FR.

R. Raskar et al. "Seamless projection overlaps using image warping and intensity blending." In Intl. Conf. on Virtual Systems and Multimedia, Gifu Japan, 1998.

R. Raskar et al. "Multiprojector displays using camera-based registration." In IEEE Visualization, p. 161-168, 1999.

R. Raskar et al. "iLamps: Geometrically Aware and Self-Configuring Projectors". In ACM Transactions on Graphics, vol. 22, No. 3, pp. 809-818, 2003.

R. Surati. Scalable self-calibrating display technology for seamless large-scale displays. Ph.D. thesis, Dept. of Computer Science, MIT, 1998.

R. Szeliski. "Video Mosaics for Virtual Environments", IEEE Computer Graphics and Applications, pp. 22-30, Mar. 1996.

Tanguay, Donald et al., "Nizza: A Framework for Developing Real-time Streaming Multimedia Applications", HP Laboratories, HPL-2004-132, Aug. 2, 2004, 9 pages.

C. Jaynes et al., "Super-Resolution Composition in Multi-Projector Display's," IEEE Int'l Workshop on Projector-Camera Systems, Oct. 2003; 8 pgs.

L.M Chen & S. Hasagawa, "Visual Resolution Limits for Color Matrix Displays—One Panel Projectors", vol. 13, pp. 221-226, 1992.

A. Yasuda et al., "FLC Wobbling for High Resolution Projectors", Journal of the SID, May 1997, pp. 229-305.

T. Tokita et al., "P-108: FLC Resolution-Enhancing Device for Projection Displays", SID 02 Digest 2002, pp. 638-641.

D.K. Kelley, "Motion and Vision—II. Stabilized Spatio-Temporal Threshold Surface", Journal of the Optical Society of America, vol. 69, No. 10, Oct. 1979.

Candice H. Brown Elliott et al., "Color Subpixel Rendering Projectors and Flat Panel Displays"; SMPTE Advanced Motion Imaging Conference: Feb. 27-Mar. 1, 2003; pp. 1-4.

Diana C. Chen, "Display Resolution Enhancement with Optical Scanners", Applied Optics, vol. 40, No. 5, Feb. 10, 2001; pp. 636-643.

Brochure entitled "The Use of Dual Graphics Devices on the High-End HP xw9300 Workstation", Hewlett-Packard Development Company, #5983-0684EN, Feb. 2005, 8 pages.

Peterson, Samuel - http://www.geom.uiuc.edu/%7Esamuelp/del_project.html: Jun. 16, 2003.

Raskar, Ramesh et al - "Seamless Projection Overlaps Using image Warping and intensity Blending" - Nov. 1998 -Fourth International Conference on Virtual Systems and Multimedia.

Raskar, Ramesh et al - Multi-Projector Displays Using Camera-Based Registration - 1999 - University of North Carolina.

Stone, Maureen C - "Color and Brightness Appearance Issues for Tiled Displays" - Mar. 2001 - Computer Graphics and Applications.

A Raij et al - "PixelFlex2: A Comprehensive, Automatic, Casually-Aligned Multi-Projector Display" - Proceedings of PROCAMs '03 - Oct. 12, 2003.

M Ashdown et al - "A Flexible Projector-Camera System for Multi-Planar Displays" - Proceedings of IEEE Conference on Computer Vision and Pattern Recognition - Jun. 27, 2004 - vol. 2 - pp. 165-172.

M Brown et al - "Camera-Base Calibration Techniques for Seamless Multi-projector Displays" - IEEE Transactions on Visualization and Computer Graphics - vol. 11 No. 2 - Mar. 2005.

M Harville et al - "Practical Methods for Geometric and Photometric Correction of Tiled Projector Displays on Curved Surfaces" - Conference on Computer Vision and Pattern Recognition.

* cited by examiner

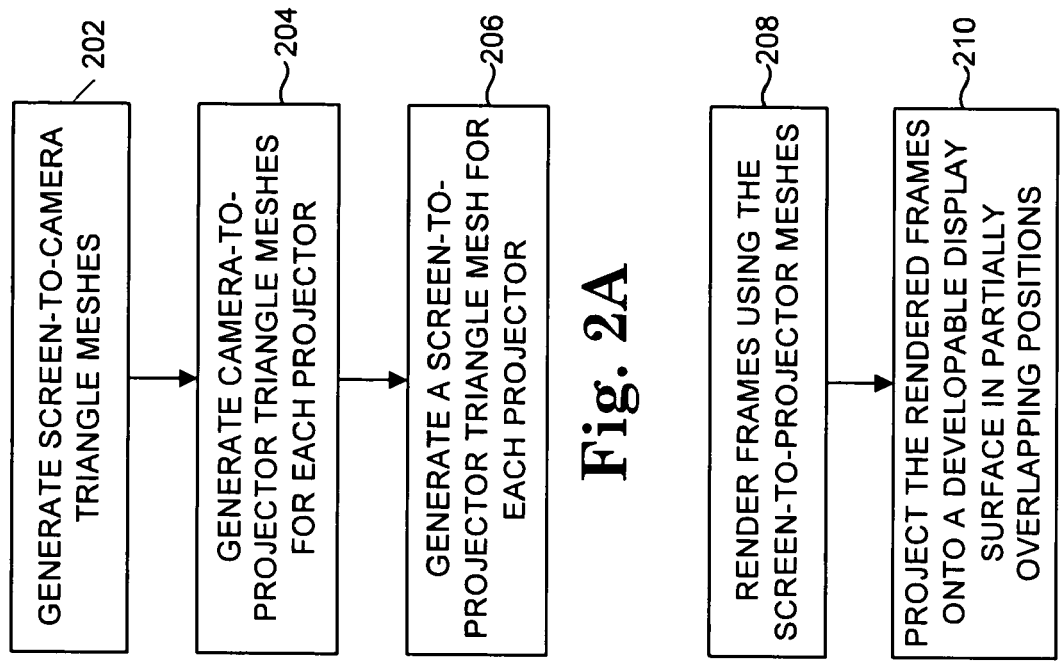
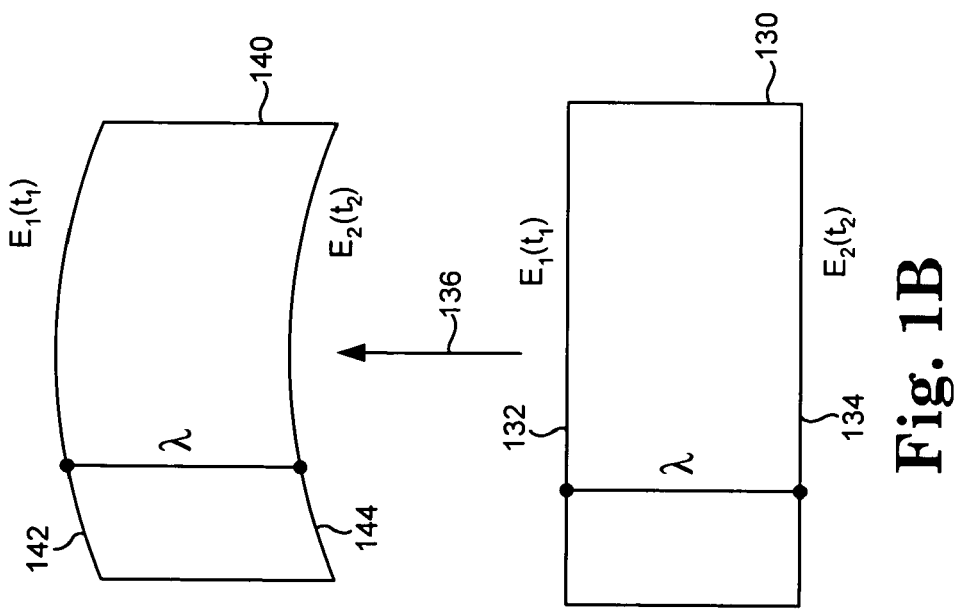

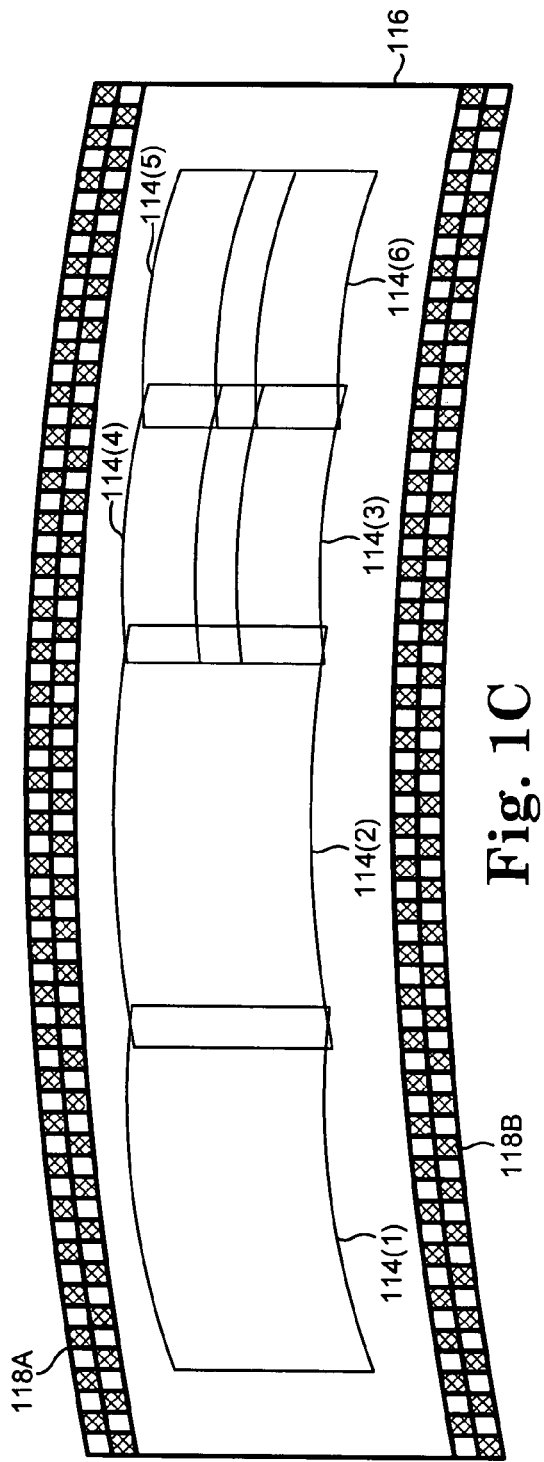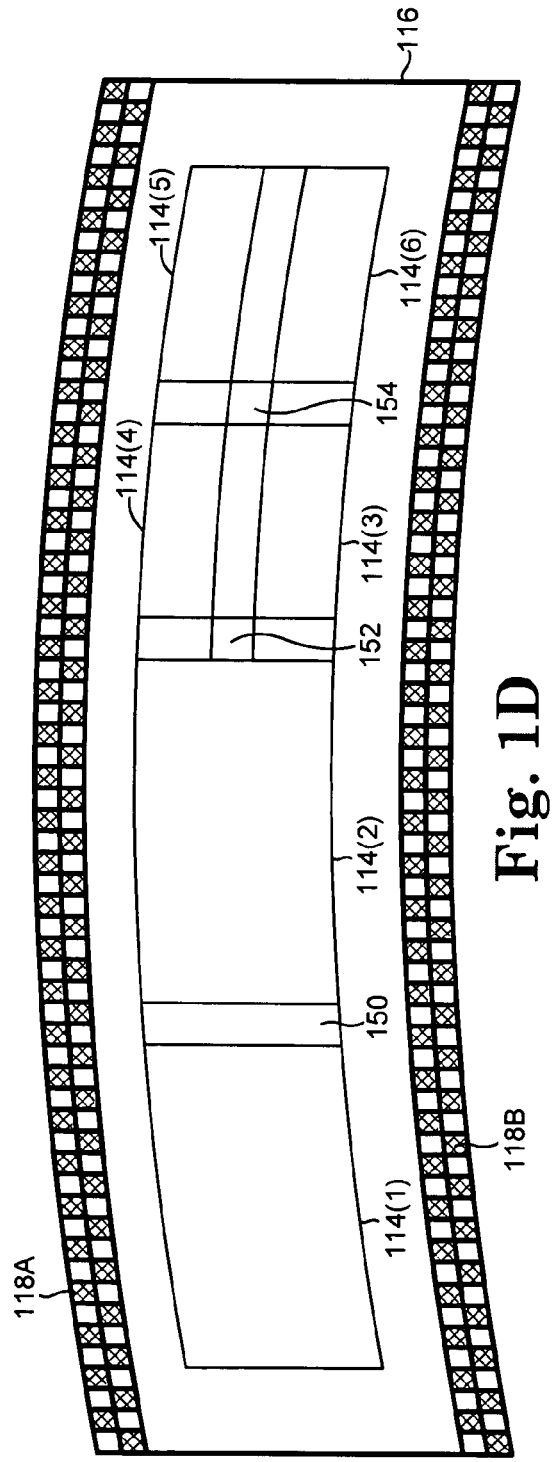

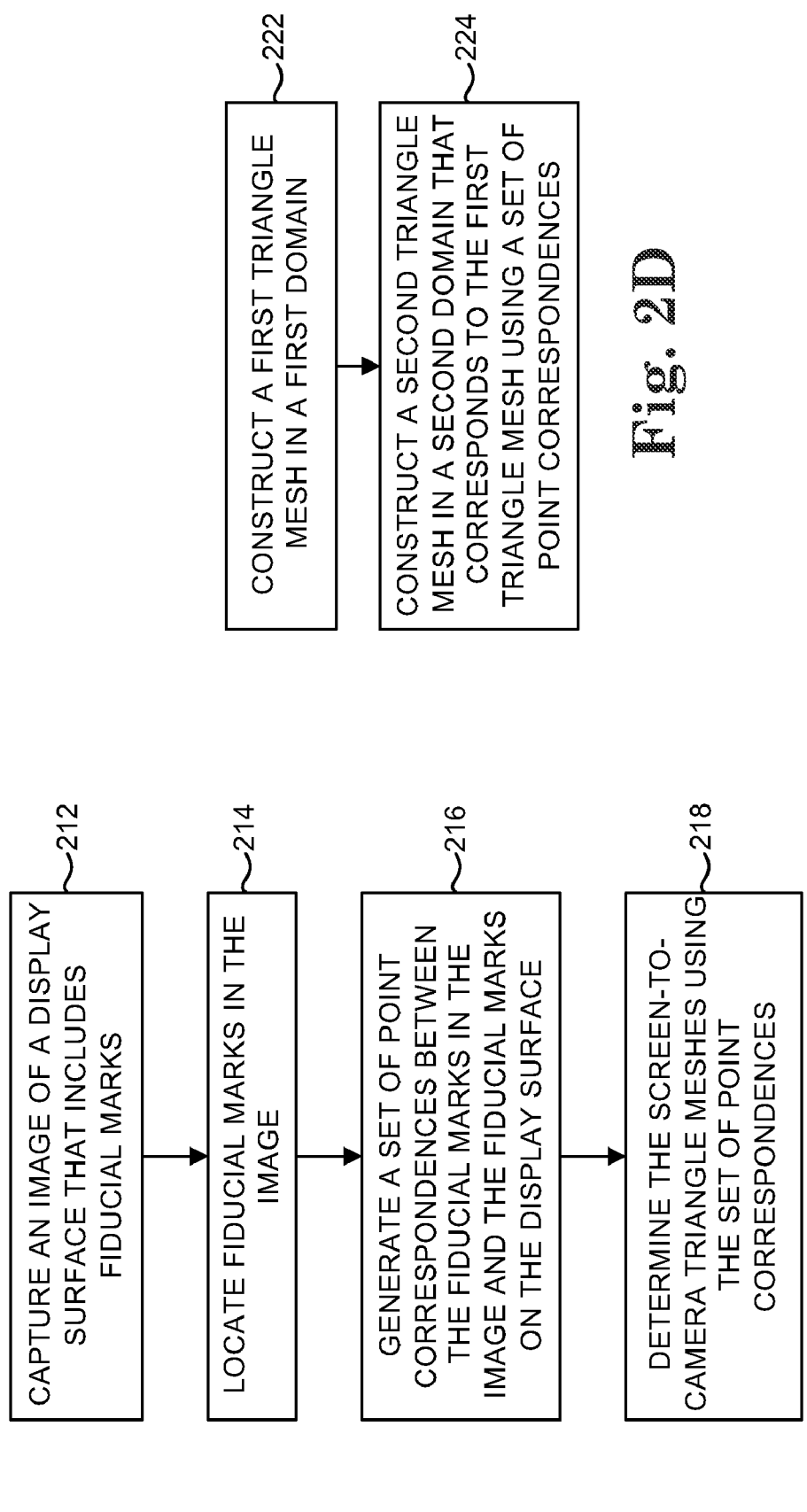

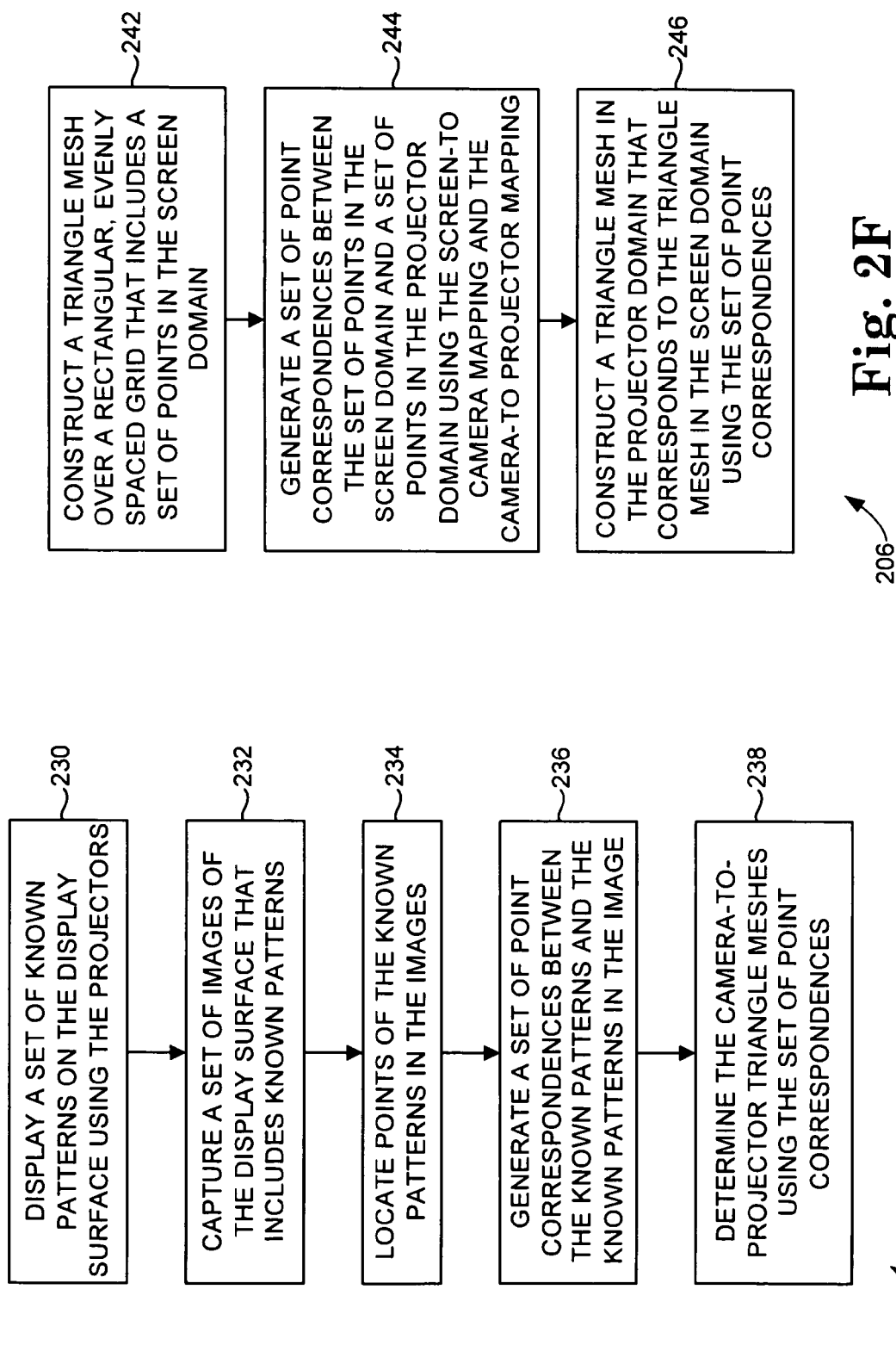

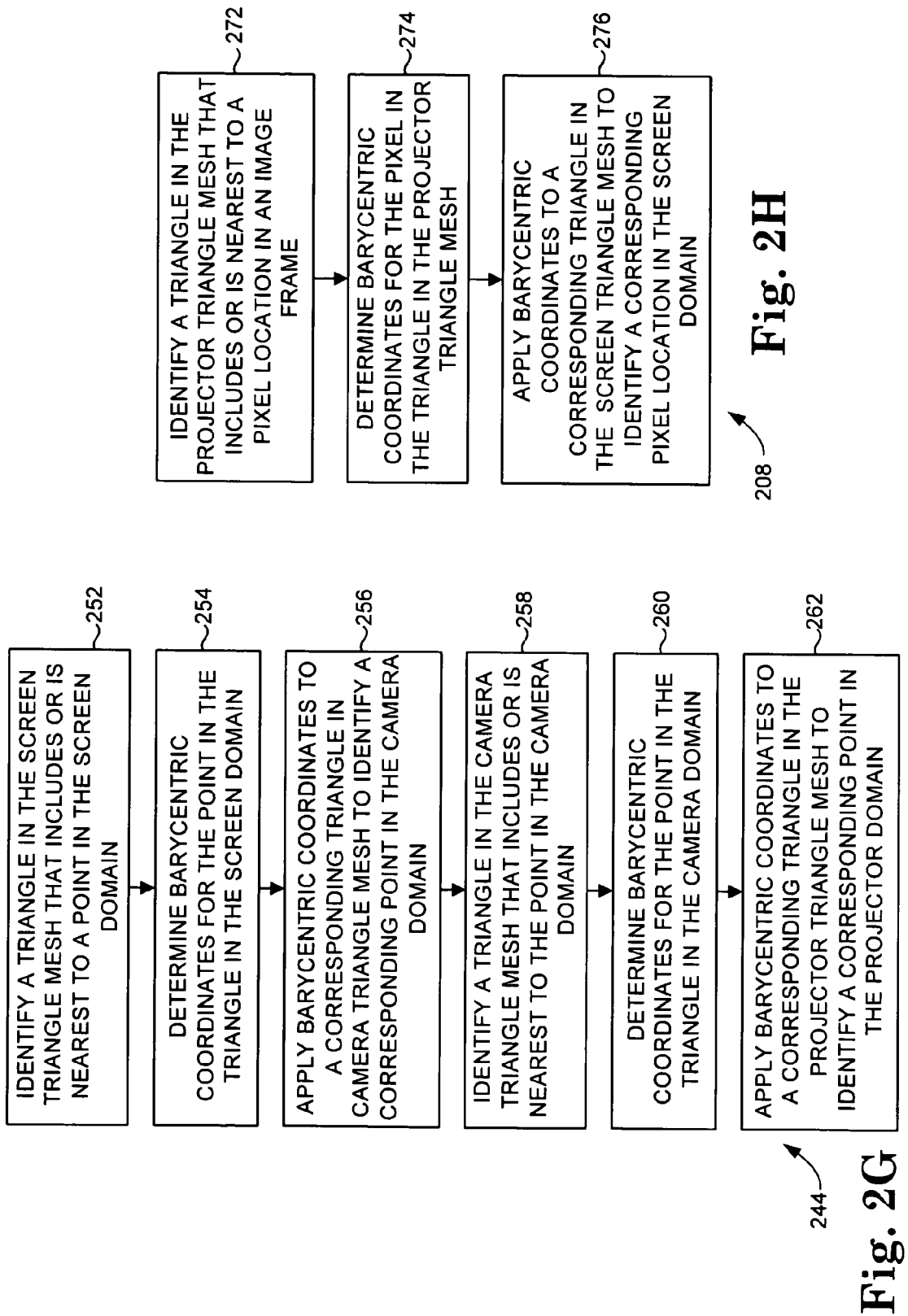

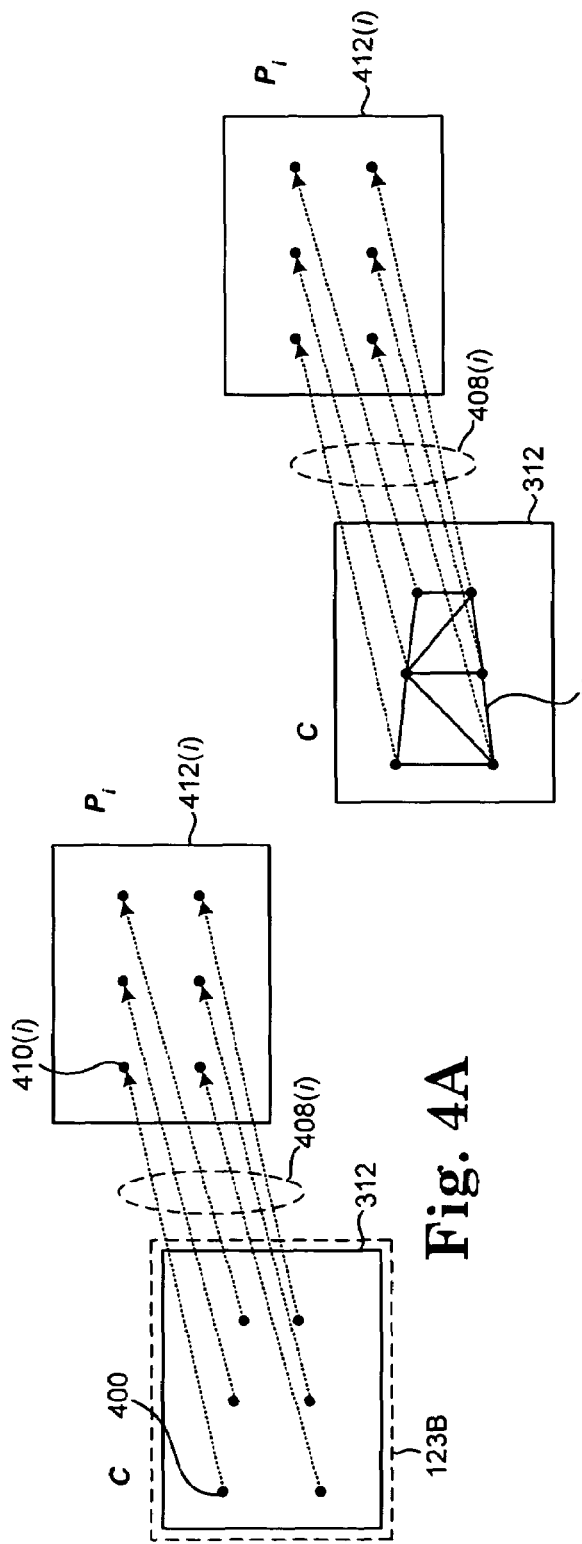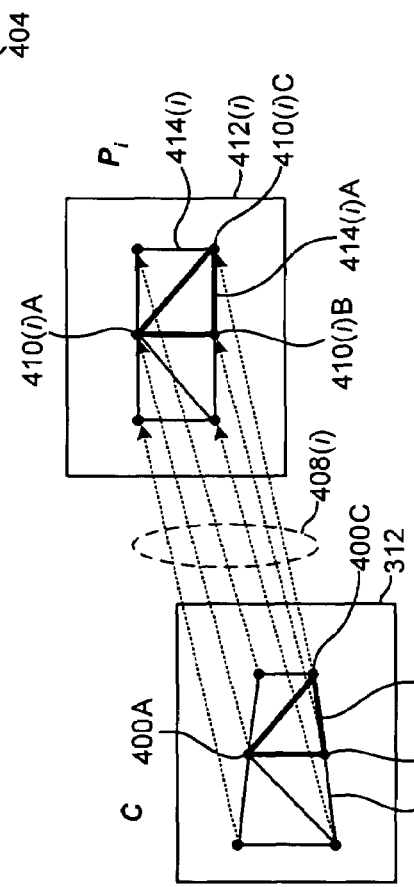

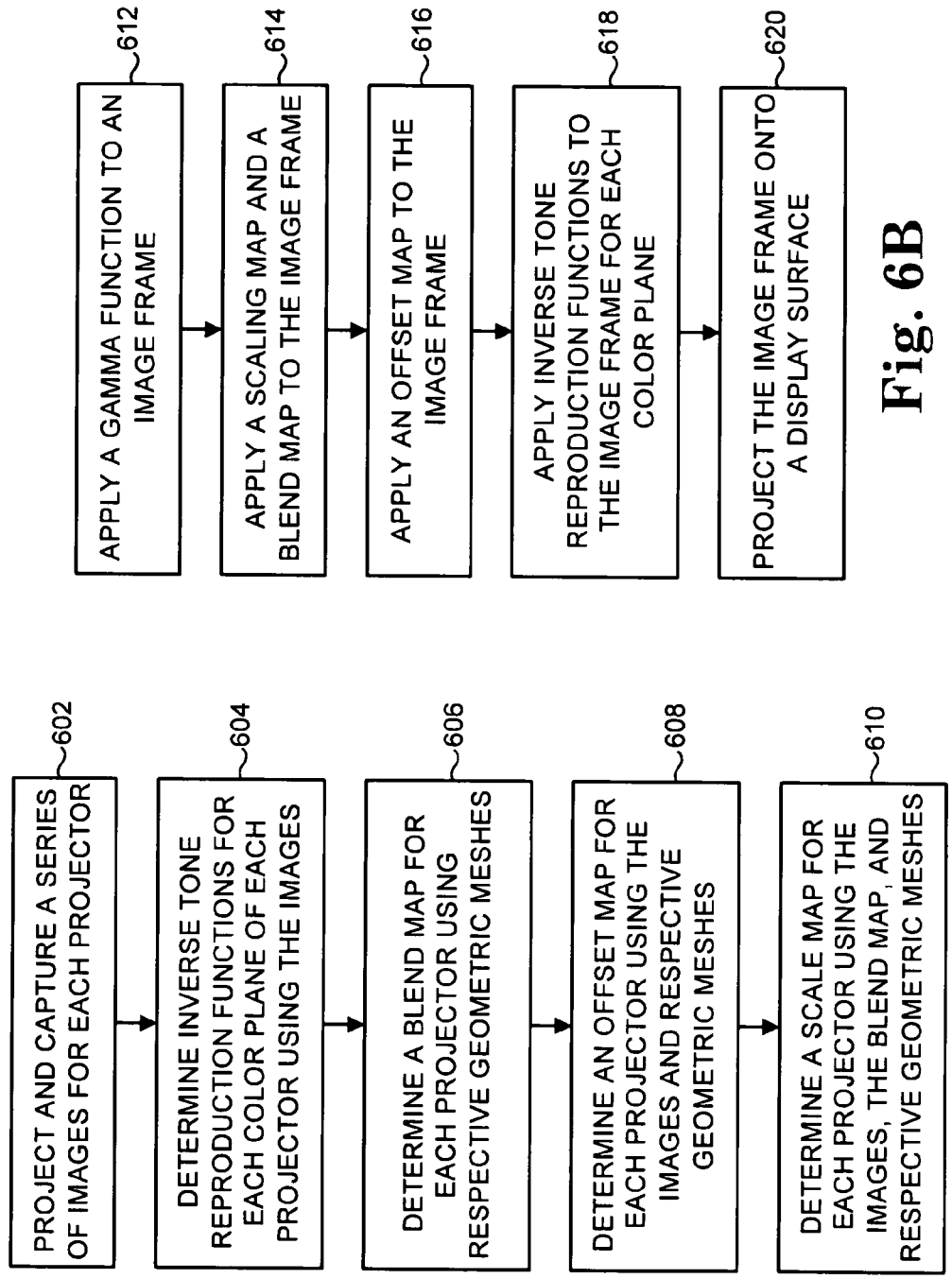

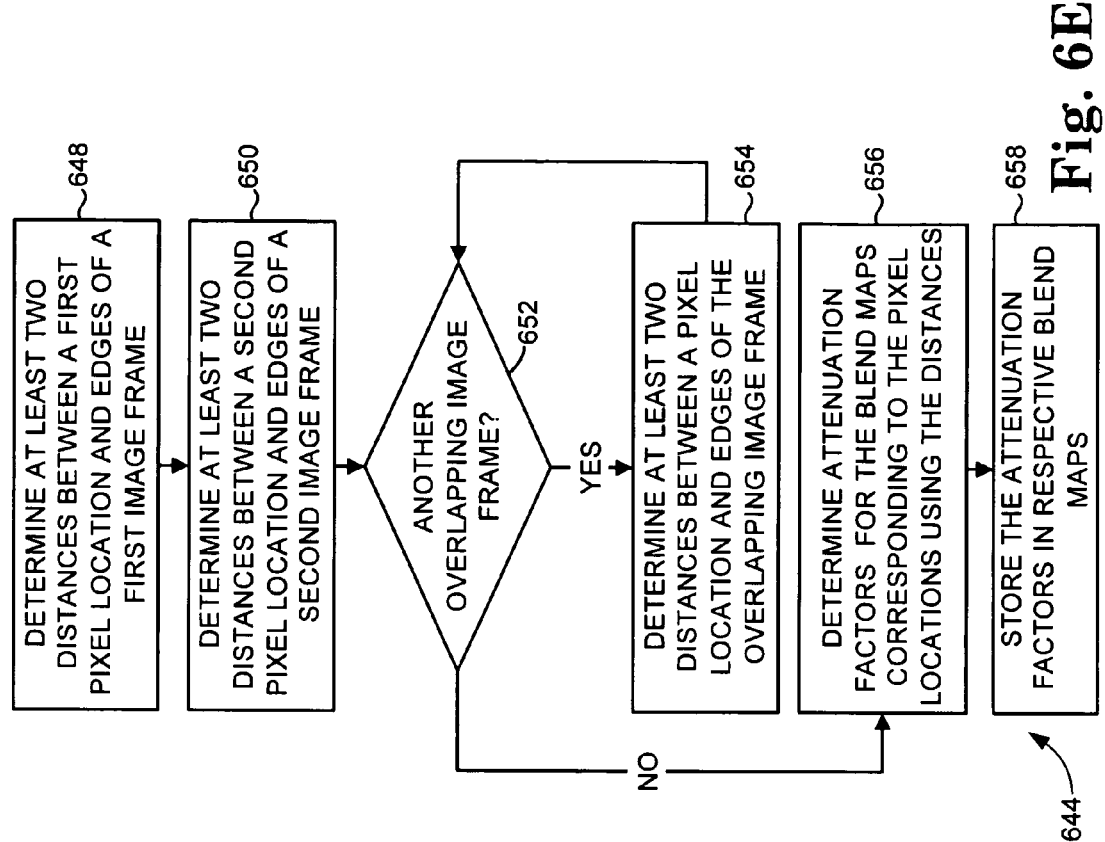

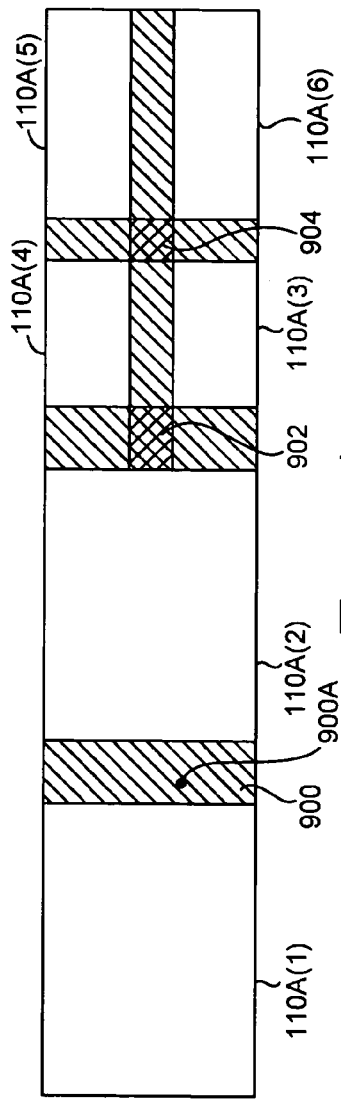
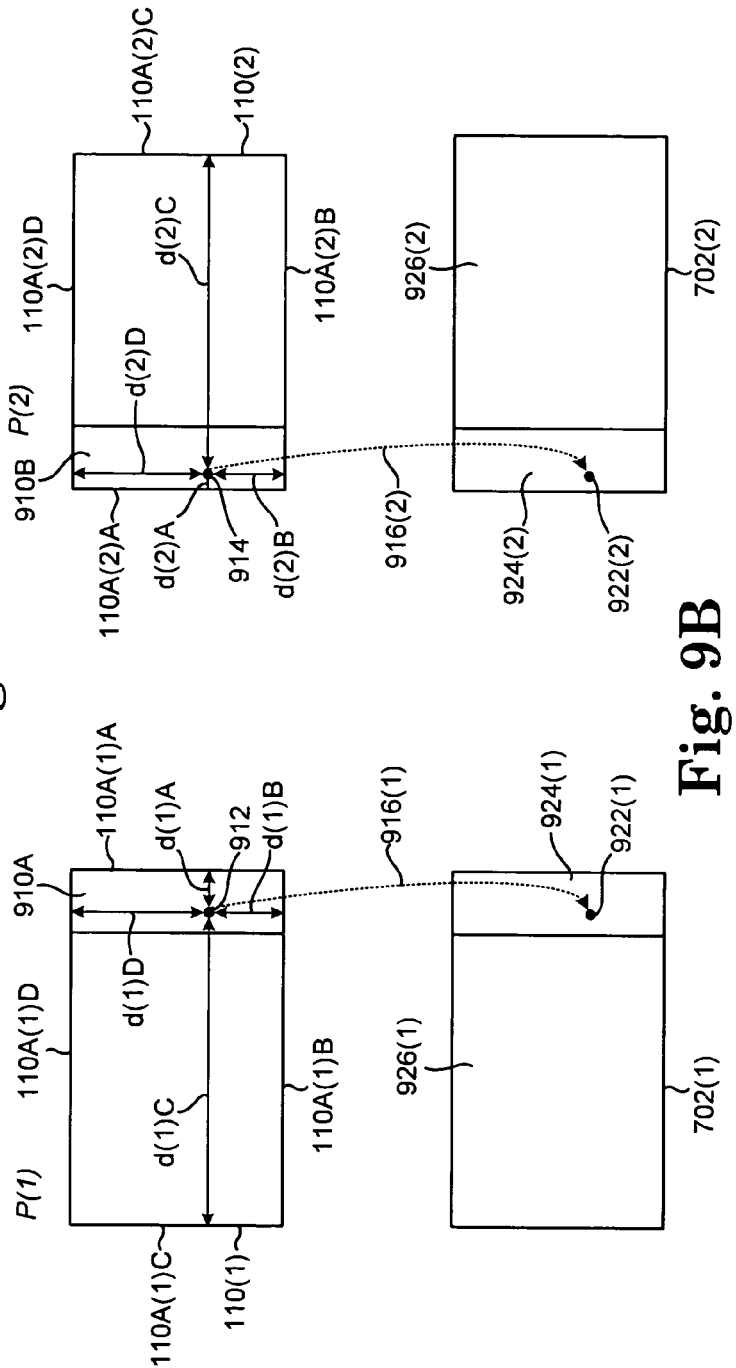
Fig. 9A
Fig. 9B

US 7,854,518 B2

MESH FOR RENDERING AN IMAGE FRAME

CROSS-REFERENCE TO RELATED APPLICATIONS

This application is related to U.S. patent application Ser. No. 11/455,148, filed on the same date as this disclosure, and entitled SYSTEM AND METHOD FOR DISPLAYING IMAGES; U.S. patent application Ser. No. 11/455,309, filed on the same date as this disclosure, and entitled BLEND MAPS FOR RENDERING AN IMAGE FRAME; U.S. patent application Ser. No. 11/455,303, filed on the same date as this disclosure, and entitled SYSTEM AND METHOD FOR GENERATING SCALE MAPS; and U.S. patent application Ser. No. 11/455,149, filed on the same date as this disclosure, and entitled SYSTEM AND METHOD FOR PROJECTING MULTIPLE IMAGE STREAMS.

BACKGROUND

Many cameras that capture images have planar image planes to produce planar images. Planar images captured by such cameras may be reproduced onto planar surfaces. When a viewer views a planar image that has been reproduced onto a planar surface, the viewer generally perceives the image as being undistorted, assuming no keystone distortion, even when the viewer views the image at oblique angles to the planar surface of the image. If a planar image is reproduced onto a non-planar surface (e.g., a curved surface) without any image correction, the viewer generally perceives the image as being distorted.

Display systems that reproduce images in tiled positions may provide immersive visual experiences for viewers. While tiled displays may be constructed from multiple, abutting display devices, these tiled displays generally produce undesirable seams between the display devices that may detract from the experience. In addition, because these display systems generally display planar images, the tiled images may appear distorted and unaligned if displayed on a non-planar surface without correction. In addition, the display of the images with multiple display devices may be inconsistent because of the display differences between the devices.

SUMMARY

One form of the present invention provides a method that includes generating a first plurality of meshes configured to map a first domain associated with a display surface having a plurality of fiducial marks to a second domain associated with an image capture device configured to capture a first image of the display surface, generating a second plurality of meshes configured to map the second domain to a third domain associated with a first projector configured to display a second image onto the display surface, and generating a first mesh configured to map the first domain to the third domain using the first plurality of meshes and the second plurality of meshes is provided.

BRIEF DESCRIPTION OF THE DRAWINGS

FIG. 1B is a schematic diagram illustrating a developable surface according to one embodiment of the present invention.

FIG. 1C is a schematic diagram illustrating the projection of partially overlapping images onto a developable surface without correction according to one embodiment of the present invention.

FIG. 1D is a schematic diagram illustrating the projection of partially overlapping images onto a developable surface with correction according to one embodiment of the present invention.

FIGS. 2A-2H are flow charts illustrating methods for geometric correction according to one embodiment of the present invention.

FIGS. 4A-4D are schematic diagrams illustrating the generation of camera-to-projector triangle meshes according to one embodiment of the present invention.

FIGS. 6A-6G are flow charts illustrating methods for photometric correction according to one embodiment of the present invention.

FIGS. 9A and 9B are schematic diagrams illustrating a process of determining blend maps according to one embodiment of the present invention.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

I. Generation and Display of Partially Overlapping Frames onto a Surface

Figure 1A:
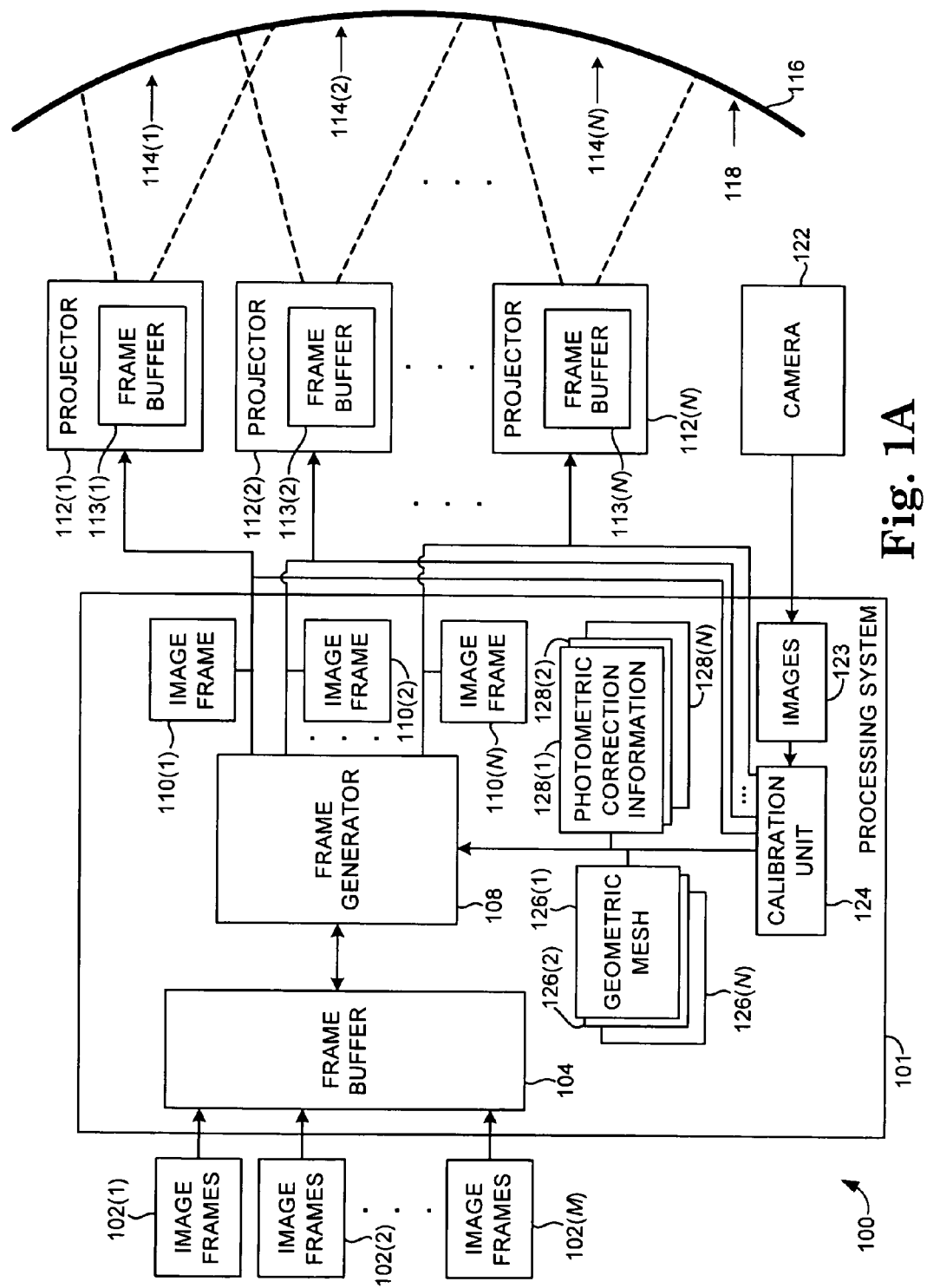
FIG. 1A is a block diagram illustrating an image display system according to one embodiment of the present invention.

FIG. 1A is a block diagram illustrating an image display system 100 according to one embodiment of the present invention. Image display system 100 includes a processing system 101, projectors 112(1) through 112(N) where N is greater than or equal to one (collectively referred to as projectors 112), and at least one camera 122. Processing system 101 includes image frame buffer 104, frame generator 108, and calibration unit 124.

Processing system 101 receives streams of image frames 102(1) through 102(M) where M is greater than or equal to one (referred to collectively as image data 102) using any suitable wired or wireless connections including any suitable network connection or connections. The streams of image frames 102(1) through 102(M) may be captured and transmitted by attached or remote image capture devices (not shown) such as cameras, provided by an attached or remote storage medium such as a hard-drive, a DVD or a CD-ROM, or otherwise accessed from one or more storage devices by processing system 101.

In one embodiment, a first image capture device captures and transmits image frames 102(1), a second image capture device captures and transmits image frames 102(2), and an Mth image capture device captures and transmits image frames 102(M), etc. The image capture devices may be arranged in one or more remote locations and may transmit the streams of image frames 102(1) through 102(M) across one or more networks (not shown) using one or more network connections.

In one embodiment, the number M of streams of image frames 102 is equal to the number N of projectors 112. In other embodiments, the number M of streams of image frames 102 is greater than or less than the number N of projectors 112.

Processing system 101 processes the streams of image frames 102(1) through 102(M) and generates projected images 114(1) through 114(N) (referred to collectively as projected images 114). Image frames 102 may be in any suitable video or still image format such as MPEG-2 (Moving Picture Experts Group), MPEG-4, JPEG (Joint Photographic Experts Group), JPEG 2000, TIFF (Tagged Image File Format), BMP (bit mapped format), RAW, PNG (Portable Network Graphics), GIF (Graphic Interchange Format), XPM (X Window System), SVG (Scalable Vector Graphics), and PPM (Portable Pixel Map). Image display system 100 displays images 114 in at least partially overlapping positions (i.e., in a tiled format) on a display surface 116.

Image frame buffer 104 receives and buffers image frames 102. Frame generator 108 processes buffered image frames 102 to form image frames 110. In one embodiment, frame generator 108 processes a single stream of image frames 102 to form one or more image frames 110. In other embodiments, frame generator 108 processes multiple streams of image frames 102 to form one or more image frames 110.

Frame generator 108 processes image frames 102 to define image frames 110(1) through 100(N) (collectively referred to as frames 110) using respective geometric meshes 126(1) through 126(N) (collectively referred to as geometric meshes 126) and respective photometric correction information 128(1) through 128(N) (collectively referred to as photometric correction information 128). Frame generator 108 provides frames 110(1) through 110(N) to projectors 112(1) through 112(N), respectively.

Projectors 112(1) through 112(N) store frames 110(1) through 110(N) in image frame buffers 113(1) through 113(N) (collectively referred to as image frame buffers 113), respectively. Projectors 112(1) through 112(N) project frames 110(1) through 110(N), respectively, onto display surface 116 to produce projected images 114(1) through 114(N) for viewing by one or more users. Projectors 112 project frames 110 such that each displayed image 114 at least partially overlaps with another displayed image 114.

Projected images 114 are defined to include any combination of pictorial, graphical, or textural characters, symbols, illustrations, or other representations of information. Projected images 114 may be still images, video images, or any combination of still and video images.

Display surface 116 includes any suitable surface configured to display images 114. In one or more embodiments described herein, display surface 116 forms a developable surface. As used herein, the term developable surface is defined as a surface that is formed by folding, bending, cutting, and otherwise manipulating a planar sheet of material without stretching the sheet. A developable surface may be planar, piecewise planar, or non-planar. A developable surface may form a shape such as a cylindrical section or a parabolic section. As described in additional detail below, image display system 100 is configured to display projected images 114 onto a developable surface without geometric distortion.

By displaying images 114 onto a developable surface, images 114 are projected to appear as if they have been "wallpapered" to the developable surface where no pixels of images 114 are stretched. The wallpaper-like appearance of images 114 on a developable surface appears to a viewer to be undistorted.

A developable surface can be described by the motion of a straight line segment through three-dimensional (3D) space. FIG. 1B is a schematic diagram illustrating a planar surface 130. As shown in FIG. 1B, planar surface 130 is a shape that can be created by moving a straight line segment $\lambda$ through 3D space. $E_1(t_1)$ and $E_2(t_2)$ represent endpoint curves 132 and 134 traced by the movement of the endpoints of the line segment $\lambda$. Endpoint curves 132 and 134 swept out in 3D space by the endpoints of the line segment $\lambda$ are sufficient to define the entire surface 130. With planar developable surface 130, endpoint curves 132 and 134 are straight, parallel lines.

When planar surface 130 is curved into a non-planar developable surface 140 without stretching as indicated by an arrow 136, the straight endpoint curves 132 and 134 become curved endpoint curves 142 and 144 in the example of FIG. 1B. Curving planar surface 130 into non-planar surface 140 may be thought of as analogous to bending, folding, or wallpapering planar surface 130 onto a curved surface without stretching. Endpoint curves 142 and 144 swept out in 3D space by the endpoints of the line segment $\lambda$ are sufficient to define the entire surface 140.

Image display system 100 may be configured to construct a two-dimensional (2D) coordinate system corresponding to planar surface 130 from which non-planar surface 140 was created using a predetermined arrangement of identifiable points in fiducial marks 118 on display surface 116. The geometry of the predetermined arrangement of identifiable points may be described according to distance measurements between the identifiable points. The distances between a predetermined arrangement of points may all be scaled by a single scale factor without affecting the relative geometry of the points, and hence the scale of the distances between the points on display surface 116 does not need to be measured. In the embodiment shown in FIG. 1B, the predetermined arrangement of points lie in fiducial marks 118 along the curved endpoint curves $E_1(t_1)$ and $E_2(t_2)$ in display surface 116. These endpoint curves define a 2D coordinate system in the planar surface 130 created by flattening curved display surface 140. Specifically, $E_1(t_1)$ and $E_2(t_2)$ are parallel in surface 130, with the connecting line segment λ lying in the orthogonal direction at each t.

Non-planar developable display surfaces may allow a viewer to feel immersed in the projected scene. In addition, such surfaces may fill most or all of a viewer's field of view which allows scenes to be viewed as if they are at the same scale as they would be seen in the real world.

Image display system 100 attempts to display images 114 on display surface 116 with a minimum amount of distortion, smooth brightness levels, and a smooth color gamut. To do so, frame generator 108 applies geometric and photometric correction to image frames 102 using geometric meshes 126 and photometric correction information 128, respectively, in the process of rendering frames 110. Geometric correction is described in additional detail in Section II below, and photometric correction is described in additional detail in Section III below.

Frame generator 108 may perform any suitable image decompression, color processing, and conversion on image frames 102. For example, frame generator 108 may convert image frames 102 from the YUV-4:2:0 format of an MPEG2 video stream to an RGB format. In addition, frame generator 108 may transform image frames 102 using a matrix multiply to translate, rotate, or scale image frames 102 prior to rendering. Frame generator 108 may perform any image decompression, color processing, color conversion, or image transforms prior to rendering image frames 102 with geometric meshes 126 and photometric correction information 128.

Calibration unit 124 generates geometric meshes 126 and photometric correction information 128 using images 123 captured by at least one camera 122 during a calibration process. Camera 122 may be any suitable image capture device configured to capture images 123 of display surface 116. Camera 122 captures images 123 such that the images include fiducial marks 118 (shown as fiducial marker strips 118A and 118B in FIGS. 1C and 1D) on display surface 116. Fiducial marks 118 may be any suitable pattern or set of patterns that include a set of points with predetermined arrangement of the points where the patterns are recognizable by a pattern recognition algorithm. Fiducial marks 118 may be permanently attached to display surface 116 or may be applied to display surface 116 only during the calibration process. Calibration unit 124 uses the predetermined arrangement of points to create a mapping of display surface 116. The predetermined arrangement of identifiable points may be described by distance measurements between the identifiable points in the 2D space of flattened display surface 116, where the scale of the distance measurements is not necessarily known. Fiducial marks 118 may be located outside of the display area on display surface 116 where images 114 will appear when displayed by projectors 112. In the embodiment shown in FIGS. 1C and 1D, fiducial marker strips 118A and 118B form a black and white checkerboard patterns at the top and bottom of display surface 116 where the distance between the corners of the checkerboard patterns in the horizontal direction is known by image display system 10. In other embodiments, fiducial marks 118 may form any other suitable pattern. In further embodiments, fiducial marks 118 may also consist of active light emitters, such as LEDs, lasers, or infrared light sources. These light sources may optionally be deactivated during display of images 114 on display surface 116.

In one embodiment, camera 122 includes a single camera configured to capture image 123 that include the entirety of display surface 116. In other embodiments, camera 122 includes multiple cameras each configured to capture images 123 that include a portion of display surface 116 where the combined images 123 of the multiple cameras include the entirety of display surface 116.

FIG. 1C is a schematic diagram illustrating the projection of partially overlapping images 114(1) through 114(6) onto a non-planar developable display surface 116 without correction. In FIG. 1B, images 114(1) through 114(6) appear as a set of distorted (i.e., warped) and disjointed (i.e., unaligned) images. Each image 114(1) through 114(6) appears distorted because of the display of a planar image onto a non-planar surface, and the set of images 114(1) through 114(6) appears disjointed because images 114 are not spatially aligned or otherwise displayed in a uniform way on display surface 116.

Without photometric correction, regions of overlap between images 114 may appear brighter than non-overlapping regions. In addition, variations between projectors 112 may result in variations in brightness and color gamut between projected images 114(1) through 114(6).

FIG. 1D is a schematic diagram illustrating the projection of images 114(1) through 114(6) onto non-planar developable display surface 116 with geometric and photometric correction. By applying geometric correction as described in Section II below, frame generator 108 unwarps, spatially aligns, and crops images 114(1) through 114(6) to minimize distortion in the display of images 114(1) through 114(6) on display surface 116. Frame generator 108 also spatially aligns images 114(1) through 114(6) as shown in FIG. 1D.

In addition, frame generator 108 may smooth any variations in brightness and color gamut between projected images 114(1) through 114(6) by applying photometric correction as described in Section III below. For example, frame generator 108 may smooth variations in brightness in overlapping regions such as an overlapping region 150 between images 114(1) and 114(2), an overlapping region 152 between images 114(2), 114(3), and 114(4), and an overlapping region 154 between images 114(3), 114(4), 114(5), and 114(6). Frame generator 108 may smooth variations in brightness between images 114 displayed with different projectors 112.

Processing system 101 includes hardware, software, firmware, or a combination of these. In one embodiment, one or more components of processing system 101 are included in a computer, computer server, or other microprocessor-based system capable of performing a sequence of logic operations. In addition, processing can be distributed throughout the system with individual portions being implemented in separate system components, such as in a networked or multiple computing unit environment.

Image frame buffer 104 includes memory for storing one or more image frames of the streams of image frames 102 for one or more image frames 110. Thus, image frame buffer 104 constitutes a database of one or more image frames 102. Image frame buffers 113 also include memory for storing frames 110. Although shown as separate frame buffers 113 in projectors 112 in the embodiment of FIG. 1, frame buffers 113 may be combined (e.g., into a single frame buffer) and may be external to projectors 112 (e.g., in processing system 101 or between processing system 101 and projectors 112) in other embodiments. Examples of image frame buffers 104 and 113 include non-volatile memory (e.g., a hard disk drive or other persistent storage device) and volatile memory (e.g., random access memory (RAM)).

It will be understood by a person of ordinary skill in the art that functions performed by processing system 101, including frame generator 108 and calibration unit 124, may be implemented in hardware, software, firmware, or any combination thereof. The implementation may be via one or more microprocessors, graphics processing units (GPUs), programmable logic devices, or state machines. In addition, functions of frame generator 108 and calibration unit 124 may be performed by separate processing systems in other embodiments. In such embodiments, geometric meshes 126 and photometric correction information 128 may be provided from calibration unit 124 to frame generator 108 using any suitable wired or wireless connection or any suitable intermediate storage device. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

II. Geometric Calibration and Correction of Displayed Images

Image display system 100 applies geometric correction to image frames 102 as part of the process of rendering image frames 110. As a result of the geometric correction, image display system 100 displays images 114 on display surface 116 using image frames 110 such that viewers may view images as being undistorted for all viewpoints of display surface 116.

Image display system 100 generates geometric meshes 126 as part of a geometric calibration process. Image display system 100 determines geometric meshes 126 using predetermined arrangements between points of fiducial marks 118. Image display system 100 determines geometric meshes 126 without knowing the shape or any dimensions of display surface 116 other than the predetermined arrangements of points of fiducial marks 118.

Frame generator 108 renders image frames 110 using respective geometric meshes 126 to unwarp, spatially align, and crop frames 102 into shapes that are suitable for display on display surface 116. Frame generator 108 renders image frames 110 to create precise pixel alignment between overlapping images 114 in the overlap regions (e.g., regions 150, 152, and 152 in FIG. 1D).

In the following description of generating and using geometric meshes 126, four types of 2D coordinate systems will be discussed. First, a projector domain coordinate system, $P_i$, represents coordinates in frame buffer 113 of the ith projector 112. Second, a camera domain coordinate system, $C_j$, represents coordinates in images 123 captured by the jth camera 122. Third, a screen domain coordinate system, S, represents coordinates in the plane formed by flattening display surface 116. Fourth, an image frame domain coordinate system, I, represent coordinates within image frames 102 to be rendered by frame generator 108.

Image display system 100 performs geometric correction on image frames 102 to conform images 114 from image frames 102 to display surface 116 without distortion. Accordingly, in the case of a single input image stream, the image frame domain coordinate system, I, of image frames 102 may be considered equivalent to the screen domain coordinate system, S, up to a scale in each of the two dimensions. By normalizing both coordinate systems to the range [0, 1], the image frame domain coordinate system, I, becomes identical to the screen domain coordinate system, S. Therefore, if mappings between the screen domain coordinate system, S, and each projector domain coordinate system, $P_i$, are determined, then the mappings from each projector domain coordinate system, $P_i$, to the image frame domain coordinate system, I, may determined.

Let $P_i(\vec{s})$ be a continuous-valued function that maps 2D screen coordinates $\vec{s}=(s_x,s_y)$ in S to coordinates $\vec{p}=(p_{x,i},p_{y,i})$ of the ith projector 112's frame buffer 113. $P_i$ is constructed as a composition of two coordinate mappings as shown in Equation 1:

$$\vec{p}_i = P_i(\vec{s}) = C_{i,j}(S_j(\vec{s})) \qquad (1)$$

where $S_j(\vec{s})$ is a 2D mapping from display surface 116 to the image pixel locations of the jth observing camera 122, and $C_{i,j}(\vec{c}_j)$ is a 2D mapping from image pixel locations $\vec{c}=(c_{x,j},c_{y,j})$ of the jth observing camera 122 to the ith projector 112's frame buffer 113. If all $S_j$ and $C_{i,j}$ are invertible mappings, the mappings from projector frame buffers to the flattened screen are constructed similarly from the inverses of the $S_j$ and $C_{i,j}$ mappings, as shown in Equation 2:

$$\vec{s} = P_i^{-1}(\vec{p}_i) = S_j^{-1}(C_{i,j}^{-1}(\vec{p}_i)) \qquad (2)$$

Hence, all coordinate transforms required by the geometric correction can be derived from the $S_j$ and $C_{i,j}$ mappings.

To handle a broad set of screen shapes, image display system 100 constructs generalized, non-parametric forms of these coordinate mappings. Specifically, for each mapping, image display system 100 uses a mesh-based coordinate transform derived from a set of point correspondences between the coordinate systems of interest.

Given a set of point correspondences between two 2D domains A and B, image display system 100 maps a point location $\vec{a}$ in A to a coordinate $\vec{b}$ in B as follows. Image display system 100 applies Delaunay triangulation to the points in A to create a first triangle mesh and then constructs the corresponding triangle mesh (according to the set of point correspondences) in B. To determine a point $\vec{b}$ that corresponds to a point $\vec{a}$, image display system 100 finds the triangle in the triangle mesh in domain A that contains $\vec{a}$, or whose centroid is closest to it, and computes the barycentric coordinates of $\vec{a}$ with respect to that triangle. Image display system 100 then selects the corresponding triangle from the triangle mesh in domain B and computes $\vec{b}$ as the point having these same barycentric coordinates with respect to the triangle in B. Image display system 100 determines a point $\vec{a}$ that corresponds to a point $\vec{b}$ similarly.

The geometric meshes used to perform coordinate mappings have the advantage of allowing construction of coordinate mappings from point correspondences where the points in either domain may be in any arrangement other than collinear. This in turn allows greater flexibility in the calibration methods used for measuring the locations of the points involved in the point correspondences. For example, the points on display surface 116 may be located entirely outside the area used to display projected images 114, so that these points do not interfere with displayed imagery, and may be left in place while the display is in use. Other non-parametric representations of coordinate mappings, such as 2D lookup tables, are generally constructed from 2D arrays of point correspondences. In many instances it is not convenient to use 2D arrays of points. For example, a 2D array of points on display surface 116 may interfere with displayed imagery 114, so that these points may need to be removed after calibration and prior to use of the display. Also, meshes may more easily allow for spatial variation in the fineness of the coordinate mappings, so that more point correspondences and triangles may be used in display surface areas that require finer calibration. Finer mesh detail may be localized independently to specific 2D regions within meshes by using more point correspondences in these regions, whereas increased fineness in the rows or columns of a 2D lookup table generally affects a coordinate mapping across the entire width or height extent of the mapping. In many instances, a mesh-based representation of a coordinate mapping may also be more compact, and hence require less storage and less computation during the mapping process, than a similarly accurate coordinate mapping stored in another non-parametric form such as a lookup table.

To determine the correct projector frame buffer contents needed to render the input image like wallpaper on the screen, image display system 100 applies Equation 2 to determine the screen location $\vec{s}$ that each projector pixel $\vec{p}$ lights up. If $\vec{s}$ is normalized to [0, 1] in both dimensions, then this is also the coordinate for the input image pixel whose color should be placed in $\vec{p}$, since wallpapering the screen effectively equates the 2D flattened screen coordinate systems S with the image coordinate system I. For each projector 112, image display system 100 uses Equation 2 to compute the image coordinates corresponding to each location on a sparsely sampled rectangular grid (e.g., a 20×20 grid) in the screen coordinate space. Graphics hardware fills the projector frame buffer via texture mapping image interpolation. Hence, the final output of the geometric calibration is one triangle mesh 126 per projector 112, computed on the rectangular grid.

Because the method just described includes a dense mapping to the physical screen coordinate system, it corrects for image distortion caused not only by screen curvature, but also due to the projector lenses. Furthermore, the lens distortion of the observing camera(s) 122, inserted by interposing their coordinate systems between those of the projectors and the screen, does not need to be calibrated and corrected. In fact, the method allows use of cameras 122 with extremely wide angle lenses, without any need for camera image undistortion. Because of this, image display system 100 may be calibrated with a single, wide-angle camera 122. This approach can even be used to calibrate full 360 degree displays, by placing a conical mirror in front of the camera lens to obtain a panoramic field-of-view.

Methods of performing geometric correction will now be described in additional detail with reference to the embodiments of FIGS. 2A-2H. FIGS. 2A-2H are flow charts illustrating methods for geometric correction. FIG. 2A illustrates the overall calibration process to generate geometric meshes 126, and FIG. 2B illustrates the rendering process using geometric meshes 126 to perform geometric correction on image frames 102. FIGS. 2C through 2H illustrate additional details of the functions of the blocks shown in FIGS. 2A and 2B. The embodiments of FIGS. 2A-2H will be described with reference to image display system 100 as illustrated in FIG. 1.

The methods of FIGS. 2A-2H will be described for an embodiment of image display system 100 that includes a single camera 122. In embodiments that include multiple cameras 122, then methods of FIGS. 2A-2H may be generalized for multiple cameras 122 using Equations 1 and 2 above. With multiple cameras 122, image display system 100 may also align meshes from multiple cameras 122 onto a single mesh in the camera domain. When fields-of-view of multiple cameras overlap the same screen or projector region, mesh-based coordinate mapping results from different cameras 122 may be combined in a weighted average, with the weights optionally being determined by the distance of the location from the edges of the camera fields-of-view. In addition, image display system 100 registers the different camera coordinate systems using projector or screen points from their overlap regions, and/or using any of the many methods for multi-camera geometric calibration known in art.

In the embodiments described below, geometric meshes 126 will be described as triangle meshes where each triangle mesh forms a set of triangles where each triangle is described with a set of three coordinate locations (i.e., vertices). Each triangle in a triangle mesh corresponds to another triangle (i.e., a set of three coordinate locations or vertices) in another triangle mesh from another domain. Accordingly, corresponding triangles in two domains may be represented by six coordinate locations—three coordinate locations in the first domain and three coordinate locations in the second domain.

In other embodiments, geometric meshes 126 may be meshes with polygons with z sides, where z is greater than or equal to four. In these embodiments, corresponding polygons in two domains may be represented by 2z ordered coordinate locations—z ordered coordinate locations in the first domain and z ordered coordinate locations in the second domain.

In FIG. 2A, calibration unit 124 generates screen-to-camera triangle meshes as indicated in a block 202. In particular, calibration unit 124 generates a triangle mesh in the screen domain and a corresponding triangle mesh in the camera domain. Calibration unit 124 generates these triangle meshes using knowledge of a predetermined arrangement of fiducial marks 118, and an image 123 captured by camera 122 that includes these fiducial marks 118 on display surface 116.

Calibration unit 124 also generates camera-to-projector triangle meshes for each projector 112 as indicated in a block 204. In particular, calibration unit 124 generates a second triangle mesh in the camera domain and a corresponding triangle mesh in the projector domain for each projector 112. Calibration unit 124 generates these triangle meshes from known pattern sequences displayed by projectors 112 and a set of images 123 captured by camera 122 viewing display surface 116 while these known pattern sequences are projected by projectors 112.

Calibration unit 124 generates a screen-to-projector triangle mesh, also referred to as geometric mesh 126, for each projector 112 as indicated in a block 206. Calibration unit 124 generates geometric meshes 126 such that each geometric mesh 126 includes a set of points that are associated with a respective projector 112. Calibration unit 124 identifies the set of points for each projector 112 using the screen-to-camera triangle meshes and the camera-to-projector triangle meshes as described in additional detail below with reference to FIGS. 2F and 2G.

Referring to FIG. 2B, frame generator 108 renders frames 110 for each projector 112 using the respective geometric mesh 126 as indicated in a block 208. Frame generator 108 provides respective frames 110 to respective frame buffers 113 in respective projectors 112. Projectors 112 project respective frames 110 onto display surface 116 in partially overlapping positions as indicated in a block 210. Because each geometric mesh 126 defines a mapping between display surface 116 and a frame buffer 113 of a respective projector 112, frame generator 108 uses geometric meshes 126 to warp frames 102 into frames 110 such that frames 110 appear spatially aligned and without distortion when projected by projectors 112 as images 114 in partially overlapping positions on display surface 116. Frame generator 108 interpolates the pixel values for frames 110 using the geometric meshes 126 as described in additional detail below with reference to FIG. 2H.

FIG. 2C illustrates a method for performing the function of block 202 of FIG. 2A. Namely, the method of FIG. 2C illustrates one embodiment of generating screen-to-camera triangle meshes. The method of FIG. 2C will be described with reference to FIGS. 3A-3D.

In FIG. 2C, camera 122 captures an image 123A (shown in FIG. 3A) of display surface 116 that includes fiducial marks 118 as indicated in a block 212. Fiducial marks 118 include points identifiable in image 123A by calibration unit 124 where the arrangement of the points is predetermined. For example, fiducial marks 118 may form a black and white checkerboard pattern where the distances between all adjacent corners are the same linear distance.

Calibration unit 124 locates fiducial marks 118 in image 123A as indicated in a block 214. Calibration unit 124 locates fiducial marks 118 to identify points where points are located according to a predetermined arrangement on display screen 116. For example, where fiducial marks 118 form a black and white checkerboard pattern as in the example shown in FIG. 1D, calibration unit 124 may detect the points using a standard corner detector along with the following algorithm such that the detected corners form the points located according to a predetermined arrangement on display screen 116.

In one embodiment, calibration unit 124 assumes the center of image 123A is inside the region of display surface 116 to be used for display, where this region is at least partially bounded by strips of fiducials marks 118, and where the region contains no fiducial marks 118 in its interior. The boundary of the region along which fiducial marks 118 appear may coincide with the boundary of display surface 116, or may fall entirely or partially in the interior of display surface 116. FIG. 1C shows example strips 118A and 118B located along the top and bottom borders of display surface 116. The strips contain checkerboard patterns, with all squares having equal size. The physical size of these squares is predetermined, and therefore the physical distances along the screen surface between successive corners on the interior horizontal line within each strip is known.

Calibration unit 124 begins searching from the center of camera image 123A going upward for the lowest detected corner. Referring back to fiducial marker strip 118A in FIG. 1D, calibration unit 124 may assume that this lowest detected corner (i.e., the first fiducial mark) is on the bottom row of fiducial marker strip 118A. Calibration unit 124 finds the next lowest corner searching upward (e.g., an interior corner of the checkerboard pattern) and saves the vertical distance from the first corner to the next lowest corner as a vertical pattern step.

Calibration unit 124 searches left from the interior corner for successive corners along fiducial marker strip 118A at the step distance (estimating the horizontal pattern step to be equal to the vertical pattern step), plus or minus a tolerance, until no more corners are detected in the expected locations. In traversing the image of the strip of fiducial marker strip 118A, calibration unit 124 predicts the location of the next corner in sequence by extrapolating using the pattern step to estimate the 2D displacement in camera image 123A from the previous corner to the next corner. By doing so, calibration unit 124 may follow accurately the smooth curve of the upper strip of fiducial marks 118 which appears in image 123A.

Calibration unit 124 then returns to the first fiducial location and continues the search to the right in a manner analogous to that described for searching to the left. Calibration unit 124 subsequently returns to the center of camera image 123A, and searches downward to locate a first corner in fiducial marks 118B. This corner is assumed to be on the top row of fiducial marker strip 118B. The procedure used for finding all corners in upper fiducial strip 118A is then carried out in an analogous way for the lower strip, this time using the corners in the row of fiducial strip 118B below the row containing the first detected corner. Searches to the left and right are carried out as before, and locations of all corners in the middle row of fiducial strip 118B are stored.

Figure 3A:
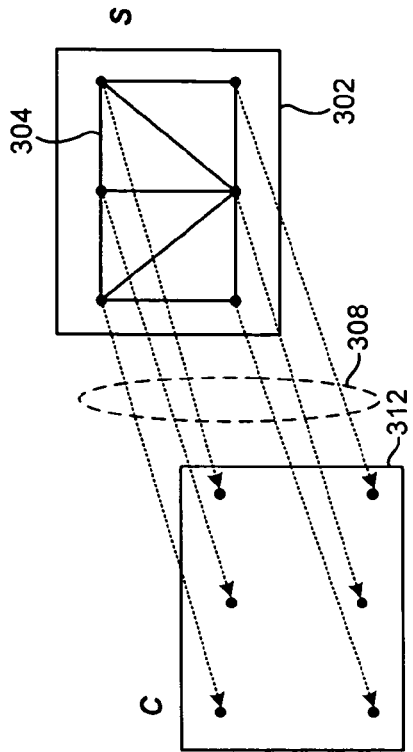
FIGS. 3A-3D are schematic diagrams illustrating the generation of screen-to-camera triangle meshes according to one embodiment of the present invention.

In FIG. 3A, points 300 represent the points in a screen domain (S) 302 that are separated by an example predetermined arrangement—with a predetermined separation distance (d1) in the horizontal direction and a predetermined separation distance (d2) in the vertical direction on display screen 116. Points 310 represent the points in a camera domain (C) 312 that are identified in image 123A by calibration unit 124 as just described (e.g., as interior corner locations of a black and white checkerboard pattern). In other embodiments, points 300 may be arranged with other known geometry, distances, and/or other scaling information between points 300.

Referring to FIGS. 2C and 3A, calibration unit 124 generates a set of point correspondences 308 between fiducial marks 118 detected in image 123A and fiducial marks 118 on display surface 116 as indicated in a block 216. The set of point correspondences 308 are represented by arrows that identify corresponding points in screen domain 302 and camera domain 312. These correspondences are generated by matching detected fiducials marks in camera image 123A with the predetermined arrangement of fiducial marks 118 on display surface 116. The algorithm described above for fiducial strips 118A and 118B describes one method for making these correspondences for a particular arrangement of fiducial marks 118, but other algorithms can be used for other arrangements of fiducial marks.

Calibration unit 124 determines screen-to-camera triangle meshes using the set of correspondences 308 as indicated in a block 218. The screen-to-camera triangle meshes are used to map screen domain (S) 302 to camera domain (C) 312 and vice versa. Calibration unit 124 determines screen-to-camera triangle meshes using the method illustrated in FIG. 2D. FIG. 2D illustrates a method for generating a triangle mesh in each of two domains.

Figure 3B:
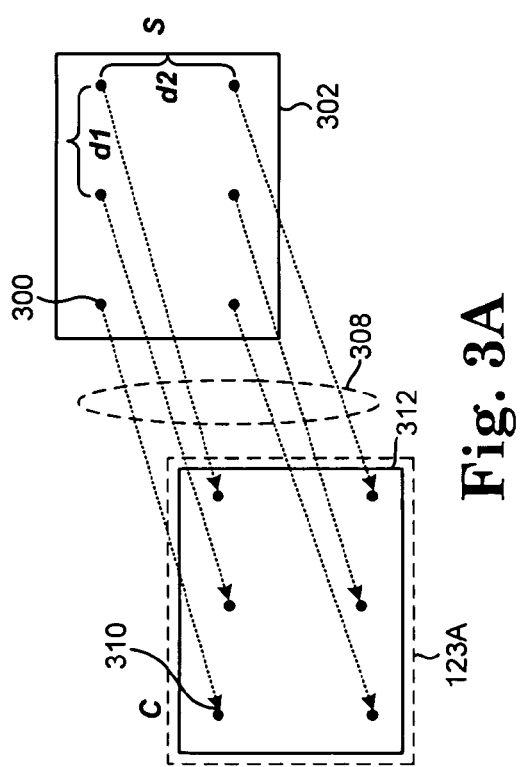

Referring to FIG. 2D and FIG. 3B, calibration unit 124 constructs a first triangle mesh in a first domain as indicated in a block 222. In the example of FIG. 3B, calibration unit 124 constructs a triangle mesh 304 in screen domain 302 by connecting points 300. Calibration unit 124 constructs triangle mesh 304 using Delaunay triangulation or any other suitable triangulation algorithm.

Figure 3D:
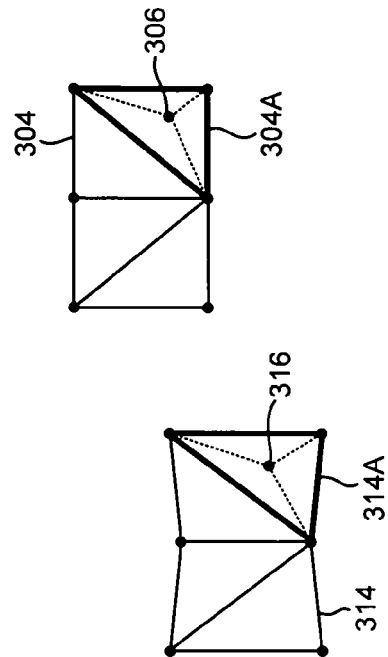
Figure 3C:
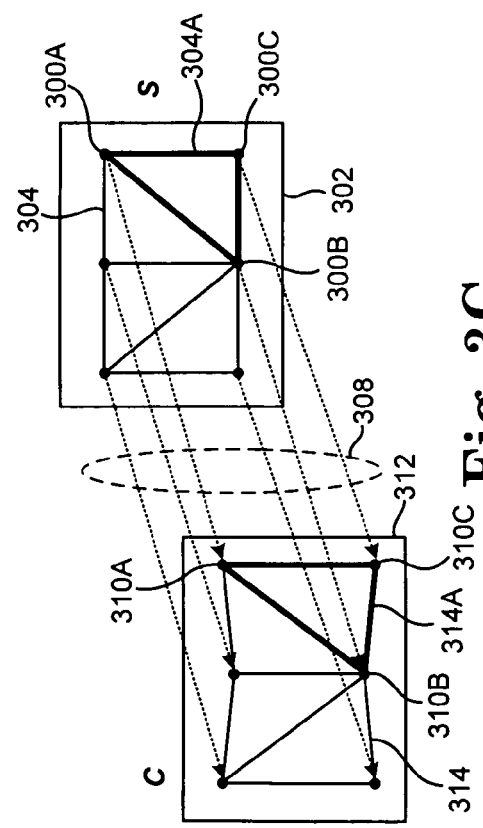

Calibration unit 124 constructs a second triangle mesh in a second domain that corresponds to the first triangle mesh using a set of point correspondences as indicated in a block 224. Referring to FIG. 3C, calibration unit 124 constructs a triangle mesh 314 in camera domain 312 by connecting points 310 in the same way that corresponding points 300, according to point correspondences 308, are connected in screen domain 302.

Calibration unit 124 uses the set of point correspondences 308 to ensure that triangles in triangle mesh 314 correspond to triangles in triangle mesh 304. For example, points 300A, 300B, and 300C correspond to points 310A, 310B, and 310C as shown by the set of point correspondences 308. Accordingly, because calibration unit 124 formed a triangle 304A in triangle mesh 304 using points 300A, 300B, and 300C, calibration unit 124 also forms a triangle 314A in triangle mesh 314 using points 310A, 310B, and 310C. Triangle 314A therefore corresponds to triangle 304A.

In other embodiments, calibration unit 124 may first a construct triangle mesh 314 in camera domain 312 (e.g. by Delaunay triangulation) and then construct triangle mesh 304 in screen domain 302 using the set of point correspondences 308.

FIG. 2E illustrates a method for performing the function of block 204 of FIG. 2A. Namely, the method of FIG. 2E illustrates one embodiment of generating camera-to-projector triangle meshes. The method of FIG. 2E will be described with reference to FIGS. 4A-4D. The method of FIG. 2E is performed for each projector 112 to generate camera-to-projector triangle meshes for each projector 112.

In FIG. 2E, calibration unit 124 causes a projector 112 to display a set of known pattern sequences on display surface 116 as indicated in a block 230. Calibration unit 124 provides a series of frames 110 with known patterns to frame buffer 113 in projector 112 by way of frame generator 108. Projector 112 displays the series of known patterns.

Camera 122 captures a set of images 123B (shown in FIG. 4A) of display surface 116 while the known patterns are being projected onto display surface 116 by projector 112 as indicated in a block 232. The known patterns may be any suitable patterns that allow calibration unit 124 to identify points in the patterns using images 123B captured by camera 122. For example, the known patterns may be a sequence of horizontal and vertical black-and-white bar patterns.

Calibration unit 124 locates points of the known patterns in images 123B as indicated in a block 234. In FIG. 4A, points 400 represent the points in camera domain (C) 312 located by calibration unit 124. In one embodiment, calibration unit 124 locates the points by projecting a known series of known black-and-white patterns onto display surface 116, and then correlating sequences of black and white pixel observations in images 123B of these known patterns with the sequences of black and white values at locations within the projected pattern coordinate space. For each camera image 123B of a known pattern, pixels are classified as corresponding to a black projected pattern element, a white projected pattern element, or being outside the coverage area of the projector. Each camera pixel location within the coverage area of the projector is then assigned a black/white bit-sequence summarizing the sequence of observations found while the known patterns were displayed in sequence. Calibration unit 124 uses the bit sequences as position codes for the camera pixels. A camera location image may be formed to display the position codes for each camera pixel. The camera location image may be divided into code set regions, each region containing camera pixel locations all having an identical associated black/white bit sequence. The size and number of code set regions in the camera location image depends upon the number and fineness of the bar patterns. A similar projector location image may be formed by displaying the black/white bit sequences at each projector pixel location as the known patterns were being displayed in a known sequence. The projector location image may also be divided into position code set regions, each region containing projector pixels all having an identical associated black/white bit sequence. A correspondence between code set regions in the camera and projector location images is made by matching the black/white bit sequence position codes of respective regions in the two images. Calibration unit 124 computes the centers-of-mass of the detected code set regions in the camera location image as the points to be associated with the centers-of-mass of the corresponding code set regions in the projector location image of projector 112.

Referring to FIGS. 2E and 4A, calibration unit 124 generates a set of point correspondences 308 between the known patterns (in the coordinate space of projector 112) and camera images 123B of these known patterns as indicated in a block 236. Points 410($i$) represent the ith points (where i is between 1 and N) in an ith projector domain ($P_i$) 412($i$) that are identified in image 123B by calibration unit 124. The ith set of point correspondences 408($i$) are represented by arrows that identify corresponding points in camera domain 312 and projector domain 412($i$).

In one embodiment, calibration unit 124 associates the centers-of-mass of the detected position code sets in the camera location image (i.e., points 400) with the centers-of-mass of the corresponding position code sets (i.e., points 410($i$) of the known patterns) provided to frame-buffer 113 of projector 112 to generate the set of point correspondences 308.

Calibration unit 124 determines camera-to-projector triangle meshes using the set of correspondences 408($i$) as indicated in a block 238. The camera-to-projector triangle meshes are used to map camera domain (C) 312 to projector domain ($P_i$) 412($i$) and vice versa. Calibration unit 124 determines camera-to-projector triangle meshes using the method illustrated in FIG. 2D.

Referring to FIG. 2D and FIG. 4B, calibration unit 124 constructs a first triangle mesh in a first domain as indicated in block 222. In the example of FIG. 4B, calibration unit 124 constructs a triangle mesh 404 in camera domain 312 by connecting points 400. Calibration unit 124 constructs triangle mesh 404 using Delaunay triangulation or any other suitable triangulation algorithm.

Calibration unit 124 constructs a second triangle mesh in a second domain that corresponds to the first triangle mesh using a set of point correspondences as indicated in block 224. Referring to FIG. 4C, calibration unit 124 constructs a triangle mesh 414($i$) in projector domain 412($i$) by connecting points 410($i$) using the set of point correspondences 408($i$) in the same way that corresponding points 400, according to point correspondences 408($i$), are connected in camera domain 312.

Calibration unit 124 uses the set of point correspondences 408($i$) to ensure that triangles in triangle mesh 414($i$) correspond to triangles in triangle mesh 404. For example, points 400A, 400B, and 400C correspond to points 410($i$)A, 410($i$)B, and 410($i$)C as shown by the set of point correspondences 408($i$). Accordingly, because calibration unit 124 formed a triangle 404A in triangle mesh 404 using points 400A, 400B, and 400C, calibration unit 124 also forms a triangle 414($i$)A in triangle mesh 414($i$) using points 410($i$)A, 410($i$)B, and 410($i$)C. Triangle 414($i$)A therefore corresponds to triangle 404A.

In other embodiments, calibration unit 124 may first construct triangle mesh 414($i$) in projector domain 412($i$) and then construct triangle mesh 404 in camera domain 312 using the set of point correspondences 408($i$).

Referring back to block 206 of FIG. 2A, calibration unit 124 generates a geometric mesh 126 for each projector 112 using the screen-to-camera meshes (block 202 and FIG. 2C) and camera-to-projector meshes for each projector 112 (block 204 and FIG. 2E). Each geometric mesh 126 maps screen domain (S) 302 to a projector domain ($P_i$) 412 and vice versa.

FIG. 2F illustrates a method for performing the function of block 206 of FIG. 2A. Namely, the method of FIG. 2F illustrates one embodiment of generating a geometric mesh 126 that maps the screen domain to a projector domain of a projector 112. The method of FIG. 2F will be described with reference to the example of FIG. 5A. The method of FIG. 2F is performed for each projector 112 to generate geometric meshes 126(1) through 126(N) for respective projectors 112(1) through 112(N).

The method FIG. 2F will be described below for generating geometric mesh 126(1). Geometric meshes 126(2) through 126(N) are generated similarly.

Figure 5A:
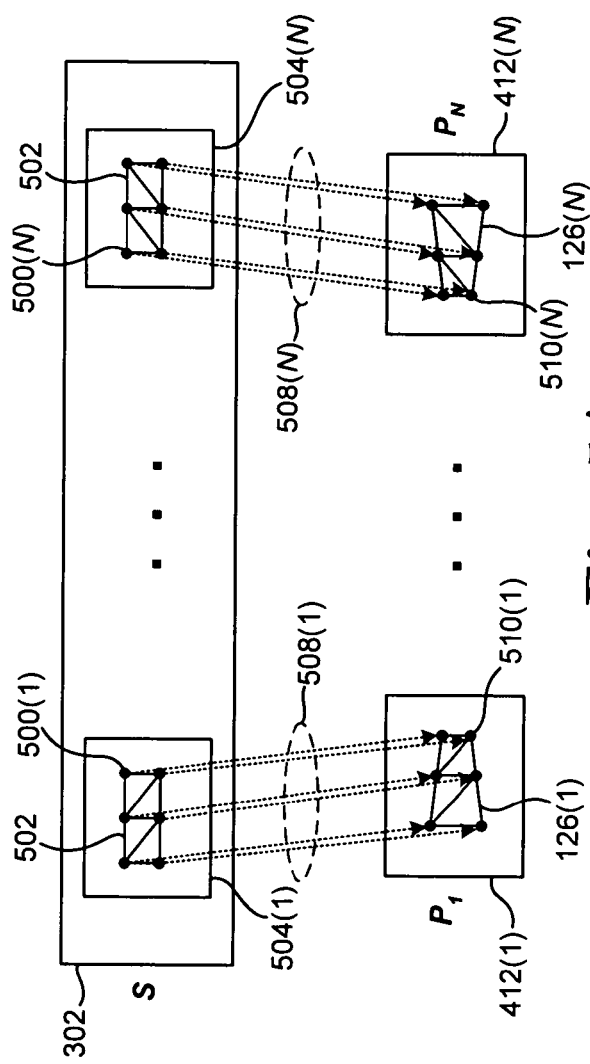
FIGS. 5A-5B are schematic diagrams illustrating the generation and use of a screen-to-projector a triangle mesh for each projector in an image display system according to one embodiment of the present invention.

Referring to FIGS. 2F and 5A, calibration unit 124 constructs a triangle mesh 502 over a rectangular, evenly spaced grid that includes a set of points 500 in screen domain 302 as indicated in a block 242. In other embodiments, triangle mesh 502 may be constructed over arrangements of points 500 other than rectangular, evenly-spaced grids. The set of points 500 occur at least partially in a region 504(1) of screen domain 302 where projector 112(1) is configured to display image 114(1). Delaunay triangulation or other suitable triangulation methods are used to construct a triangle mesh from the set of points 500(1).

Calibration unit 124 generates a set of point correspondences 508(1) between the set of points 500 in screen domain 302 and a set of points 510(1) in projector domain 412(1) using the screen-to-camera meshes and the camera-to-projector meshes for projector 112(1) as indicated in a block 244.

FIG. 2G illustrates one embodiment of a method for generating a point correspondence in the set of point correspondences 508(1) in block 244 of FIG. 2F. The method of FIG. 2G will be described with reference to FIGS. 3D and 4D.

In FIG. 2G, calibration unit 124 identifies a triangle in the screen triangle mesh (determined in block 218 of FIG. 2C) that includes or is nearest to a point in the screen domain as indicated in a block 252. In FIG. 3D, for example, calibration unit 124 identifies triangle 304A in triangle mesh 304 that includes a point 306 in screen domain 302.

Calibration unit 124 determines barycentric coordinates for the point in the triangle in the screen domain as indicated in a block 254. In the example of FIG. 3D, calibration unit 124 determines barycentric coordinates for point 306 in triangle 304A, as represented by the dotted lines that connect point 306 to the vertices of triangle 304A, in screen domain 302.

Calibration unit 124 applies the barycentric coordinates to a corresponding triangle in the camera triangle mesh (determined in block 218 of FIG. 2C) to identify a point in the camera domain that corresponds to the point in the screen domain as indicated in a block 256. In the example of FIG. 3D, calibration unit 124 applies the barycentric coordinates to a corresponding triangle 314A in triangle mesh 314 to identify a point 316 in camera domain 312 that corresponds to point 306 in screen domain 302.

Calibration unit 124 identifies a triangle in the camera triangle mesh (as determined in block 238 of FIG. 2E) that includes or is nearest to the point in the camera domain as indicated in a block 258. In FIG. 4D, for example, calibration unit 124 identifies triangle 404A in triangle mesh 404 that includes point 316 in camera domain 312.

Calibration unit 124 determines barycentric coordinates for the point in the triangle in the camera domain as indicated in a block 260. In the example of FIG. 4D, calibration unit 124 determines barycentric coordinates for point 316 in triangle 404A, as represented by the dotted lines that connect point 316 to the vertices of triangle 404A, in camera domain 312.

Calibration unit 124 applies the barycentric coordinates to a corresponding triangle in the projector triangle mesh (as determined in block 238 of FIG. 2E) to identify a point in the projector domain that corresponds to the point in the camera domain as indicated in a block 262. In the example of FIG. 4D, calibration unit 124 applies the barycentric coordinates to a corresponding triangle 414(i)A in triangle mesh 414(i) to identify a point 416 in projector domain 412(i) that corresponds to point 316 in screen domain 312.

By performing the method of FIG. 2G, calibration unit 124 generates a point correspondence in the set of point correspondences 508(1). In the example of FIGS. 3D and 4D, calibration unit 124 generates a point correspondence between point 306 in screen domain 302 and point 416 in projector domain 412(i) using screen-to-camera meshes 304 and 314 and camera-to-projector meshes 404 and 414(i). The method of FIG. 2G is repeated for each selected point of triangle mesh 502 to generate the remaining point correspondences in the set of point correspondences 508(1).

Referring back to FIGS. 2F and 5A, calibration unit 124 constructs a geometric triangle mesh 126(1) in projector domain 412(1) that corresponds to triangle mesh 502 in screen domain 302 using the set of point correspondences 508(1) as indicated in a block 246. Calibration unit 124 constructs geometric triangle mesh 126(1) in projector domain 412(1) by connecting points 510(1) according to the set of point correspondences 508(1). Calibration unit 124 uses the set of point correspondences 508(1) to ensure that triangles in triangle mesh 126(1) correspond to triangles in triangle mesh 502.

In other embodiments, calibration unit 124 may first construct triangle mesh 126(1) in projector domain 412(1), using Delaunay triangulation or other suitable triangulation methods, and then construct triangle mesh 502 in screen domain 312 using the set of point correspondences 508(1).

Referring back to block 208 of FIG. 2B, frame generator 108 renders frames 110 using respective geometric meshes 126. FIG. 2H illustrates a method for mapping locations in frames 110 to locations in projector frame buffers 113 to allow the function of block 208 to be performed. The method of FIG. 2H is performed by frame generator 108 for each pixel in each frame 110 using a respective geometric mesh 126 to determine the pixel colors of frame 110. The method of FIG. 2H will now be described as being performed by frame generator 108 for a frame 110(1). Frame generator 108 performs the method of FIG. 2H for frames 110(2) through 110(N) similarly. The method of FIG. 2H will be described with reference to an example in FIG. 5B.

Figure 5B:
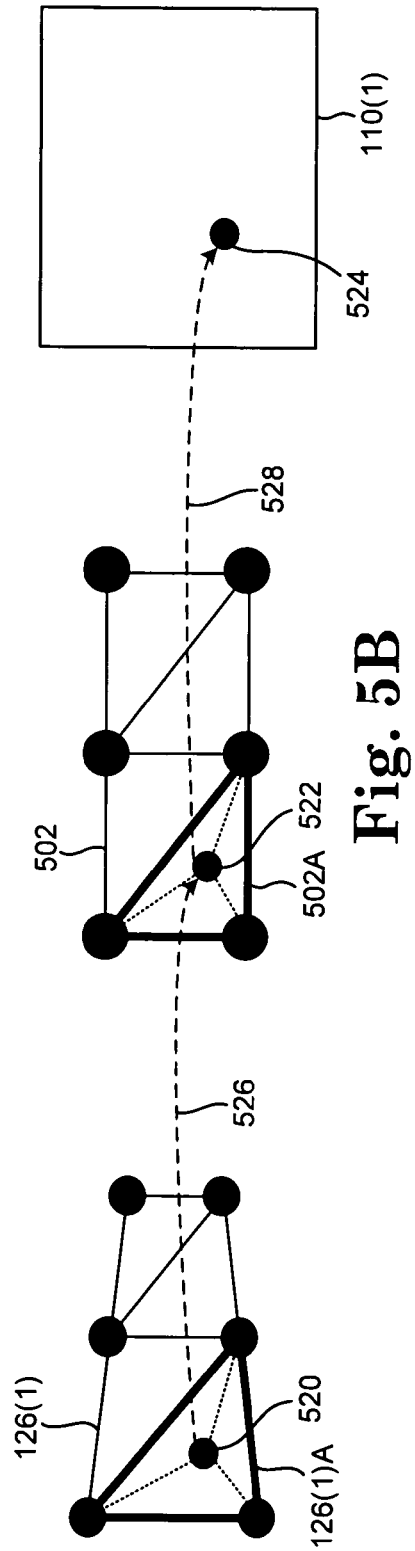

Referring to FIGS. 2H and 5B, frame generator 108 identifies a triangle in a respective projector triangle mesh that includes or is nearest to a pixel in frame 110(1) as indicated in a block 272. The projector triangle mesh, in the context of rendering, refers to a geometric mesh 126(1) from block 246 of FIG. 2F that was constructed to correspond to screen triangle mesh 502. In FIG. 5B, for example, frame generator 108 identifies triangle 126(1)A in geometric mesh 126 that includes point 520. A coordinate correspondence is also made between screen domain 302 and the image domain I of an image frame 102 to be displayed. The correspondence may include scaling, rotation, and translation, so that a rectangular portion of image frame 102 may correspond to any rectangular region of the 2D plane made by flattening display surface 116. Because of this coordinate correspondence between image domain I and screen domain 302, triangle mesh 502 corresponds to the image domain, I, of frame 102 as described in additional detail above.

Frame generator 108 determines barycentric coordinates for a pixel location in frame buffer 113(1) in the triangle of projector triangle mesh 126(1) as indicated in a block 274. In the example of FIG. 5B, frame generator 108 determines barycentric coordinates for point 520 in triangle 126(1)A, as represented by the dotted lines that connect point 520 to the vertices of triangle 126(1)A.

Frame generator 108 applies the barycentric coordinates to a corresponding triangle in screen triangle mesh 502 to identify a screen location, and hence a corresponding pixel location in image frame 102, as indicated in a block 276. In the example of FIG. 5B, frame generator 108 applies the barycentric coordinates to a corresponding triangle 502A in triangle mesh 502 to identify a point 522 in that corresponds to point 520 in as indicated by a dashed arrow 526. Point 522 corresponds to a point 524 in image frame 102(1) in as indicated by a dashed arrow 528. The color at this pixel location in frame buffer 113(1) is filled in with the color of the image data at the image domain I location corresponding to the screen location in screen triangle mesh 502.

Interpolation of image color between pixel locations in image domain I may be used as part of this process, if the location determined in image frame 102 is non-integral. This technique may be implemented efficiently by using the texture mapping capabilities of many standard personal computer graphics hardware cards. In other embodiments, alternative techniques for warping frames 102 to correct for geometric distortion using geometric meshes 126 may be used, including forward mapping methods that map from coordinates of image frames 102 to pixel location in projector frame buffers 113 (via screen-to-projector mappings) to select the pixel colors of image frames 102 to be drawn into projector frame buffers 113.

By mapping frames 102 to projector frame buffers 113, frame generator 108 may warp frames 102 into frames 110 to geometrically correct the display of images 114.

Although the above methods contemplate the use of an embodiment of display system 100 with multiple projectors 112, the above methods may also be applied to an embodiment with a single projector 112.

In addition, the above method may be used to perform geometric correction on non-developable display surfaces. Doing so, however, may result in distortion that is visible to a viewer of the display surface.

III. Photometric Calibration and Correction of Displayed Images

Even after geometric correction, the brightness of projected images 114 is higher in screen regions of images 114 that overlap (e.g., regions 150, 152, and 154 shown in FIG. 1D). In addition, light leakage in each projector 112 may cause a non-zero "black offset" to be projected on display surface 116 for black image inputs. These black offsets have the potential to add up in overlap regions to produce visually disturbing artifacts. Further, projector tone reproduction functions (TRFs) that relate output light color to image input values may vary across projectors 112, as well as across pixels within a single projector 112, so that noticeable color and brightness transitions appear in the display of images 114. For example, maximum projector brightness may decrease toward the edge of the frustrum of a projector 112.

Image display system 100 applies photometric correction to image frames 102 using photometric correction information 128 in the process of rendering image frames 110 to cause smooth brightness levels and color gamut across the combination of projected images 114 on display surface 116. Accordingly, image display system 100 attempts to produce a tiled display system that will not produce visually disturbing color variations in a displayed image 114 for an input image frame 102 of any single solid color. By doing so, image display system 100 may implement photometric correction while ensuring that projected images 114 appear reasonably faithful to the images of image frames 102.

Processing system 101 applies photometric correction by linearizing, scaling, and offsetting geometrically corrected frames 110A (shown in FIG. 7) to generate photometrically corrected frames 110B (shown in FIG. 7) in one embodiment. Processing system 101 adds a black offset image (e.g., an offset map 704 shown in FIG. 7) to each frame 110A in order to create a smooth black level across images 114. Processing system 101 applies a multiplicative attenuation (scaling) map (e.g., a scale map 706 shown in FIG. 7) to pixel values in each frame 110A in order to smooth the spatial variation of the brightnesses across images 114. Processing system 101 also applies a blend map (e.g., a blend map 702 shown in FIG. 7) to each frame 110A for attenuating regions of display surface 116 where images 114 overlap. The blend maps spatially "cross-fade" the brightness levels of respective projectors 112 in overlap regions between two or more projectors. Processing system 101 linearizes the TRFs of projectors 112 to allow the same attenuation maps to be used for all inputs. To do so, processing system 101 applies inverse TRFs to frames 110A prior to providing image frames 110B to projectors 112. The combination of this inversion and the physical projectors 112 may be considered together as linear projectors 112. Processing system 101 also applies a gamma function to frames 110A to prevent images 114 from appearing saturated as a result of replacing with a linear pass-through the standard nonlinear "gamma" exponential function typically applied to images.

Figure 6C:
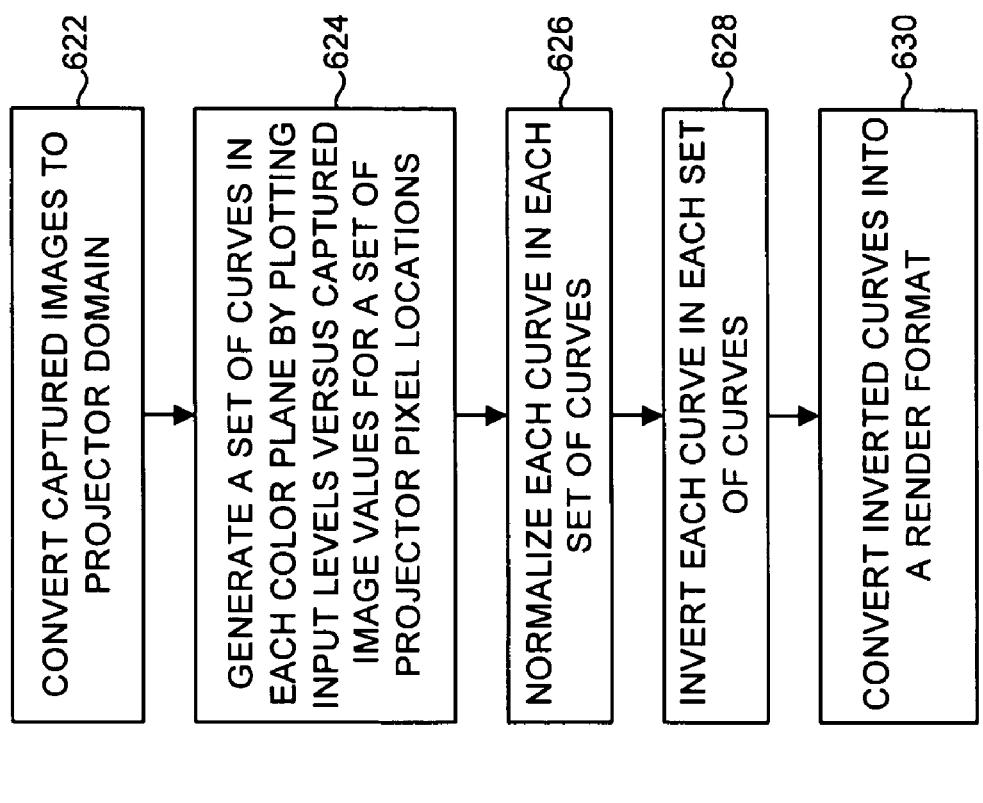

Methods of performing photometric calibration and correction will now be described in additional detail with reference to the embodiments of FIGS. 6A-6G. FIGS. 6A-6G are flow charts illustrating methods for photometric calibration and correction. FIG. 6A illustrates the overall calibration process to generate photometric correction information 128, and FIG. 6B illustrates the rendering process using photometric correction information 128 to perform photometric correction on image frames 110A. FIGS. 6C through 6G illustrate additional details of the functions of the blocks shown in FIGS. 6A. The embodiments of FIGS. 6A-6G will be described with reference to image display system 100 as illustrated in FIG. 1A.

The methods of FIGS. 6A-6G will be described for an embodiment of image display system 100 that includes a single camera 122. In embodiments that include multiple cameras 122, the methods of FIGS. 6A-6G may be performed using multiple cameras 122 by synchronizing images 123 captured by cameras 122 prior to performing the functions of methods of FIGS. 6C, 6D, 6F, and 6G.

In FIG. 6A, calibration unit 124 causes projectors 112 to project a series of gray levels onto display surface 116 and camera 112 captures sets of images 123 that include the gray level images as indicated in a block 602. In one embodiment, calibration unit 124 causes each projector 112 to project a series of M gray levels from black to white where M is greater than or equal to two, and camera 122 captures two images, images 123C(N)(M) (shown in FIGS. 8 and 11) and 123D(N)(M) (shown in FIG. 10), of each gray level M for each projector 112(N). Camera 122 captures each image 123C with a relatively short exposure to detect the brightest levels without saturation and each image 123D with a relatively long exposure to obtain usable image signal at the darkest levels. Camera 122 captures all images 123C and 123D in three-channel color. While gray levels for a first projector 112 are being captured, calibration unit 124 causes all other projectors 112 that overlap the first projector on display surface 116 to be turned on and to project black.

Camera 122 may be operated in a linear output mode in capturing sets of images 123C and 123D to cause image values to be roughly proportional to the light intensity at the imaging chip of camera 122. If camera 122 does not have a linear output mode, the camera brightness response curve may be measured by any suitable method and inverted to produce linear camera image data.

In other embodiments, calibration unit 124 may cause any another suitable series of images to be projected and captured by camera 122.

Calibration unit 124 determines sets of inverse TRFs 700R, 700G, and 700B (shown in FIG. 7) for each pixel location of each color plane of each projector 112 using a respective set of images 123C as indicated in a block 604. In one embodiment, the set of inverse TRFs 700R includes one inverse TRF for each pixel location in the red color plane of a projector 112, the set of inverse TRFs 700G includes one inverse TRF for each pixel location in the green color plane of a projector 112, and the set of inverse TRFs 700B includes one inverse TRF for each pixel location in the blue color plane of a projector 112. In other embodiments, each set of inverse TRFs 700R, 700G, and 700B includes one inverse TRF for each set of pixel locations in a projector 112 where each set of pixel locations includes all pixel locations in a projector 112 or a subset of pixel locations (e.g., pixel locations from selected regions of projector 112) in a projector 112.

To determine the sets of inverse TRFs 700R, 700G, and 700B, calibration unit 124 determines TRFs for each pixel location of each color plane of each projector 112 using the respective set of images 123C and geometric meshes 404 and 414(i), where i is between 1 and N. In other embodiments, calibration unit 124 may determine sets of inverse TRFs 700R, 700G, and 700B using other forms of geometric correction data that map camera locations to projector frame buffer locations. Interpolation between the measured gray levels in images 123C may be applied to obtain TRFs with proper sampling along the brightness dimension. Calibration unit 124 then derives the sets of inverse TRFs 700R, 700G, and 700B from the sets of TRFs as described in additional detail below with reference to FIG. 6C.

The generation of inverse TRFs is described herein for red, green, and blue color planes. In other embodiments, the inverse TRFs may be generated for other sets of color planes.

Calibration unit 124 determines a blend map 702 (shown in FIG. 7) for each projector 112 using a respective set of geometric meshes 304, 314, 404, and 414(i) (i.e., the meshes between the screen domain, camera domain, and the domain of projector 112(i), where i is between 1 and N, as described above) as indicated in a block 606. In other embodiments, calibration unit 124 may determine a blend map 702 using other forms of geometric correction data that map screen locations to projector frame buffer locations. Calibration unit 124 determines attenuating factors in each blend map 702 that correspond to pixel locations in a respective image frame 110 that fall within an overlap region in an image 114 on display surface 116 with at least one other image 114 from at least one other frame 110. Accordingly, each attenuating factor is configured to attenuate a corresponding pixel value in a pixel location of image frame 110 in the process of generating a frame 110. The process of determining blend maps 702 is described in additional detail below with reference to FIGS. 6D, 6E, and 9.

Calibration unit 124 determines an offset map 704 for each projector 112 using a respective set of images 123D and respective geometric meshes 304, 314, 404, and 414(i) as indicated in a block 608. In other embodiments, calibration unit 124 may determine an offset map 704 using other forms of geometric correction data that map screen locations to projector frame buffer locations. Each offset map 704 includes a set of offset factors that are configured to be applied to a frame 110A to generate smooth black levels across the display of an image 114. The process of determining offset maps 704 is described in additional detail below with reference to FIGS. 6F and 10.

Calibration unit 124 determines a scale map 706 for each projector 112 using a respective set of images 123C, respective blend maps 702, and respective geometric meshes 304, 314, 404, and 414(i) as indicated in a block 610. In other embodiments, calibration unit 124 may determine a scale map 706 using other forms of geometric correction data that map screen locations to projector frame buffer locations. Each scale map 706 includes a set of attenuating factors that are configured to be applied to a frame 110A to generate smooth brightness levels across the display of an image 114. By forming each scale map 706 using a respective blend map 702, scale maps 706 may be configured to increase the overall smoothness of the brightness levels across the display of all images 114. The process of determining scale maps 706 is described in additional detail below with reference to FIGS. 6G and 11.

Photometric correction information 128 includes a blend map 702, an offset map 704, and a scale map 706 for each projector 112 in one embodiment. In other embodiments, photometric correction information 128 may omit one or more of a blend map 702, an offset map 704, and a scale map 706.

Figure 7:
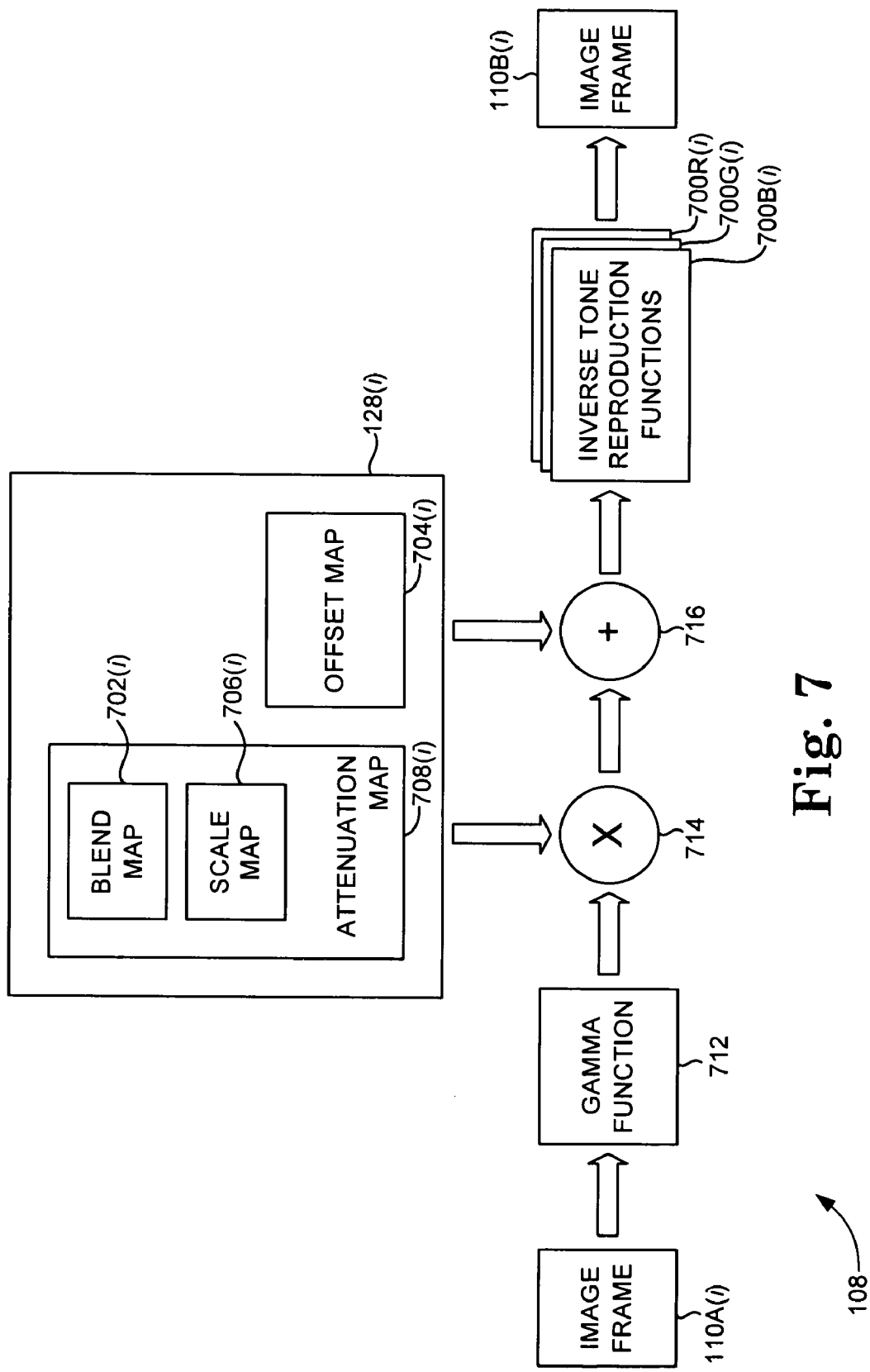
FIG. 7 is a schematic diagram illustrating a process of rendering image frames using photometric maps according to one embodiment of the present invention.

FIG. 6B illustrates a method of rendering a frame 110A using photometric correction information 128 to perform photometric correction on frame 110A to generate a frame 10B. Frame generator 108 performs the method of FIG. 6B for each frame 110A(1) through 110A(N), respectively, for projection by projectors 112(1) through 112(N), respectively. Frame generator 108 performs geometric correction on frames 110A, as described above in Section II, prior to performing the photometric correction of FIGS. 6B and 7 in one embodiment. The method of FIG. 6B will be described with reference to FIG. 7. FIG. 7 is a schematic diagram illustrating a process of rendering image frames 110A using photometric correction information 128.

Referring to FIGS. 6B and 7, frame generator 108 applies a gamma function 712 to a frame 110A as indicated in a block 612. The gamma function may be any suitable function (e.g., an exponential function) configured to prevent images 114 from appearing on display surface 116 as saturated. Many display devices employ an exponential gamma function in order to create imagery that is more perceptually pleasing and better suited to the logarithmic brightness response properties of the human eye. The gamma function may be the same for each projector 112 or differ between projectors 112.

Frame generator 108 applies a scale map 706 and a blend map 702 to a frame 110A as indicated in a block 614. More particularly, frame generator 108 multiplies the pixel values of frame 110A with corresponding scale factors in scale map 706 and blend map 702 as indicated by a multiplicative function 714. In one embodiment, frame generator 108 combines scale map 706 and blend map 702 into a single attenuation map 708 (i.e., by multiplying the scale factors of scale map 706 by the attenuation factors of blend map 702) and applies attenuation map 708 to frame 110A by multiplying the pixel values of frame 110A with corresponding attenuation factors in attenuation map 708. In other embodiments, frame generator 108 applies scale map 706 and blend map 702 separately to frame 110A by multiplying the pixel values of frame 110A with one of corresponding scale factors in scale map 706 or corresponding attenuation factors in blend map 702 and then multiplying the products by the other of the corresponding scale factors in scale map 706 or corresponding attenuation factors in blend map 702. By multiplying pixel values in frame 110A by attenuating factors from scale map 706 and blend map 702, frame generator 108 reduces the brightness of selected pixel values to smooth the brightness levels of a corresponding image 114.

Frame generator 108 applies an offset map 704 to a frame 110 as indicated in a block 616. Frame generator 108 adds the offset factors of offset map 704 to corresponding pixel values in frame 110 as indicated by an additive function 716. By adding pixel values in frame 110 with offset factors from offset map 704, frame generator 108 increases the brightness of selected pixel values to smooth the black level of the combination of projected images 114 across display surface 116.

Frame generator 108 applies sets of inverse TRFs 700R, 700G, and 700B to a frame 110A to generate a frame 110B as indicated in a block 618. Frame generator 108 applies inverse TRF 700R to the red color plane of a frame 110A, the inverse TRF 700G to the green color plane of a frame 110A, and the inverse TRF 700B to the blue color plane of a frame 110A to convert the pixel values in a frame 110. Frame generator 108 provides frame 110 to a corresponding projector 112.

This might be a good place to insert something about combining all of the above corrections into a single 3D lookup table, with two spatial dimensions and one brightness dimension. There should be such table per color channel. Each incorporates black offset, brightness attenuation, and application of the inverse TRF.

Projector 112 projects frame 110B onto display surface 116 to form image 114 as indicated in a block 620. The remaining projectors 112 simultaneously project corresponding frames 110B to form the remaining images 114 on display surface 116 with geometric and photometric correction. Accordingly, the display of images 114 appears spatially aligned and seamless with smooth brightness levels across the combination of projected images 114 on display surface 116.

Figure 8:
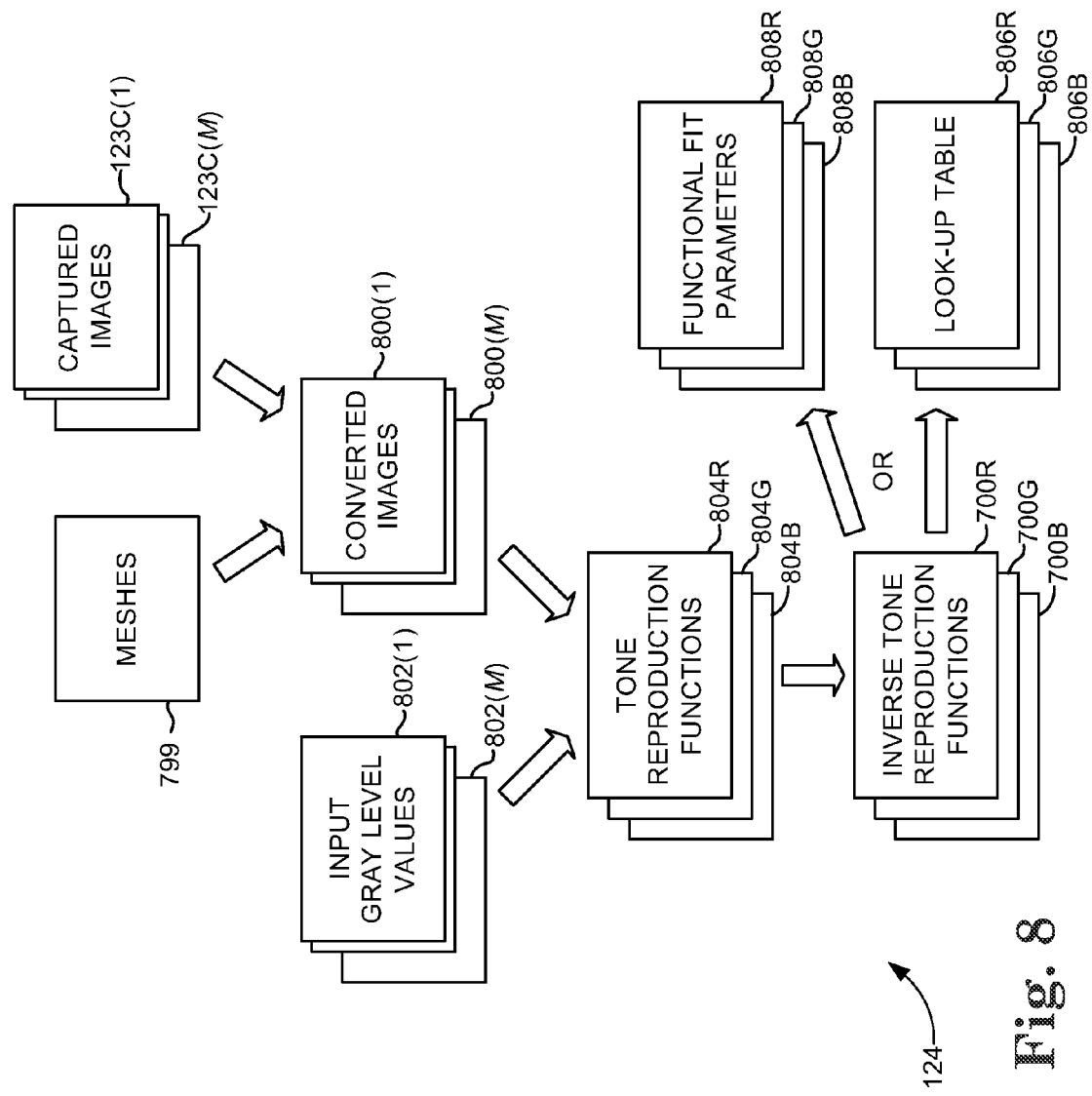
FIG. 8 is a block diagram illustrating a process of determining inverse tone reproduction functions for each color plane of a projector according to one embodiment of the present invention.

FIG. 6C illustrates a method for performing the function of block 604 of FIG. 6A. Namely, the method of FIG. 6C illustrates one embodiment of determining the sets of inverse TRFs 700R, 700G, and 700B for a projector 112. Calibration unit 124 performs the method of FIG. 6C for each set of captured image frames 123C(1) through 123C(N) to generate corresponding sets of inverse TRFs 700R, 700G, and 700B for projectors 112(1) through 112(N), respectively. The method of FIG. 6C will be described with reference to FIG. 8. FIG. 8 is a block diagram illustrating a process of determining inverse tone reproduction functions for each color plane of a projector 112.

The generation of the sets of inverse TRFs 700R, 700G, and 700B will be described for red, green, and blue color planes. In other embodiments, the sets of inverse TRFs may be generated for other sets of color planes.

Referring to FIGS. 6C and 8, calibration unit 124 converts a set of captured camera images 123C into a projector coordinate domain of a projector 112 as indicated in a block 622. As shown in FIG. 8, calibration unit 124 geometrically warps the set of captured images 123C(1) to 123C(M) into converted images 800(1) to 800(M) using a set of meshes 799 that include mesh 404 in the camera domain and the respective mesh 414(i) in the domain of projector 112 in one embodiment. In other embodiments, calibration unit 124 maps the set of captured images 123C(1) to 123C(M) into the coordinate domain of projector 112 in any other suitable way.

Calibration unit 124 generates a set of curves for each color plane of a projector 112 by plotting, for a selected set of pixel locations of a projector 112, gray level values projected by a projector 112 versus projector output brightness values measured by a camera at corresponding pixel locations in the set of converted images 800 as indicated in a block 624. The selected set of pixel locations may include all of the pixel locations in projector 112, a subset of pixel locations in projector 112, or a single pixel location in projector 112.

As shown in FIG. 8, calibration unit 124 generates sets of TRFs 804R, 804G, and 804B for each pixel value in the red, green, and blue color planes, respectively, from gray level input values 802(1) through 802(M) projected by a respective projector 112 and from the corresponding set of brightness measurements contained in converted images 800(1) through 800(M) for the selected set of pixel locations of projector 112. To account for spatial variations in projector 112, the selected set of pixel locations of projector 112 may include all of the pixel locations of projector 112 or a set of pixel locations of projector 112 distributed throughout the domain of projector 112.

Calibration unit 124 normalizes the domain and range of each curve in each set of curves to [0, 1] as indicated in a block 626, and inverts the domain and range of each curve in each set of curves as indicated in a block 628. The inverted curves form inverse TRFs 700R, 700G, and 700B. In one embodiment, calibration unit 124 generates a separate inverse TRF for each pixel location for each color plane in the domain of projector 112. In other embodiments, calibration unit 124 may average a set of the normalized and inverted curves to form one inverse TRF 700R, 700G, and 700B for all or a selected set of pixel locations in each color plane.

Calibration unit 124 converts the inverted curves into any suitable render format as indicated in a block 630. In one embodiment, calibration unit 124 determines sets of functional fit parameters 808R, 808G, and 808B that best fit each inverse TRF 700R, 700G, and 700B to a functional form such as an exponential function. The fit parameters 808R, 808G, and 808B are later applied together with the functional form by frame generator 108 to render frames 1101B to compensate for the non-linearity of the transfer functions of projectors 112.

In other embodiments, calibration unit 124 generates look-up tables 806R, 806G, and 806B from the sets of inverse tone reproduction functions 700R, 700G, and 700B. In one form, calibration unit 124 generates each look-up table 806R, 806G, and 806B as a three dimensional table with a different set of values for corresponding color values at each coordinate location of projector 112 for each color plane according to sets of inverse tone reproduction functions 700R, 700G, and 700B. In other forms, calibration unit 124 generates each look-up table 806R, 806G, and 806B as a one dimensional table with the same set or subset of values for corresponding color values at each coordinate location of projector 112 according to sets of inverse tone reproduction functions 700R, 700G, and 700B. The lookup tables are later applied by frame generator 108 to render frames 110B to compensate for the non-linearity of the transfer functions of projectors 112.

FIG. 6D illustrates a method for performing a portion of the function of block 606 of FIG. 6A. Namely, the method of FIG. 6D illustrates one embodiment of determining blend maps for use in generating attenuation maps. The method of FIG. 6D will be described with reference to FIGS. 9A and 9B. FIGS. 9A and 9B are schematic diagrams illustrating a process of determining blend maps.

Referring to FIGS. 6D, 9A and 9B, calibration unit 124 identifies overlapping regions of projectors 112 using geometric meshes 304, 314, 404, and 414(i) as indicated in a block 642. To do so, calibration unit 124 identifies pixel locations in each projector 112 that correspond to the same screen locations in the screen domain as other pixel locations on one or more other projectors 112 using geometric meshes 304, 314, 404, and 414(i). The set of screen locations forms the overlap regions in the screen domain, and the corresponding pixel locations for each projector 112 form the overlap regions in the projector domains.

In an example shown in FIG. 9A, frames 110A(1) through 110A(6) are represented in the screen domain subsequent to being geometrically corrected as described above with reference to Section II. Frames 110A(1) and 110A(2) form an overlap region 900, frames 110A(2), 110A(3), and 110A(4) form an overlap region 902, and frames 110A(3), 110A(4), 110A(5), and 110A(6) form an overlap region 906. These overlap regions 900, 902, and 904 in the screen domain correspond to overlap regions 150, 152, and 154 (shown in FIG. 1D) on display surface 116. Other overlap regions in the screen domain are shown in other shaded regions of FIG. 9A. Referring to FIG. 9B, calibration unit 124 identifies regions 910A and 910B in the projector coordinate domains of projectors 112(1) and 112(2), respectively, that correspond to overlap region 900 in the screen domain.

Calibration unit 124 generates a blend map 702 for each projector 112 with an attenuation factor for each pixel location located within the overlapping regions as indicated in a block 644. Referring to FIG. 9B, for each pixel location in region 910A of projector coordinate domain P(1), calibration unit 124 determines an attenuation factor in blend map 702(1). For example, for pixel location 912 in region 910A, calibration unit 124 determines an attenuation factor for a corresponding location 922(1) in blend map 702(1) as indicated by a dashed arrow 916(1). The attenuation factor in location 922(1) corresponds to the screen location 900A (FIG. 9A). Similarly, for each pixel location in region 910B of projector coordinate domain P(2), calibration unit 124 determines an attenuation factor in blend map 702(2). Thus, calibration unit 124 determines an attenuation factor for a location 922(2) in blend map 702(2) that corresponds to pixel location 914 in region 910B as indicated by a dashed arrow 916(2). The attenuation factor in location 922(2) also corresponds to the screen location 900A (FIG. 9A).

In one embodiment, calibration unit 124 generates each attenuation factor to be in the range of zero to one. In this embodiment, calibration unit 124 generates the attenuation factors that correspond to a screen location across all blend maps 702 such that the sum of the attenuation factors corresponding to any screen location is equal to one. Thus, in the example of FIG. 9B, the sum of the attenuation factor of location 922(1) and the attenuation factor of location 922(2) is equal to one. In other embodiments, calibration unit 124 may generate each attenuation factor to be in any other suitable range of values.

FIG. 6E illustrates one embodiment of determining attenuation factors for blend maps 702 for a screen location as referenced in block 644 of FIG. 6D. Calibration unit 124 performs the method of FIG. 6E for screen locations in overlapping regions in the screen domain in one embodiment.

In FIG. 6E, calibration unit 124 determines at least two distances between a first pixel location in a first frame 110A and edges of the first frame 110A as indicated in a block 648. In FIG. 9B, for example, calibration unit 124 determines a distance d(1)A between pixel location 912 and edge 110A(1)A, distance d(1)B between pixel location 912 and edge 110A(1)B, a distance d(1)C between pixel location 912 and edge 110A(1)C, and a distance d(1)D between pixel location 912 and edge 110A(1)D.

Calibration unit 124 determines at least two distances between a second pixel location in a second frame 110A and edges of the second frame 110A as indicated in a block 650. In FIG. 9B, for example, calibration unit 124 determines a distance d(2)A between pixel location 914 and edge 110A(2)A, distance d(2)B between pixel location 914 and edge 110A(2)B, a distance d(2)C between pixel location 914 and edge 110A(2)C, and a distance d(2)D between pixel location 914 and edge 110A(2)D.

Calibration unit 124 determines whether there is another overlapping frame 110A as indicated in a block 652. If there is not another overlapping frame 110A, as in the example of FIG. 9B, then calibration unit 124 determines attenuation factors for blend maps 702 corresponding to the pixel locations in the first and second frames 110A as indicated in a block 656. Calibration unit 124 determines each attenuation factor as a proportion of the sum of the respective products of the distances between pixel locations in respective frames 110A and the edges of the respective frames 110A using Equations 3 and 4.

$$G(\vec{p}_i) = \frac{\varepsilon_i}{\sum_{j=1}^{N} \varepsilon_j} \quad (3)$$

$$\varepsilon_i = \prod_{k=1}^{x} d_{i,k} \quad (4)$$

In Equations 3 and 4, i refers to the ith projector 112 and k refers to the number of calculated distances for each pixel location in a respective frame 110A where k is greater than or equal to 2. Equation 3, therefore, is used to calculate each attenuation factor as a ratio of a product of distances calculated in a given frame 110A to a sum of the product of distances calculated in the given frame 110A and the product or products of distances calculated in the other frame or frames 110A that overlap with the given frame 110A.

In addition, $\epsilon_i(\vec{p}_i)$ forms a scalar-valued function over projector coordinates where $\epsilon_i(\vec{p}_i)$ goes to zero as $\vec{p}_i$ approaches any edge of a projector 112, and $\epsilon_i(\vec{p}_i)$ and the spatial derivative of $\epsilon_i(\vec{p}_i)$ are not discontinuous anywhere inside the coordinate bounds of the projector 112.

Using Equations 3 and 4, calibration unit 124 calculates the attenuation factor for location 922(1) in FIG. 9B by dividing the product of distances d(1)A, d(1)B, d(1)C, and d(1)D with the sum of the product of distances d(1)A, d(1)B, d(1)C, and d(1)D and the product of distances d(2)A, d(2)B, d(2)C, and d(2)D. Similarly, calibration unit 124 calculates the attenuation factor for location 922(2) in FIG. 9B by dividing the product of distances d(2)A, d(2)B, d(2)C, and d(2)D with the sum of the product of distances d(1)A, d(1)B, d(1)C, and d(1)D and the product of distances d(2)A, d(2)B, d(2)C, and d(2)D.

Calibration unit 124 stores the attenuation factors in respective blend maps 702 as indicated in a block 658. In FIG. 9B, calibration unit 124 stores the attenuation factor for pixel location 912 in frame 110A(1) in location 922(1) of blend map 702(1) and the attenuation factor for pixel location 914 in frame 110A(2) in location 922(2) of blend map 702(2).

In the example of FIG. 9B, calibration unit 124 repeats the method of FIG. 6E for each pixel location in overlapping regions 910A and 9101B to determining the remaining attenuation factors in regions 924(1) and 924(2) of blend maps 702(1) and 702(2) respectively.

For pixel locations in regions of frames 110A that, when appearing as part of projected image 114 on display surface 116, do not overlap with any projected images 114 projected by other projectors 112, calibration unit 124 sets the attenuation factors in corresponding regions of blend maps 702 to one or any other suitable value to cause images 114 not to be attenuated in the non-overlapping regions on display surface 116. For example, calibration unit 124 sets the attenuation factors of all pixels in regions 926(1) and 926(2) of blend maps 702(1) and 702(2), respectively, to one so that blend maps 702(1) and 702(2) do not attenuate corresponding pixel locations in frames 110A(1) and 110A(2) and corresponding screen locations on display surface 116.

Referring back to block 652 of FIG. 6E, if calibration unit 124 determines that there is one or more additional overlapping frames 110A, then calibration unit 124 determines at least two distances between each additional overlapping pixel location in each additional overlapping frame 110A and respective edges of each overlapping frame 110A as indicated in a block 654.

In region 902 of FIG. 9A, for example, calibration unit 124 determines at least two distances for each corresponding pixel location in frames 110A(2), 110A(3) and 110A(4) and uses the three sets of distances in Equations 3 and 4 to determine attenuation factors corresponding to each pixel location for blend maps 702(2), 702(3) (not shown), and 702(4) (not shown).

Likewise in region 904 of FIG. 9A, for example, calibration unit 124 determines at least two distances for each corresponding pixel location in frames 110A(3), 110A(4), 110A(5) and 110A(6) and uses the four sets of distances in Equations 3 and 4 to determine attenuation factors corresponding to each pixel location for blend maps 702(3) (not shown), 702(4) (not shown), 702(5) (not shown), and 702(6) (not shown).

In embodiments where k is equal to four as in the example of FIG. 9B (i.e., four distances are calculated for each pixel location in a frame 110A), calibration unit 124 calculates all four distances between pixel locations in overlapping frames 110A and the respective edges of frames 110A and uses all four distances from each overlapping frame 110A in Equations 3 and 4 to calculate each attenuation factor.

In other embodiments, k is equal to two (i.e., two distances are calculated for each pixel location in a frame 110A). In embodiments where k is equal to two, calibration unit 124 uses the two shortest distances between pixel locations in overlapping frames 110A and the respective edges of frames 110A in Equations 3 and 4. To determine the shortest distances, calibration unit 124 may calculate all four distances between a pixel location in a frame 110A and the respective edges of frame 110A for each of the overlapping frames 110A and select the two shortest distances for each frame 110A for use in Equations 3 and 4.

Figures 6F, 6G:
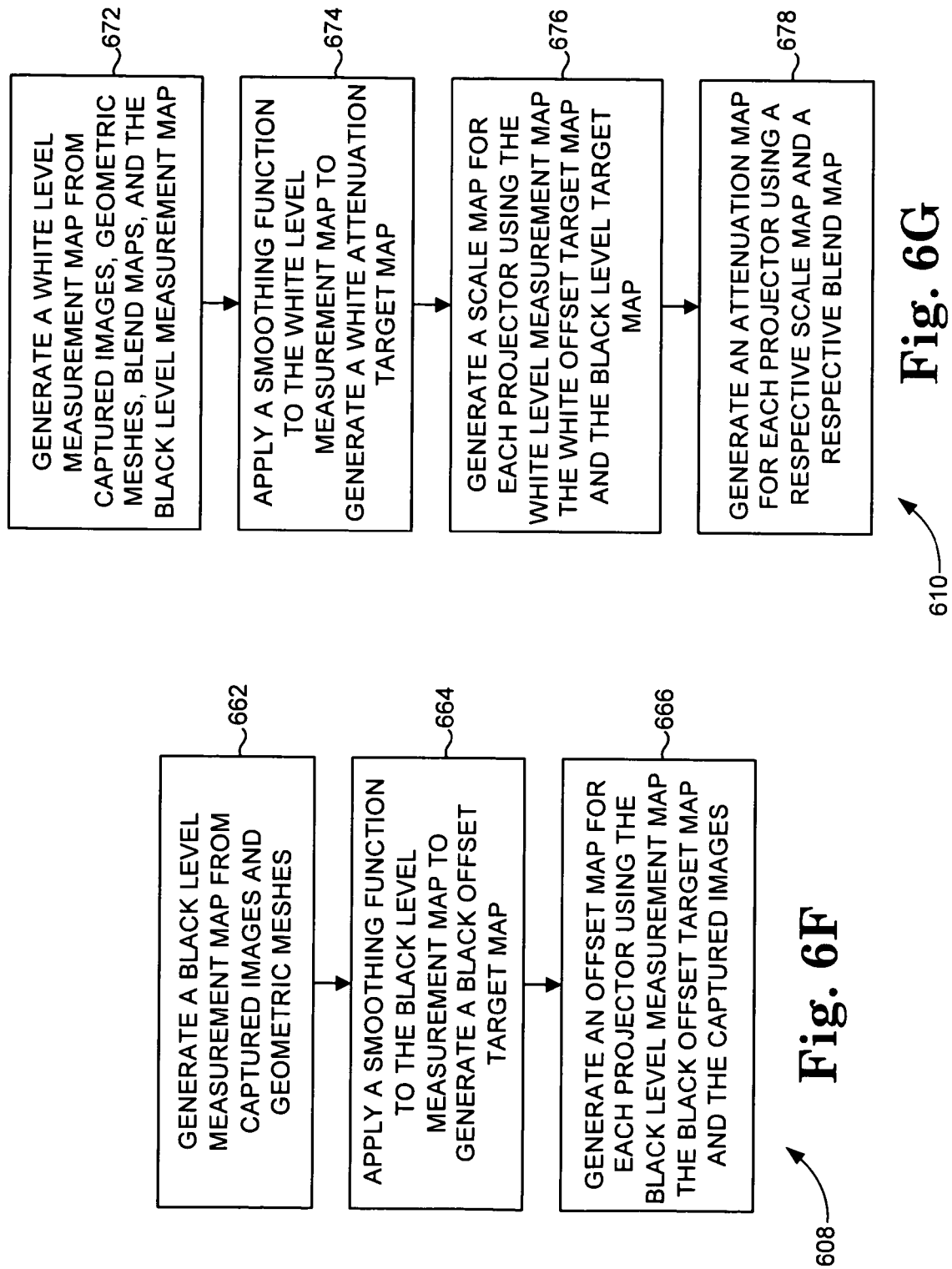
Figure 10:
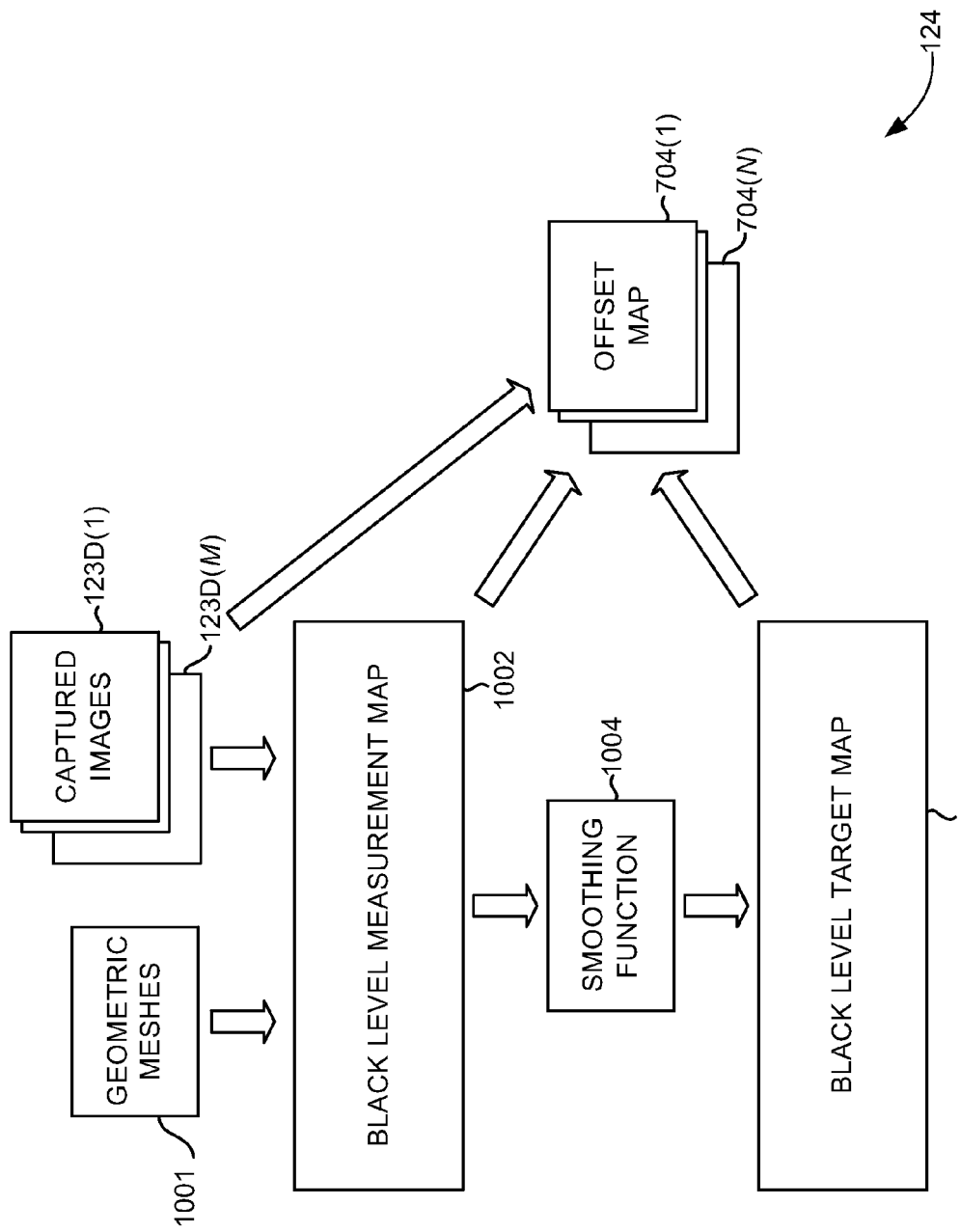
FIG. 10 is a block diagram illustrating a process of determining offset maps according to one embodiment of the present invention.

FIG. 6F illustrates a method for performing a portion of the function of block 606 of FIG. 6A. Namely, the method of FIG. 6F illustrates one embodiment of determining offset maps. The method of FIG. 6F will be described with reference to FIG. 10. FIG. 10 is a block diagram illustrating a process of determining offset maps.

Referring to FIGS. 6F and 10, calibration unit 124 generates a black level measurement map 1002 from the set of captured images 123D and a set of geometric meshes 1001 that includes geometric meshes 304, 314, 404, and 414(i) as indicated in a block 662. The spatial dimensions of black level measurement map 1002 may be selected independently of the characteristics of captured images 123D and geometric meshes 304, 314, 404, and 414(i), so that black level measurement map 1002 may contain an arbitrary number of pixels. Calibration unit 124 maps black measurement values from the set of captured images 123D into the screen coordinate domain using geometric meshes 304, 314, 404, and 414(i) to generate black level measurement map 1002. Accordingly, black level measurement map 1002 may include a black level measurement value determined from the set of captured images 123D for each pixel that corresponds to a screen location on display surface 116.

Calibration unit 124 applies a smoothing function 1004 to black level measurement map 1002 to generate a black level target map 1006 as indicated in a block 664. Calibration unit 124 derives black level target map 1006 from black level measurement map 1002 such that black level target map 1006 is spatially smooth across the display of images 114 on display surface 116.

In one embodiment, smoothing function 1004 represents an analogous version of the constrained gradient-based smoothing method applied to smooth brightness levels in "Perceptual Photometric Seamlessness in Projection-Based Tiled Displays", A. Majumder and R. Stevens, ACM Transactions on Graphics, Vol. 24., No. 1, pp. 118-139, 2005 which is incorporated by reference herein. Accordingly, calibration unit 124 analogously applies the constrained gradient-based smoothing method described by Majumder and Stevens to the measured black levels in black level measurement map 1002 to generate black level target map 1006 in this embodiment.

In one embodiment of the constrained gradient-based smoothing method, pixels in black level target map 1006 corresponding to locations on display surface 116 covered by projected images 114 are initialized with corresponding pixel values from black level measurement map 1002. All pixels in black level target map 1006 corresponding to locations on display surface 116 not covered by projected images 114 are initialized to a value lower than the minimum of any of the pixels of black level measurement map 1002 corresponding to areas of display surface 116 covered by projected images 114. The pixels of black level target map 1006 are then visited individually in four passes through the image that follow four different sequential orderings. These four orderings are 1) moving down one column at a time starting at the left column and ending at the right column, 2) moving down one column at a time starting at the right column and ending at the left column, 3) moving up one column at a time starting at the left column and ending at the right column, and 4) moving up one column at a time starting at the right column and ending at the left column. During each of the four passes through the image, at each pixel the value of the pixel is replaced by the maximum of the current value of the pixel and the three products formed by multiplying each of the three adjacent pixels already visited on this pass by weighting factors. The weighting factors are less than one and enforce spatial smoothness in the resulting black level target map 1006, with higher weighting factors creating a more smooth result. The weighting factors may be derived in part from consideration of the human contrast sensitivity function, the expected distance of the user from the display surface 116, and the resolution of the projected images 114. This process is repeated independently for each color plane of black level target map 1006.

Calibration unit 124 generates an offset map 704 for each projector 112 using black level measurement map 1002, black level target map 1006, and the camera images 123D captured with relatively long exposure time as indicated in a block 666. Calibration unit 124 generates a set of offset values in each offset map 704 by first subtracting values in black offset measurement map 1002 from corresponding values in black level target map 1006 to generate sets of difference values. Calibration unit 124 divides each difference value in each set of difference values by the numbers of projectors 112 that project onto the screen locations that correspond to the respective difference values to generate sets of divided values. Calibration unit 124 interpolates between measured brightnesses at corresponding locations in captured images 123D to determine the projector inputs required to produce the divided values, and these projector inputs are used as the sets of offset values in offset maps 704. That is, at each pixel location in offset map 704, the corresponding location in images 123D is determined, and the measured brightnesses in 123D for different gray level inputs to corresponding projector 112 are examined to find the two images 123D whose measured brightnesses at this location bound above and below the corresponding divided value. Interpolation is performed on the projector input gray levels corresponding to these two images 123D to estimate the projector input required to produce the divided value. The estimated projector input is stored at the corresponding location in black offset map 704. In other embodiments, calibration unit 124 performs interpolation in other ways such as by using more than two images 123D.

Figure 11:
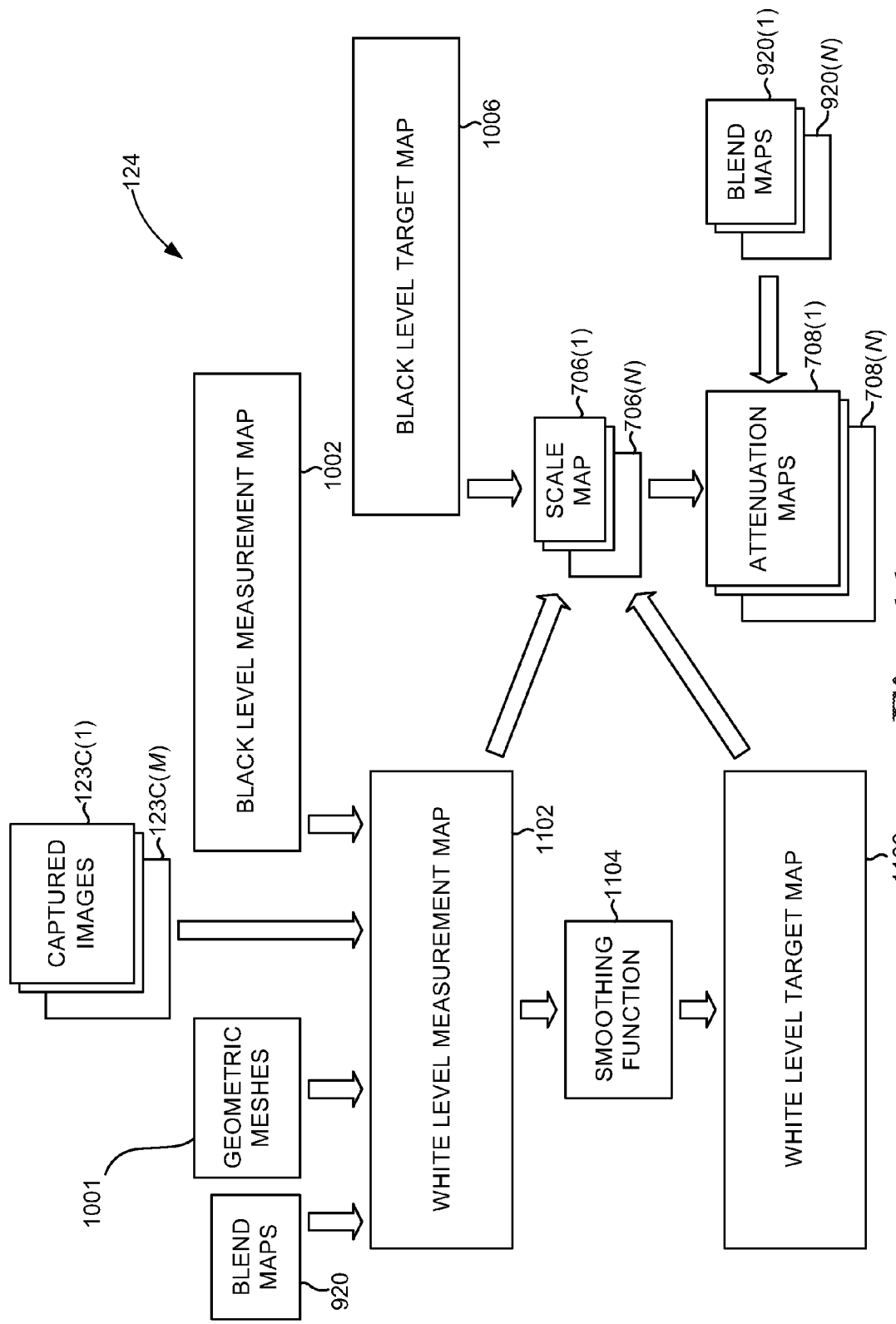
FIG. 11 is a block diagram illustrating a process of determining attenuation maps according to one embodiment of the present invention.

FIG. 6G illustrates a method for performing a portion of the function of block 606 of FIG. 6A. Namely, the method of FIG. 6G illustrates one embodiment of determining attenuation maps. The method of FIG. 6G will be described with reference to FIG. 11. FIG. 11 is a block diagram illustrating a process of determining attenuation maps.

Referring to FIGS. 6G and 11, calibration unit 124 generates a white level measurement map 1102 from the set of captured images 123C, the set of geometric meshes 1001 that includes geometric meshes 304, 314, 404, and 414($i$), blend maps 702, and black level measurement map 1002 as indicated in a block 672. White level measurement map 1102 contains white level measurement values that each identify the maximum brightness level at a corresponding location on display surface 116 after blend maps 702 have been applied, as determined from the set of captured images 123C and blend maps 702. Accordingly, white level measurement map 1102 identifies brightness levels at screen locations across the display of images 114.

Calibration unit 124 maps measurement values in the set of captured images 123C into the screen coordinate domain using geometric meshes 304, 314, 404, and 414($i$) to generate the white level measurement values in white level measurement map 1102. Calibration unit 124 then subtracts black level measurement values in black level measurement map 1002 from corresponding white level measurement values in white level measurement map 1102 to remove the black offset from white level measurement map 1102. Calibration unit 124 next applies blend maps 702 to white level measurement map 1102 by multiplying white level measurement values by corresponding attenuation factors of blend maps 702 to attenuate pixel values in the overlap regions of white level measurement map 1102. Accordingly, white level measurement map 1102 includes a set of white level measurement values from the set of captured images 123C for each screen location on display surface 116 that are adjusted by corresponding black level offset measurements in black level measurement map 1002 and corresponding attenuation factors in blend maps 702.

Calibration unit 124 applies a smoothing function 1104 to white level measurement map 1102 to generate a white level target map 1106 as indicated in a block 674. White level target map 1106 represents a desired, smooth white (maximum brightness) level across the display of images 114 on display surface 116.

In one embodiment, smoothing function 1104 represents the constrained gradient-based smoothing method applied to smooth brightness levels in "Perceptual Photometric Seamlessness in Projection-Based Tiled Displays", A. Majumder and R. Stevens, ACM Transactions on Graphics, Vol. 24., No. 1, pp. 118-139, 2005 which is incorporated by reference herein. Accordingly, calibration unit 124 applies the constrained gradient-based smoothing method described by Majumder and Stevens to the measured white levels in white level measurement map 1102 to generate white level target map 1106.

In one embodiment of the constrained gradient-based smoothing method, pixels in white level target map 1106 corresponding to locations on display surface 116 covered by projected images 114 are initialized with corresponding pixel values from white level measurement map 1102. All pixels in white level target map 1106 corresponding to locations on display surface 116 not covered by projected images 114 are initialized to a value higher than the minimum of any of the pixels of black level measurement map 1102 corresponding to areas of display surface 116 covered by projected images 114. The pixels of white level target map 1106 are then visited individually in four passes through the image that follow four different sequential orderings. These four orderings are 1) moving down one column at a time starting at the left column and ending at the right column, 2) moving down one column at a time starting at the right column and ending at the left column, 3) moving up one column at a time starting at the left column and ending at the right column, and 4) moving up one column at a time starting at the right column and ending at the left column. During each of the four passes through the image, at each pixel the value of the pixel is replaced by the minimum of the current value of the pixel and the three products formed by multiplying each of the three adjacent pixels already visited on this pass by weighting factors. The weighting factors are greater than one and enforce spatial smoothness in the resulting white level target map 1106, with lower weighting factors creating a more smooth result. The weighting factors may be derived in part from consideration of the human contrast sensitivity function, the expected distance of the user from the display surface 116, and the resolution of the projected images 114. This process is repeated independently for each color plane of white level target map 1106.

Calibration unit 124 generates a scale map 706 for each projector 112 using white level measurement map 1102, white level target map 1106, and black level target map 1006 as indicated in a block 676. Calibration unit 124 generates a set of scale factors in each scale map 706 by first subtracting values in white attenuation target map 1006 from corresponding values in black level target map 1006 to generate sets of difference values. Calibration unit 124 divides each difference value in each set of difference values by corresponding values in white level measurement map 1102 to generate sets of scale factors in scale maps 706.

Calibration unit 124 generates an attenuation map 708 for each projector 112 using a respective scale map 706 and a respective blend map 702 as indicated in a block 678. Calibration unit 124 generates a set of attenuation factors in each attenuation map 708 by multiplying a corresponding set of scale factors from a corresponding scale map 706 by a corresponding set of attenuation factors from a corresponding blend map 702.

The derivation of offset maps 702 and attenuation maps 708 will now be described. Let $I(\vec{s})$ be the three-channel color of an input image 102 to be displayed at screen location $\vec{s}$. By Equation 1, this is also the color corresponding to projector coordinate $\vec{p}_i = P_i(\vec{s})$ in image frame 110A. If it is assumed that the ith projector 112's TRF has been linearized by application of inverse TRF $h^{-1}(I_{i,l})$ (e.g., by application of the sets of inverse TRFs 700R, 700G, and 700B), where l indicates the color plane in a set of color planes (e.g., RGB), then the projector output color $L(\vec{p}_i)$ at pixel location $\vec{p}_i$ is as shown in Equation 5.

$$L(\vec{p}_i) = [G(\vec{p}_i)(W(\vec{p}_i) - B(\vec{p}_i))] * I(P_i(\vec{s})) + B(\vec{p}_i) \quad (5)$$

This is the equation of a line that, over the domain of I=[0, 1], has a minimum value at I=0 equal to the measured black offset $B(\vec{p}_i)$ at the screen location corresponding to $\vec{p}_i$, and a maximum value at I=1 equal to the measured white offset at the screen location corresponding to $\vec{p}_i$ after attenuation by geometric blend function $G(\vec{p}_i)$ (e.g., by using the attenuation factors in blend maps 702).

To compensate for the linearity of the projector response, the input image color I is enhanced with an exponential function H (i.e., gamma function 712 in FIG. 7), with an exponent typically around 2.3. Because of projector 112's linearity, H becomes the effective "gamma" of the entire image display system 100 and is controllable in software in one embodiment. This enhancement is applied prior to other photometric corrections and is expressed through a substitution in the above Equation 5 as shown in Equation 6.

$$L(\vec{p}_i) = [G(\vec{p}_i)(W(\vec{p}_i) - B(\vec{p}_i))] * H(I) + B(\vec{p}_i) \quad (6)$$

For N projectors 112 overlapping at screen location $\vec{s}$ on display surface 116, the expected output color on display surface 116 is obtained by summing Equation 6 across all projectors 112 as shown in Equation 7.

$$L(\vec{s}) = H(I) * \sum_{i=1}^{N} [G(\vec{p}_i)(W(\vec{p}_i) - B(\vec{s}))] + B(\vec{s}) \quad (7)$$

For I=0 and I=1, $L(\vec{s})$ equates to black and white measurement map values $B(\vec{s})$ and $W(\vec{s})$, respectively.

The desired projector response at $\vec{s}$, defined by black level and white level target maps 1006 and 1106, respectively, computed as described above, is also a line, but with a different slope and intercept as shown in Equation 8.

$$L(\vec{s}) = H(I) * (W_t(\vec{s}) - B_t(\vec{s})) + B_t(\vec{s}) \quad (8)$$

Equations 7 and 8 are brought into agreement by inserting into Equation 7 a scale factor $\alpha(\vec{p}_i)$ and offset factor $\beta(\vec{p}_i)$ that are the same at all coordinates $\vec{p}_i$ corresponding to screen location $\vec{s}$ for all projectors 112 overlapping at screen location $\vec{s}$ as shown in Equation 9.

$$L(\vec{s}) = \quad (9)$$

$$H(I) * \sum_{i=1}^{N} [\alpha(\vec{p}_i) G(\vec{p}_i)(W(\vec{p}_i) - B(\vec{s}))] + (\beta(\vec{p}_i) B(\vec{s}))$$

Equations 10 and 11 cause Equations 8 and 9 to be equal.

$$\alpha(\vec{p}_i) = \frac{W_t(\vec{s}) - B_t(\vec{s})}{\sum_{i=1}^{N} G(\vec{p}_i)(W(\vec{p}_i) - B(\vec{s}))} \quad (10)$$

$$\beta(\vec{p}_i) = \frac{B_t(\vec{s}) - B(\vec{s})}{N} \quad (11)$$

Intuitively, the value of $\alpha(\vec{p}_i)$ at a given screen location is the ratio of the target display dynamic range here (from the smoothed white level target map 1106 ($W_t$) down to the smoothed black level target map 1006 ($B_t$)) to the original measured dynamic range of the tiled display after geometric blending has been applied. $\beta(\vec{p}_i)$ distributes the difference between black level target map 1006 $B_t$ and black level measurement map 1002 B equally among projectors 112 overlapping at $\vec{s}$. Offset maps 704 used by frame generator 108 are described by $\beta(\vec{p}_i)$, while attenuation maps 708 are described by $\alpha(\vec{p}_i) * G(\vec{p}_i)$. Because B, $B_t$, W, and $W_t$ are all in three-channel color, the above method can produce separate results for each color channel.

Application of geometric blending using blend maps 702 during creation of white level measurement map 1102 $W(\vec{s})$ and prior to the creation of white level target map 1106 $W_t(\vec{s})$ may result in photometric calibration that is more tolerant of geometric calibration error. A white measurement map created without geometric blending may contain sharp brightness discontinuities at projector overlap region boundaries. In contrast, the method described herein blends projector contributions in overlap regions to produce a relatively smooth white level measurement map 1102 $W(\vec{s})$ whose differences from uniformity reflect only the intrinsic brightness variations of projectors 112, rather than spatial overlap geometry. Elimination of discontinuities in white level measurement map 1102 ($W(\vec{s})$) through geometric blending may yield smoother attenuation maps and allow for greater tolerance of geometric calibration imprecision.

IV. Projection of Multiple Image Streams

In one form of the invention, image display system 100 (FIG. 1) is configured to simultaneously project multiple different image streams or video streams on display surface 116. In addition to simply displaying the different streams in fixed locations on the surface 116, the location, display size, and other properties of the streams can be transformed dynamically and in real time in one embodiment. The dynamic repositioning and rescaling of streams provided by one embodiment of the invention allows one or more streams to be brought to emphasis at a keystroke by a user. The dynamic reconfiguration of projected streams according to one form of the present invention is described in further detail below with reference to FIGS. 12-15.

Figure 12:
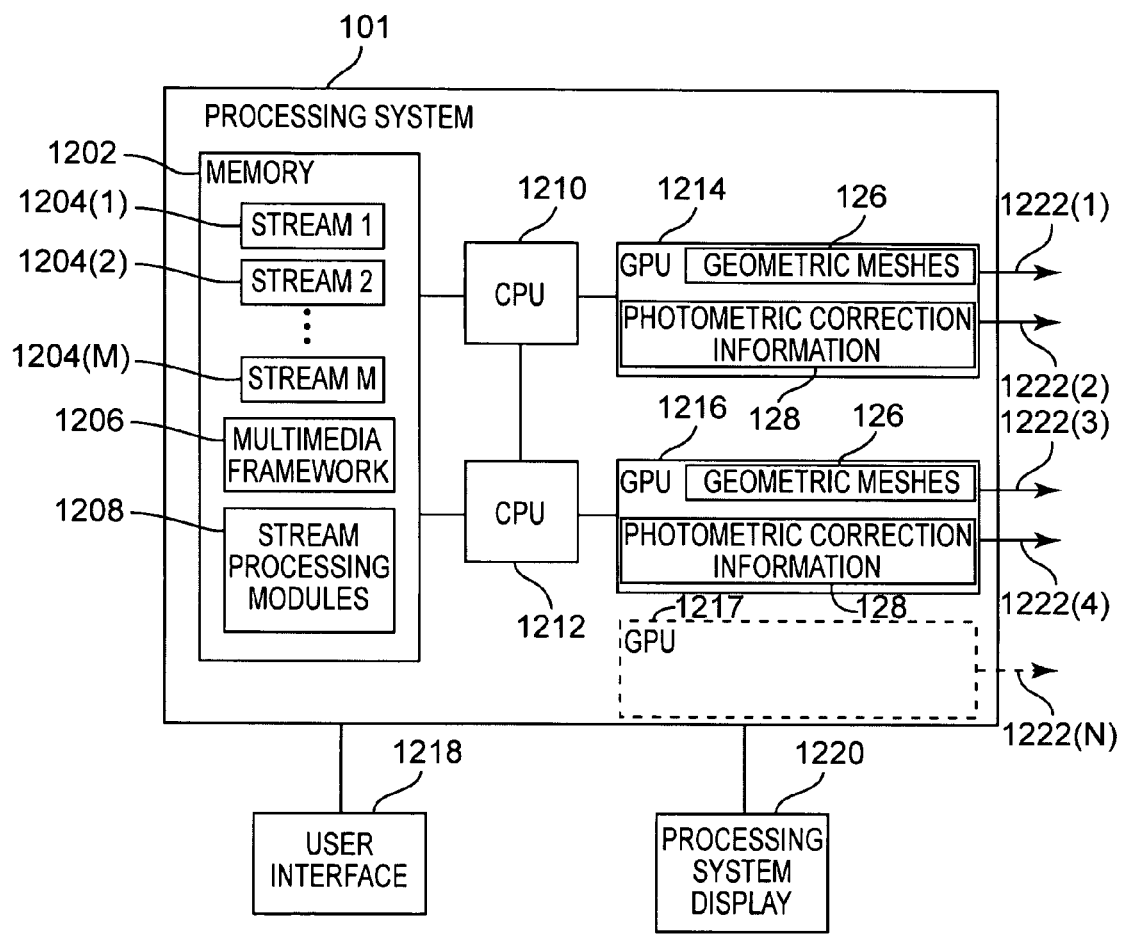
FIG. 12 is a block diagram illustrating the processing system shown in FIG. 1A as configured for providing dynamically reconfigurable multiple stream rendering according to one embodiment of the present invention.

FIG. 12 is a block diagram illustrating the processing system 101 shown in FIG. 1A as configured for providing dynamically reconfigurable multiple stream rendering according to one embodiment of the present invention. As shown in FIG. 12, processing system 101 includes memory 1202, two central processing units (CPUs) 1210 and 1212, two graphical processing units (GPUs) 1214 and 1216, user interface device 1218, and processing system display 1220. In one embodiment, processing system 101 is a Hewlett-Packard xw9300 workstation, which includes two AMD Opteron 2.19 GHz CPUs 1210 and 1212 and two Nvidia Quadro FX3400 GPUs 1214 and 1216, each of which can drive two projectors 112 (FIG. 1A). In another embodiment, processing system 101 includes one or more additional GPUs, such as GPU 1217, which allows processing system 101 to drive more than four projectors 112. Additional projectors 112 can also be driven by using multiple processing systems 101.

In one embodiment, user interface device 1218 is a mouse, a keyboard, or other device that allows a user to enter information into and interact with processing system 101. In one embodiment, display 1220 is a cathode ray tube (CRT) display, flat-panel display, or any other type of conventional display device. In another embodiment, processing system 101 does not include a processing system display 1220. Memory 1202 stores a plurality of different streams 1204(1)-1204(N) (collectively referred to as streams 1204), multimedia framework 1206, and stream processing software modules 1208. In one embodiment, streams 1204 are different video streams (e.g., the image content of each stream 1204 is different than the content of the other streams 1204) with or without associated audio streams. Geometric meshes 126 and photometric correction information 128 are stored in GPUs 1214 and 1216. In one embodiment, processing system 101 processes streams 1204 based on geometric meshes 126, photometric correction information 128, and user input (e.g., stream selection, transformation or modification parameters) entered via user interface device 1218, to generate composite or processed streams 1222(1)-1222(N) (collectively referred to as processed streams 1222), which are provided to projectors 112 for simultaneous projection onto display surface 116. In another embodiment, rather than, or in addition to, relying on user input, processing system 101 is configured to automatically generate stream modification or transformation parameters. In one embodiment, the number M of streams 1204 is equal to the number N of streams 1222. In other embodiments, the number M of streams 1204 is greater than or less than the number N of streams 1222. Processing system 101 is described in further detail below with reference to FIGS. 13-15.

Figure 13A:
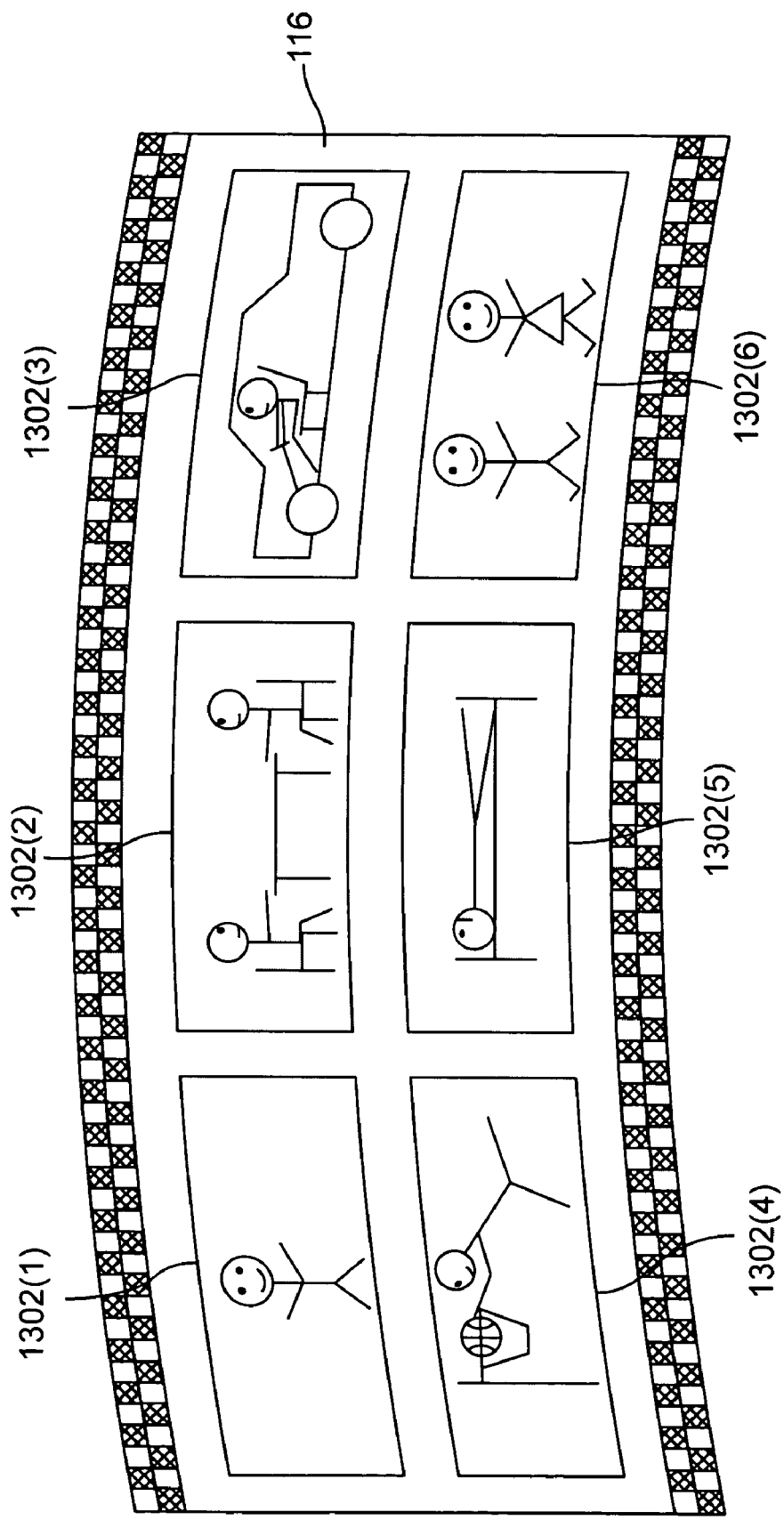
FIGS. 13A-13C are diagrams illustrating a simplified representing of the simultaneous projection of multiple different streams by the display system shown in FIG. 1A, and the dynamic reconfiguration of the projected streams according to one form of the present invention.
Figure 13B:
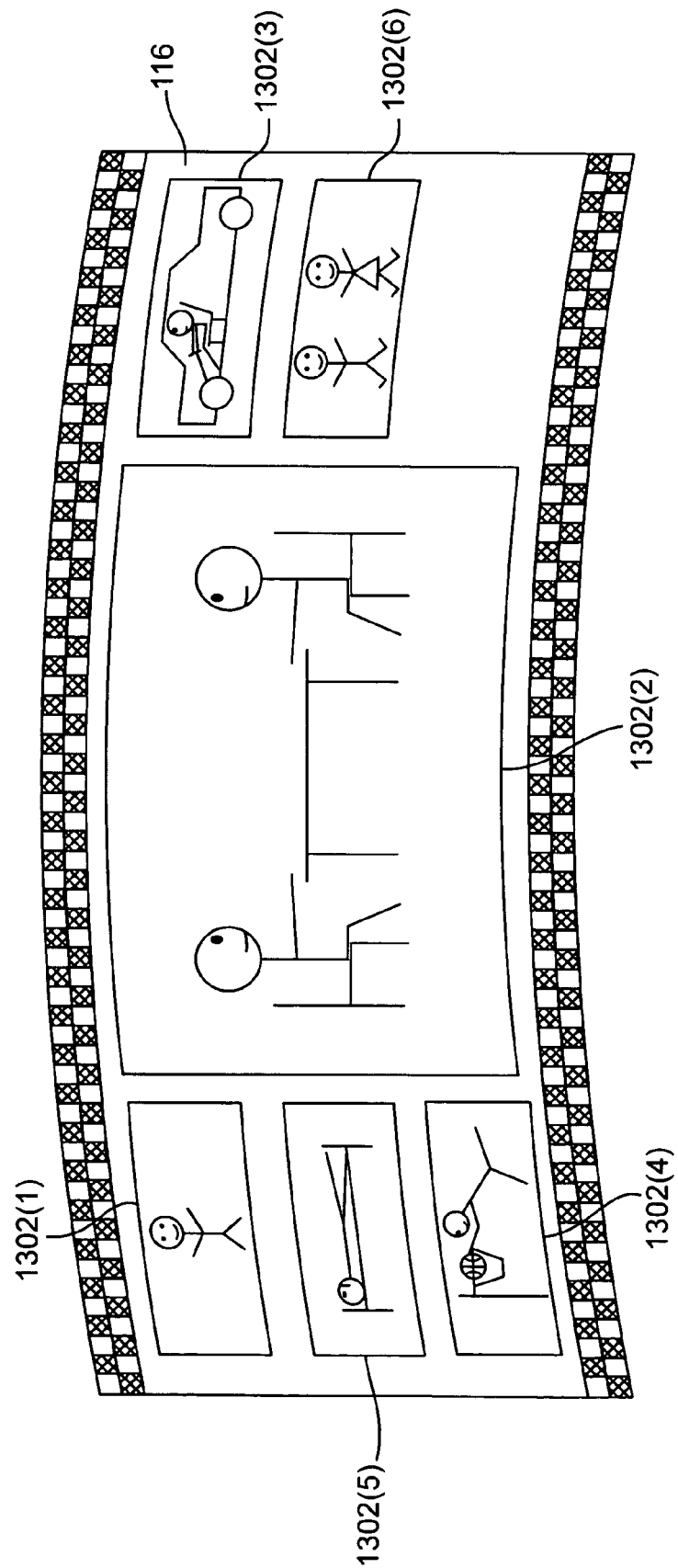
Figure 13C:
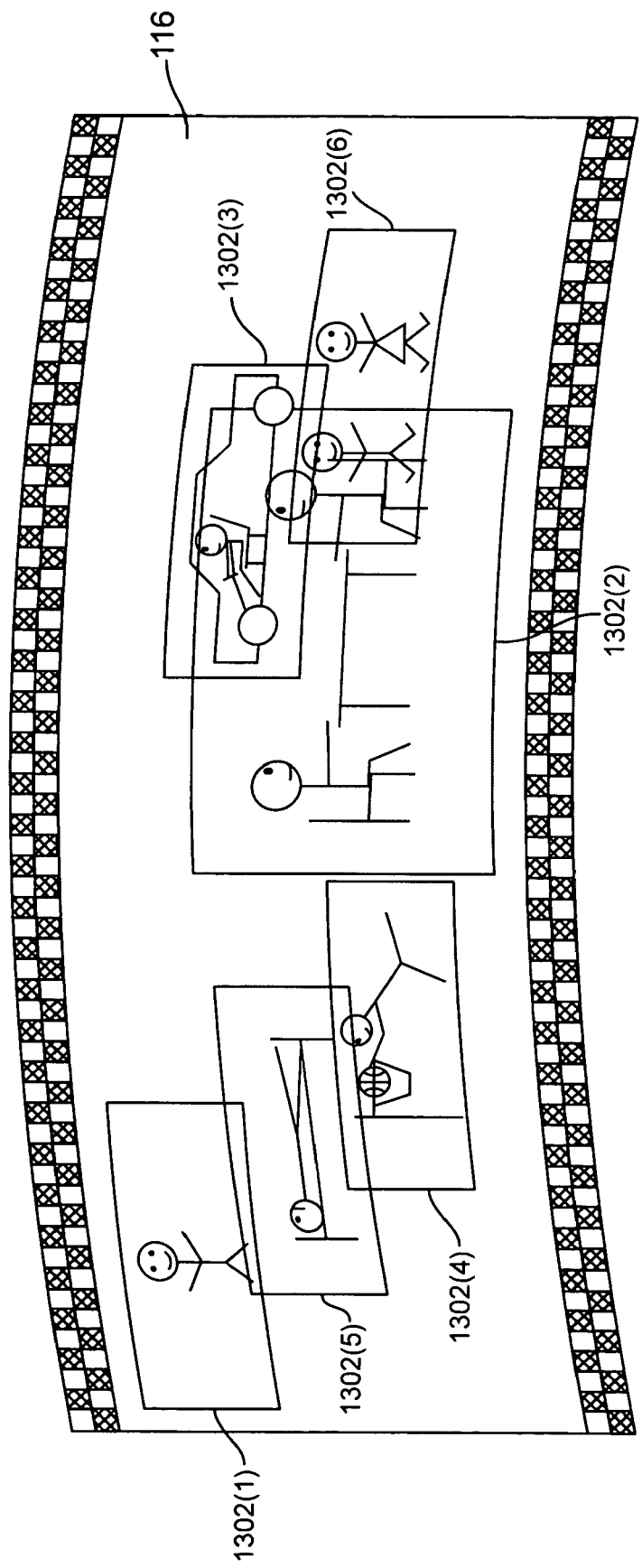

FIGS. 13A-13C are diagrams illustrating the simultaneous projection of multiple different streams 1302(1) to 1302(6) (collectively referred to as displayed or projected streams 1302) by display system 100 (FIG. 1A), and the dynamic reconfiguration of the projected streams 1302 according to one form of the present invention. In one embodiment, projected streams 1302 are video streams, and one or more of the projected streams 1302 may include an associated audio stream. Each projected stream 1302 corresponds to one of the streams 1204 shown in FIG. 12. Streams 1204 are processed by processing system 101, including potentially combining multiple streams 1204 or portions of multiple streams 1204, to generate processed streams 1222, which are then projected by the projectors 112 onto display surface 116 to generate the projected streams 1302. In one embodiment, display surface 116 is a non-planar developable display surface.

In one embodiment, the six different projected streams 1302 are processed to generate four processed streams 1222 that are projected by four projectors 112 configured in a tiled arrangement to cover substantially the entire display surface 116. Six different streams 1204 are combined by processing system 101 into the four processed streams 1222 for projection by the four projectors 112. In another embodiment, more or less than four projectors 112 are used to produce the six different streams 1302. In one form of the invention, the display surface 116 is treated by processing system 101 as a single virtual display and multiple-stream content can be shown on the display surface 116 independent of the number of physical projectors 112 making up the display.

The projected streams 1302 can originate from any arbitrary video source. These sources can be local sources that are included in or coupled directly to processing system 101, and can be remote sources. The streams can arrive at varying rates at the processing system 101, and do not need to be synchronized with other streams being displayed. Live streams can be shown by display system 100 with very low latency.

As shown in FIG. 13A, six video streams 1302 are simultaneously projected onto display surface 116. The six projected video streams 1302 shown in FIG. 13A are initially positioned in two rows and three columns with no overlap between projected streams 1302, and the projected video streams 1302 have the same size as each other (i.e., the projected video streams 1302 each occupy substantially the same amount of area on the surface 116). The locations and sizes of the projected video streams 1302 shown in FIG. 13A represent "home" locations and sizes of the streams 1302 according to one embodiment. The home locations and sizes are used in one embodiment when none of the projected video streams 1302 is being individually emphasized by a user. By using user interface device 1218 and display 1220, a user interacts with processing system 101 to modify characteristics of one or more of the projected video streams 1302, including moving or repositioning selected ones of the streams 1302, and rescaling or changing the display size of selected ones of the streams 1302.

FIG. 13B shows the six projected video streams 1302 shown in FIG. 13A after a set of movement and rescaling operations have been performed. As shown in FIG. 13B, the projected video stream 1302(6) has been rescaled to be larger than the corresponding stream 1302(6) shown in FIG. 13A, and has been repositioned to the center of the display surface 116. Five of the projected video streams 1302(1) and 1302(3) to 1302(6) have been rescaled to be smaller than the corresponding streams 1302(1) and 1302(3) to 1302(6) shown in FIG. 13A, and have been repositioned in two columns along the left and right sides of the display surface 116.

In one embodiment, the movement and rescaling operations shown in FIGS. 13A and 13B are triggered by a user by selecting one of the projected video streams 1302 (e.g., video stream 1302(2)) when the streams 1302 are in their home positions (shown in FIG. 13A). In one embodiment, one of the streams 1302 is selected by a user with user interface device 1218, such as by pushing a key on a keyboard, or by selecting one of the streams 1302 with a mouse device, and the streams 1302 are automatically repositioned and rescaled by processing system 101. The location and size of the projected video stream 1302(2) shown in FIG. 13B represents a "zoom" location and size according to one embodiment. The locations and sizes of the projected video streams 1302(1) and 1302(3) to 1302(5) shown in FIG. 13B represents "hide" locations and sizes according to one embodiment. The zoom location and size is used for a stream 1302 in one embodiment when that stream 1302 is selected for emphasis by a user, and the hide locations and sizes are used for streams 1302 in one embodiment when another stream 1302 has been selected for emphasis by a user.

FIG. 13C shows the transition of the six projected video streams 1302 from the home locations and sizes shown in FIG. 13A to the zoom and hide locations and sizes shown in FIG. 13B. In one form of the invention, when one of the streams 1302 shown in FIG. 13A is selected by a user (e.g., stream 1302(2)), the selected stream 1302(2) is gradually and continually scaled up in size to the zoom size as that selected stream 1302(2) is also gradually and continually moved or slid across the display surface 116 to the zoom location. At the same time the selected stream 1302(2) is being moved and rescaled, the non-selected streams 1302(1) and 1302(3) to 1302(6) are gradually and continually scaled down in size to the hide size as those non-selected streams 1302(1) and 1302 (3) to 1302(6) are also gradually and continually moved or slid across the display surface 116 to their hide locations. During the transition period between the stream positions and sizes shown in FIG. 13A and the stream positions and sizes shown in FIG. 13C, one or more of the streams 1302 may cross over and at least partially overlap with one or more of the other streams 1302 during the movement of these streams 1302. In one embodiment, the streams 1302 appear semi-transparent so that multiple overlapping streams 1302 can be viewed in the regions of overlap. In another embodiment, the streams 1302 appear opaque so that only one stream 1302 can be viewed in the regions of overlap.

In one embodiment, processing system 101 is configured to perform audio transformations on one or more audio streams associated with one or more of the projected streams 1302, such as fading audio in and out, and transforming audio spatially over the speakers of display system 100. In one embodiment, processing system 101 causes audio to be faded in for a selected stream 1302, and causes audio to be faded out for non-selected streams 1302.

In another embodiment of the present invention, processing system 101 is also configured to allow a user to manually reposition and rescale one or more of the projected streams 1302 using user interface 1218, and thereby allow a user to reposition the streams 1302 at any desired locations, and to rescale the streams 1302 to any desired size. In addition, in other embodiments of the invention, more or less than six different streams 1302 are simultaneously projected on surface 116 in any desired arrangement and size, and other emphasis options are available to a user (e.g., increasing the size of two streams 1302 while making four other streams 1302 smaller). In another embodiment, rather than, or in addition to, relying on user input, processing system 101 is configured to automatically generate stream modification or transformation parameters to modify the processed streams 1222 and correspondingly the projected streams 1302. For example, in one form of the invention, processing system 101 is configured to automatically position and scale the streams 1302 based on the number of streams and where the streams 1302 are coming from (such as in a video conferencing application), or based on other factors.

Characteristics or properties of each stream 1302 may be transformed independently by processing system 101. The properties that can be transformed according to one form of the invention include, but are not limited to: (1) Two-dimensional (2D) screen space location and size; (2) three-dimensional (3D) location in the virtual screen space; (3) blending factors; (4) brightness and color properties; and (5) audio properties. In one embodiment, properties of the streams 1302 are transformed automatically by processing system 101 in response to an action from a user, such as selecting one or more of the streams 1302 with user interface device 1218. In another embodiment, a user interacts with processing system 101 via user interface device 1218 and display 1220 to manually modify properties of one or more of the streams 1302.

In one embodiment, processing system 101 is configured to provide unconstrained transformations of the 2D and 3D properties of the streams 1302. 2D transformations allow the streams 1302 to be slid around the display surface 116, similar to how a window can be moved on a standard computer display, without any corresponding movement of the projectors 112. The 3D transformations include translations in depth, rotations, and scaling of the streams 1302. Other types of image transformations are also implemented in other embodiments. Streams 1302 that overlap on the surface 116 are blended together by processing system 101 in one embodiment. Processing system 101 is configured to allow a user to dynamically adjust blending factors for projected streams 1302. Processing system 101 is also configured to allow a user to dynamically adjust brightness and color characteristics of projected streams 1302, allowing selected streams 1302 to be highlighted or deemphasized as desired. Processing system 101 is also configured to allow a user to perform cropping operations to selected streams 1302. In one embodiment, all transformations can be changed dynamically and independently for each stream 1302. The characteristics of the streams 1302 can be changed in real time while still maintaining the seamless nature of the display. In one form of the invention, processing system 101 is configured to combine one or more of the streams 1302 with non-stream content, such as 3D geometry or models. In a video conferencing application, for example, 2D video streams can be appropriately positioned by processing system 101 in a projected 3D model of a conference room.

In one embodiment, the majority of the runtime computation of processing system 101 is performed by the GPUs 1214 and 1216, rather than by the CPUs 1210 and 1212. By performing most of the runtime computation on the GPUs 1214 and 1216, the CPUs 1210 and 1212 are left free to receive and decompress multiple video and audio streams 1204. The GPUs 1214 and 1216 perform color processing and conversion on the streams 1204, if necessary, such as converting from the YUV-4:2:0 format generated by an Mpeg2 stream into RGB format for rendering. During geometric and photometric calibration, geometric meshes 126 and photometric correction information 128 are calculated as described above in Sections II and III, and the geometric meshes 126 and photometric correction information 128 are downloaded to the GPUs 1214 and 1216. At runtime, the geometric meshes 126 and photometric correction information 128 do not need to be recalculated and can stay resident on the GPUs 1214 and 1216 for the multiple stream rendering.

Before the streams 1204 are geometrically mapped by GPUs 1214 and 1216, the geometric characteristics (including location) of the streams 1204 can be transformed via a matrix multiply allowing any desired translation, rotation, or scaling to be applied to the streams 1204. The photometric correction information 128 is then combined with the streams 1204 by GPUs 1214 and 1216 to apply photometric correction and blending in overlap regions. In one embodiment, photometric correction is applied via fragment shader programs running on the GPUs 1214 and 1216. For every pixel that is to be displayed, the fragment program calculates the desired RGB color. The GPUs 1214 and 1216 then use a gamma function to map the pixel into the physical brightness space where the actual projected values combine. Photometric correction is done in this projected light space before an inverse gamma function brings the color values back to linear RGB.

The runtime processing performed by processing system 101 according to one form of the invention consists of acquiring streams 1204 from one or more sources, preparing the streams 1204 for presentation, and applying the geometric meshes 126 and photometric correction information 128 calculated during calibration. In one form of the invention, the real-time processing and rendering is implemented using stream processing software modules 1208 in a multimedia framework 1206 (FIG. 12). In one embodiment, multimedia framework 1206 is the "Nizza" framework developed by Hewlett-Packard Laboratories. The Nizza framework is described in Tanguay, Gelb, and Baker, "Nizza: A Framework for Developing Real-time Streaming Multimedia Applications", HPL-2004-132, available at http://www.hpl.hp.com/techreports/2004/HPL-2004-132.html, which is hereby incorporated by reference herein. In another embodiment, a different multimedia framework 1206 may be used, such as DirectShow, the Java Media Framework, or Quicktime.

The Nizza framework is a software middleware architecture, designed for creating real-time rich media applications. Nizza enables complex applications containing multiple audio and video streams to run reliably in real-time and with low latency. In order to simplify the development of applications that fully leverage the power of modern processors, Nizza provides a framework for decomposing an application's processing into task dependencies, and automating the distribution and execution of those tasks on a symmetric multiprocessor (SMP) machine to obtain improved performance. Nizza allows developers to create applications by connecting media processing modules, such as stream processing modules 1208, into a dataflow graph.

Figure 14:
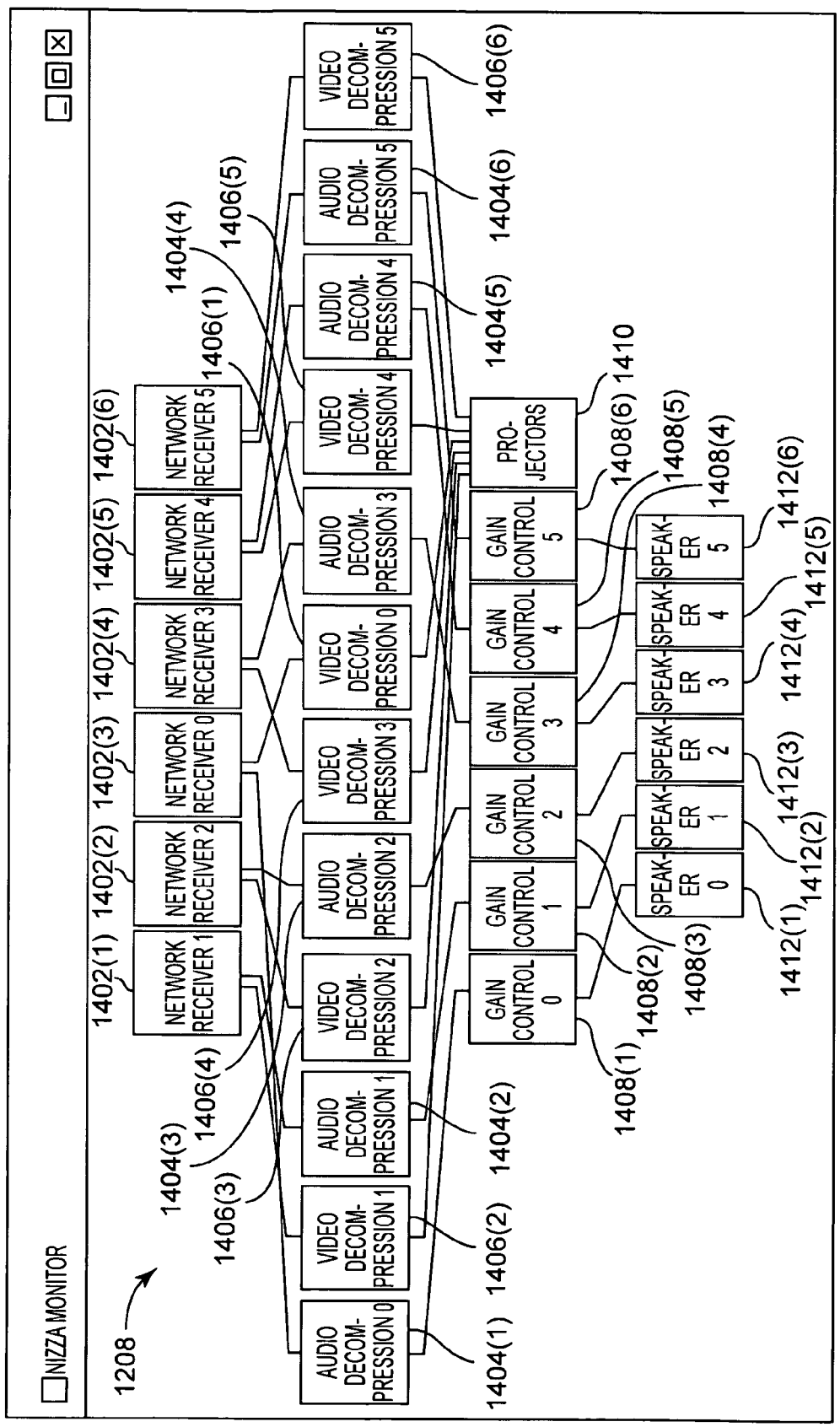
FIG. 14 is a diagram illustrating a dataflow graph showing the connections of stream processing modules according to one embodiment of the present invention.

FIG. 14 is a diagram illustrating a dataflow graph showing the connections of stream processing modules 1208 according to one embodiment of the present invention. The stream processing modules 1208 simultaneously receive six audio and video streams 1204, and process the streams 1204 to generate processed streams 1222 (FIG. 12) to be projected by projectors 112. Connections between the software modules 1208 indicate where a stream leaves one module and enters a subsequent module for processing. Stream processing begins at the top of the graph shown in FIG. 14 and flows down through the modules 1208 at the bottom of the graph. As shown in FIG. 14, stream processing modules 1208 include six network receiver software modules 1402(1)-1402(6), six audio decompression software modules 1404(1)-1404(6), six video decompression software modules 1406(1)-1406(6), six gain control software modules 1408(1)-1408(6), projectors software module 1410, and six speaker software modules 1412(1)-1412(6).

Network receiver software modules 1402(1)-1402(6) simultaneously receive six audio and video streams 1204 (FIG. 12). In one embodiment, the audio and video streams 1204 received by network receiver software modules 1402(1)-1402(6) are Mpeg2 transport streams. The network receiver modules 1402(1)-1402(6) each receive a different Mpeg2 transport stream, and reassemble the stream to generate a compressed audio stream and a compressed video stream. The compressed audio streams generated by network receiver modules 1402(1)-1402(6) are provided to audio decompression modules 1404(1)-1404(6), which decompress the received audio streams, and provide the decompressed audio streams to gain control modules 1408(1)-1408(6). Gain control modules 1408(1)-1408(6) perform a gain operation on the received audio streams so that audio fades in and out based on which stream is selected or emphasized as described above with respect to FIGS. 13A-13C. The gain adjusted audio streams generated by gain control modules 1408(1)-1408(6) are provided to speaker modules 1412(1)-1412(6), which control speakers of the display system 100.

The compressed video streams generated by network receiver modules 1402(1)-1402(6) are provided to video decompression modules 1406(1)-1406(6), which decompress the streams into YUV-4:2:0 image streams. The YUV-4:2:0 image streams from the video decompression modules 1406(1)-1406(6) are provided to projectors software module 1410. Projectors software module 1410 performs geometric and photometric processing on the six received image streams as described above in Sections II and III, and combines the streams into four processed streams 1222 for projection by four projectors 112.

Software modules 1208 can process streams 1204 from many different sources, including compressed Mpeg2 video streams from prerecorded sources such as DVDs and high-definition video, as well as live video sources compressed by remote Nizza modules or other video codecs. Other video or image sources can also be used to provide streams 1204 to software modules 1208, including Firewire cameras, Jpeg image sequences, BMP image sequences, PPM sequences, as well as other camera interfaces.

Figure 15:
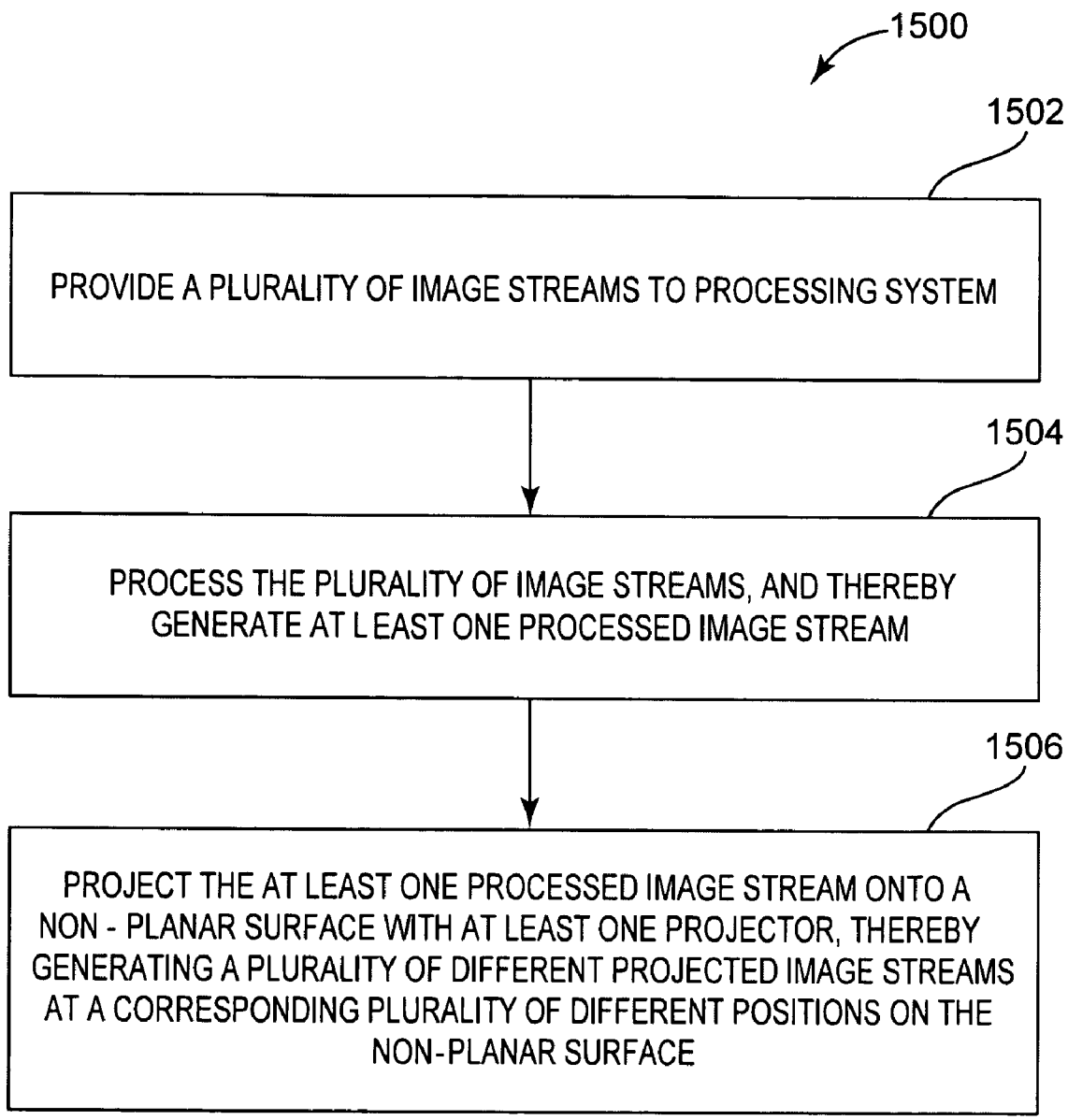
FIG. 15 is a diagram illustrating a method of displaying multiple image streams according to one embodiment of the present invention.

FIG. 15 is a diagram illustrating a method 1500 of displaying multiple image streams according to one embodiment of the present invention. In one embodiment, image display system 100 is configured to perform method 1500. At 1502, a plurality of image streams 1204 are provided to processing system 101. In one embodiment, each image stream 1204 in the plurality includes different image content than the other image streams 1204 in the plurality. At 1504, the plurality of image streams 1204 are processed by processing system 101, thereby generating at least one processed image stream 1222. At 1506, the at least one processed image stream 1222 is projected onto a non-planar surface 116 with at least one projector 112, thereby generating a plurality of different projected image streams 1302 at a corresponding plurality of different positions on the non-planar surface 116, wherein each of the projected image streams 1302 corresponds to one of the image streams 1204 in the plurality of image streams 1204.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a processing system, the method comprising:
    generating, with the processing system, a first plurality of meshes configured to map a first domain associated with a display surface having a plurality of fiducial marks to a second domain associated with an image capture device configured to capture a first image of the display surface;
    generating, with the processing system, a second plurality of meshes configured to map the second domain to a third domain associated with a first projector configured to display a second image onto the display surface; and
    generating, with the processing system, a first mesh configured to map the first domain to the third domain in conjunction with a second mesh using the first plurality of meshes and the second plurality of meshes, the first mesh and the second mesh including a first set of point correspondences configured into a first plurality of polygons in the first mesh and a second plurality of polygons in the second mesh, and each of the first plurality of polygons corresponding to a respective one of the second plurality of polygons.

2. The method of claim 1 further comprising:
    applying the first mesh to render a first image frame with the processing system; and
    projecting the first image frame with the first projector.

3. The method of claim 1 further comprising:
    capturing the first image of the display surface using the image capture device;
    locating the plurality of fiducial marks in the first image with the processing system;
    generating a second set of point correspondences between the plurality of fiducial marks in the first image and the plurality of fiducial marks on the display surface with the processing system; and
    determining the first plurality of meshes from the second set of point correspondences with the processing system, the second set of point correspondences configured into a third plurality of polygons in a first one of the first plurality of meshes and a fourth plurality of polygons in a second one the first plurality of meshes, and each of the third plurality of polygons corresponding to a respective one of the fourth plurality of polygons.

4. The method of claim 3 wherein the plurality of fiducial marks does not overlap with the second image on the display surface.

5. The method of claim 3 further comprising:
    constructing, with the processing system, a first one of the first plurality of meshes to include a first set of points in the first domain from the second set of point correspondences; and
    constructing, with the processing system, a second one of the first plurality of meshes to include a second set of points in the second domain from the second set of point correspondences such that the second one of the first plurality of meshes corresponds to the first one of the first plurality of meshes using the set of point correspondences.

6. The method of claim 1 further comprising:
    capturing one or more images of one or more known patterns projected on the display surface;

generating, with the processing system, a second set of point correspondences between the one or more known patterns and the one or more known patterns in the one or more images; and determining the second plurality of meshes from the second set of point correspondences with the processing system, the second set of point correspondences configured into a third plurality of polygons in a first one of the first plurality of meshes and a fourth plurality of polygons in a second one the first plurality of meshes, and each of the third plurality of polygons corresponding to a respective one of the fourth plurality of polygons.

7. The method of claim 6 further comprising:

constructing, with the processing system, a first one of the second plurality of meshes to include a first set of points in the second domain from the second set of point correspondences; and constructing, with the processing system, a second one of the second plurality of meshes to include a second set of points in the third domain from the set of point correspondences such that the second one of the second plurality of meshes corresponds to the first one of the second plurality of meshes using the second set of point correspondences.

8. The method of claim 1 further comprising:

constructing, with the processing system, the second mesh to include a first set of points in the first domain;

generating, with the processing system, the first set of point correspondences between the first set of points and a second set of points in the third domain using the first plurality of meshes and the second plurality of meshes; and constructing, with the processing system, the first mesh to include the second set of points such that the first mesh corresponds to the second mesh using the first set of point correspondences.

9. The method of claim 8 further comprising:

for each of the first set of points:
- identifying a first triangle in a first one of the first plurality of meshes that includes or is nearest to one of the first set of points with the processing system;
- determining first barycentric coordinates for the one of the first set of points in the first triangle with the processing system;
- applying the first barycentric coordinates to a second triangle in a second one of the first plurality of meshes that corresponds to the first triangle to identify a first point in the second domain with the processing system;
- identifying a third triangle in a first one of the second plurality of meshes that includes or is nearest to the first point with the processing system;
- determining second barycentric coordinates for the first point in the third triangle with the processing system; and
- applying the second barycentric coordinates to a fourth triangle in a second one of the second plurality of meshes that corresponds to the third triangle to identify one of the second set of points with the processing system.

10. The method of claim 1 further comprising:

generating at least one of the first plurality of meshes, the second plurality of meshes, and the first mesh using Delaunay triangulation with the processing system.

11. The method of claim 1 further comprising:

generating, with the processing system, a third plurality of meshes configured to map the second domain to a fourth domain associated with a second projector configured to display a third image onto the display surface simultaneously with the display of the second image by the first projector; and generating, with the processing system, a third mesh configured to map the first domain to the fourth domain using the first plurality of meshes and the third plurality of meshes, the third mesh and the second mesh including a second set of point correspondences configured into a third plurality of polygons in the third mesh and a fourth plurality of polygons in the second mesh, and each of the third plurality of polygons corresponding to a respective one of the fourth plurality of polygons.

12. A system comprising:

a frame generator configured to render a first image frame using a first mesh to generate a second image frame; and a first projector configured to store the second image frame in a first frame buffer and project the second image frame onto a display surface to display a first image;

wherein the first mesh defines a first mapping between the display surface and the first frame buffer, wherein the first mapping is configured into a first plurality of polygons, and wherein each of the first plurality of polygons correspond to a respective one of a second plurality of polygons in a domain corresponding to the display surface.

13. The system of claim 12 wherein the frame generator is configured to produce the second image frame by interpolating a first plurality of pixel values using the first mesh and the second mesh.

14. The system of claim 12 wherein the frame generator is configured to warp the first image frame using the first mesh and the second mesh to generate the second image frame.

15. The system of claim 12 wherein the frame generator is configured to render a third image frame using a second mesh to generate a fourth image frame; and further comprising:

a second projector configured to store the fourth image frame in a second frame buffer and project the fourth image frame onto the display surface to display a second image such that the second image partially overlaps with the first image on the display surface;

wherein the second mesh defines a second mapping between the display surface and the second frame buffer, wherein the second mapping is configured into a third plurality of polygons, and wherein each of the third plurality of polygons correspond to a respective one of a fourth plurality of polygons in the domain corresponding to the display surface.

16. The system of claim 15 wherein the frame generator is configured to render the first image frame and the third image frame to cause the first image and the second image to be spatially aligned on the display surface.

17. The system of claim 12 wherein the display surface forms a non-planar developable surface.

18. A program product stored on a medium readable by a processing system, the program product comprising instructions executable by the processing system to:

generate a first plurality of meshes from at least a first image that includes a plurality of fiducial marks on a display surface in a predetermined arrangement;

generate a second plurality of meshes from a first known pattern sequence and one or more second images that includes the first known pattern sequence, the one or more second images captured of the display of the first known pattern sequence by a first projector;

generate a first mesh that includes a first set of points that are associated with the first projector and determined using the first plurality of meshes and the second plurality of meshes, wherein the first set of points is configured into a first plurality of polygons, and wherein each of the first plurality of polygons correspond to a respective one of a second plurality of polygons in a domain corresponding to the display surface.

19. The program product of claim 18 and further comprising instructions executable by the processing system to:
provide the first mesh to a frame generator.

20. The program product of claim 18 and further comprising instructions executable by the processing system to:
generate a third plurality of meshes from a second known pattern sequence and one or more third images that includes the second known pattern sequence, the one or more third image captured of the display of the second known pattern sequence by a second projector;
generate a second mesh that includes a second set of points that are associated with the second projector and determined using the first plurality of meshes and the third plurality of meshes, wherein the second set of points is configured into a third plurality of polygons, and wherein each of the third plurality of polygons correspond to a respective one of a fourth plurality of polygons in the domain corresponding to the display surface.

* * * * *